(12) United States Patent
Parameswar et al.

(10) Patent No.: US 7,937,559 B1
(45) Date of Patent: May 3, 2011

(54) SYSTEM AND METHOD FOR GENERATING A CONFIGURABLE PROCESSOR SUPPORTING A USER-DEFINED PLURALITY OF INSTRUCTION SIZES

(75) Inventors: Akilesh Parameswar, San Jose, CA (US); James Alexander Stuart Fiske, Palo Alto, CA (US); Ricardo E. Gonzalez, Menlo Park, CA (US)

(73) Assignee: Tensilica, Inc., Santa Clara, CA (US)

( * ) Notice: Subject to any disclaimer, the term of this patent is extended or adjusted under 35 U.S.C. 154(b) by 842 days.

(21) Appl. No.: 11/761,322

(22) Filed: Jun. 11, 2007

Related U.S. Application Data

(62) Division of application No. 10/146,651, filed on May 13, 2002, now abandoned.

(51) Int. Cl.
*G06F 9/00* (2006.01)
(52) U.S. Cl. .......................... 712/37; 712/36
(58) Field of Classification Search ............ 712/36, 712/37
See application file for complete search history.

(56) References Cited

U.S. PATENT DOCUMENTS

| | | | |
|---|---|---|---|
| 4,236,206 A | 11/1980 | Strecker et al. |
| 5,222,225 A | 6/1993 | Groves |
| 5,598,546 A | 1/1997 | Blomgren |
| 5,781,750 A | 7/1998 | Blomgren |
| 5,802,556 A | 9/1998 | Patel et al. |
| 5,812,147 A | 9/1998 | Van Hook et al. |
| 5,826,071 A | 10/1998 | Narayan |
| 5,896,521 A | 4/1999 | Shackleford et al. |
| 5,922,066 A | 7/1999 | Cho et al. |
| 6,023,757 A | 2/2000 | Nishimoto et al. |
| 6,026,478 A | 2/2000 | Dowling |
| 6,044,450 A | 3/2000 | Tsushima et al. |
| 6,058,465 A | 5/2000 | Nguyen |
| 6,233,596 B1 | 5/2001 | Kubota et al. |
| 6,272,512 B1 | 8/2001 | Golliver et al. |

(Continued)

FOREIGN PATENT DOCUMENTS

JP 09-251477 9/1997

(Continued)

OTHER PUBLICATIONS

Gonzalez; "Xtensa: A Configurable and Extensible Processor"; 2000; IEEE.*
Berekovic, M., et al., "A Programmable Co-Processor for MPEG-4 Video," IEEE, p. 1021-1024, (2001).

(Continued)

*Primary Examiner* — Alford W Kindred
*Assistant Examiner* — Banjamin P Geib
(74) *Attorney, Agent, or Firm* — Pillsbury Winthrop Shaw Pittman LLP

(57) ABSTRACT

A processor generation system includes the ability to describe processors with three instruction sizes. In one example implementation, instructions can be 16-, 24- and 64-bits. This enables a new range of architectures that can exploit parallelism in architectures. In particular, this enables the generation of VLIW architectures. According to another aspect, the processor generator allows a designer to add a configurable number of load/store units to the processor. In order to accommodate multiple load/store units, local memories connected to the processor can have multiple read and write ports (one for each load/store unit). This further allows the local memories to be connected in any arbitrary connection topology. Connection box hardware is automatically generated that provides an interface between the load/store units and the local memories based on the configuration.

28 Claims, 32 Drawing Sheets

U.S. PATENT DOCUMENTS

| | | |
|---|---|---|
| 6,332,186 B1 | 12/2001 | Elwood et al. |
| 6,366,998 B1 | 4/2002 | Mohamed |
| 6,477,683 B1 | 11/2002 | Killian et al. |
| 6,496,922 B1 | 12/2002 | Borrill |
| 6,549,999 B2 | 4/2003 | Kishida et al. |
| 6,704,859 B1 | 3/2004 | Jacobs et al. |
| 6,721,866 B2 | 4/2004 | Roussel et al. |
| 6,820,195 B1 | 11/2004 | Shepherd |
| 6,826,679 B1 | 11/2004 | Laurenti et al. |
| 2001/0032305 A1 | 10/2001 | Barry |
| 2003/0014457 A1 | 1/2003 | Desai |

FOREIGN PATENT DOCUMENTS

| | | |
|---|---|---|
| JP | 10/134032 | 5/1998 |
| JP | 2000298652 | 10/2000 |
| WO | WO 00/46704 | 8/2000 |
| WO | WO 01/61576 | 8/2001 |
| WO | WO 01/73571 | 10/2001 |

OTHER PUBLICATIONS

Kondo, Y., et al., "A4 GOPS 3 Way—VLIW Image Recognition Processor Based on a Configurable Media-Processor," IEEE Int'l Solid State Circuits Conf., 3 pages, (2001).

Vert, William Dr., "An Essay on Endian Order," Dr. Bill's Notes on Little Endian vs. Big Endian, at website http://www.cs.umass.edu/~verts/cs32/endian.html, Apr. 19, 1996.

Ercanli, E. et al., "A Register File and Scheduling Model for Application Specific Processor Synthesis", p. 35-40 (Jun. 1996).

Iseli, C. et al., "Ac++ Compiler for FPGA Custom Execution Units Synthesis", Proc. of IEEE Symp on FPGAs for Custom Computing Machines, p. 173-179 (Apr. 1995).

\* cited by examiner

FIG. 4
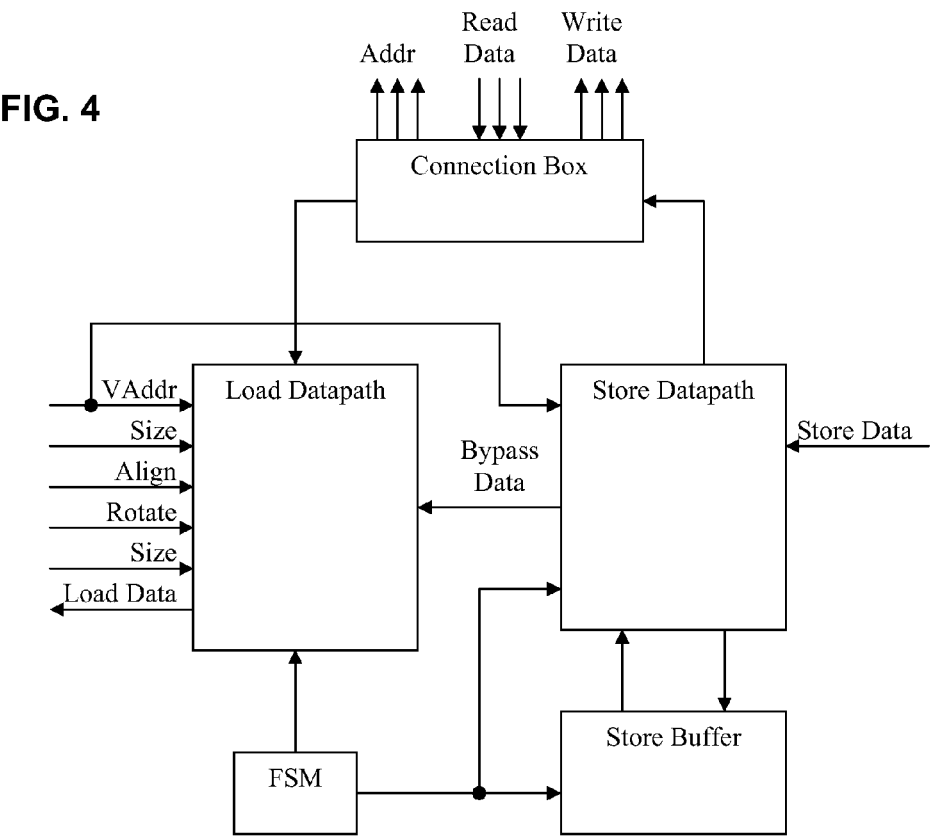
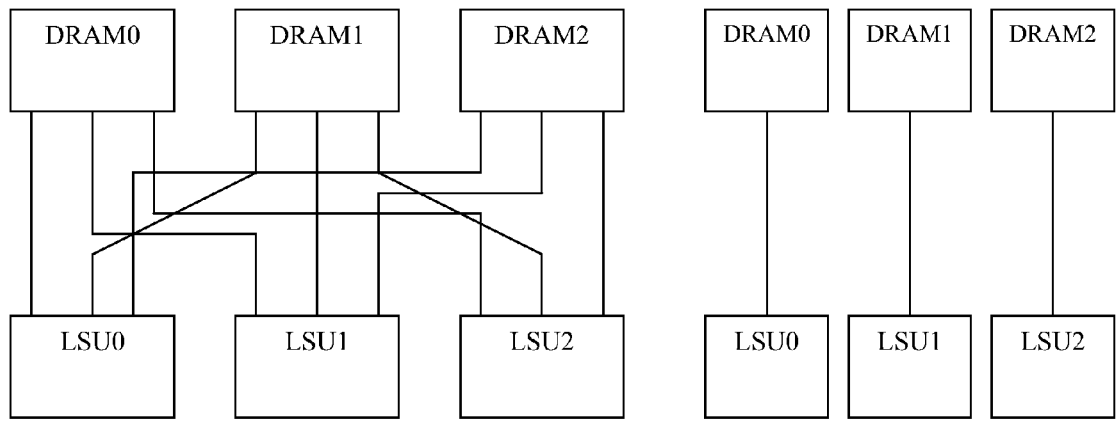
FIG. 5A  FIG. 5B

Sixteen 8-bit elements in memory
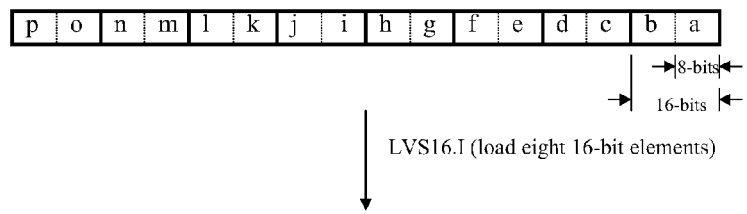
LVS16.I (load eight 16-bit elements)
Sixteen 8-bit elements in a single vector register
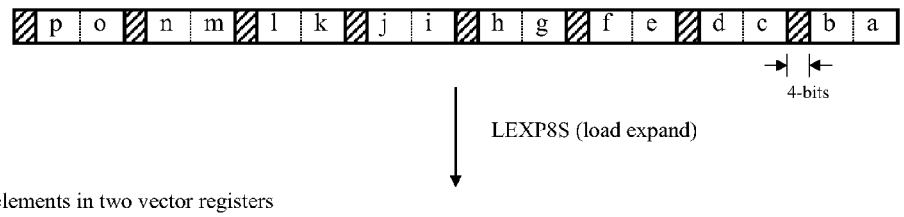
LEXP8S (load expand)
Sixteen 20-bit elements in two vector registers
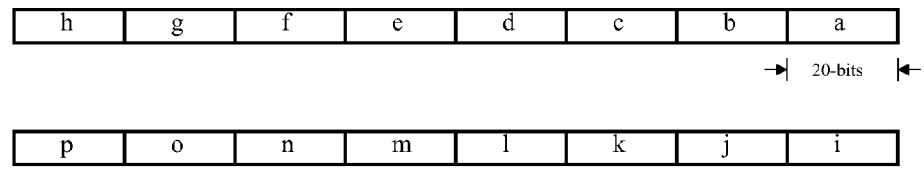
FIG. 15

Complex Multiply

| | | | | | | | | |
|---|---|---|---|---|---|---|---|---|
| Operand 0 | $a_3$ | $b_3$ | $a_2$ | $b_2$ | $a_1$ | $b_1$ | $a_0$ | $b_0$ |

| | | | | | | | | |
|---|---|---|---|---|---|---|---|---|
| Operand 1 | $c_3$ | $d_3$ | $c_2$ | $d_2$ | $c_1$ | $d_1$ | $c_0$ | $d_0$ |

| | | | | |
|---|---|---|---|---|
| Real product | $a_3c_3 - b_3d_3$ | $a_2c_2 - b_2d_2$ | $a_1c_1 - b_1d_1$ | $a_0c_0 - b_0d_0$ |

| | | | | |
|---|---|---|---|---|
| Imaginary product | $a_3d_3 + b_3c_3$ | $a_2d_2 + b_2c_2$ | $a_1d_1 + b_1c_1$ | $a_0d_0 + b_0c_0$ |

SYSTEM AND METHOD FOR GENERATING A CONFIGURABLE PROCESSOR SUPPORTING A USER-DEFINED PLURALITY OF INSTRUCTION SIZES

CROSS-REFERENCE TO RELATED APPLICATIONS

This application is a divisional of U.S. application Ser. No. 10/146,651 filed May 13, 2002 now abandoned, entitled "Advanced Configurable and Extensible Microprocessor Architecture", which is related to U.S. application Ser. No. 10/145,380 filed May 13, 2002, entitled "Vector Co-Processor for Configurable and Extensible Processor Architecture" and U.S. application Ser. No. 10/146,655 filed May 13, 2002, entitled "Method and Apparatus for Adding Advanced Instructions in an Extensible Processor Architecture," the contents of which are incorporated herein by reference.

FIELD OF THE INVENTION

The present invention relates generally to microprocessors, and more particularly, to a method and apparatus for generating processor systems.

BACKGROUND OF THE INVENTION

New application-focused system-on-chip platforms motivate new application-specific processors. Configurable and extensible processor architectures offer the efficiency of tuned logic solutions with the flexibility of standard high-level programming methodology. Automated extension of processor function units and the associated software environment (compilers, debuggers, simulators and real-time operating systems) satisfies these needs. At the same time, designing at the level of software and instruction set architecture significantly shortens the design cycle and reduces verification effort and risk.

U.S. Pat. No. 6,282,633, issued Aug. 28, 2001 and entitled, "High Data Density RISC Processor," U.S. application Ser. No. 09/246,047, filed Feb. 5, 1999 and entitled "Automated Processor Generation System for Designing a Configurable Processor and Software," U.S. application Ser. No. 09/322,735, filed May 28, 1999 and entitled "System for Adding Complex Instruction Extensions to a Microprocessor," and U.S. application Ser. No. 09/506,502, filed Feb. 17, 2000 and entitled "Improved Automated Processor Generation System for Designing a Configurable Processor and Software," all commonly owned by the present assignee and incorporated herein by reference, dramatically advanced the state of the art of microprocessor architecture and design.

More particularly, these previous patents and applications described in detail a high-performance RISC processor, as well as a system that is able to generate a customized version of such a high-performance RISC processor, based on user specifications (e.g. number of interrupts, width of processor interface, size of instruction/data cache, inclusion of MAC or multiplier) and implementation goals (e.g. target ASIC technology, speed, gate count, power dissipation, prioritization). The system generates a Register Transfer Level (RTL) representation of the processor, along with the software tools for the processor (compiler, linker, assembler, debugger, simulator, profiler, etc.), and the set of scripts to transform the RTL representation into a manufacturable geometric representation (usually referred to as synthesis and place and route). The system further includes recursive evaluation tools that allow for the addition of processor extensions to provide hardware support for commonly used functions in accordance with the application to achieve an ideal trade-off between software flexibility and hardware performance.

Generally, as shown in FIG. 1, the processor 102 generated by the system can include a configurable core 104 that is substantially the processor described in U.S. Pat. No. 6,282,633, and an optional set of application-specific processor extensions 106, which extensions may be described by Tensilica Instruction Extension (TIE) language instructions, and/or other high level hardware description language instructions, as detailed in the above-referenced applications. The processor and generation system of the above-referenced patents and applications are embodied in products that are commercially available from Tensilica, Inc. of Santa Clara, Calif.

Although the above system can generate processors that meet the requirements of many and various applications, there are other applications, such as video compression and decompression, data encryption, and signal processing, that can benefit from additional architectural and micro-architectural features. For example, the above system can generate processors capable of recognizing both 16- and 24-bit instructions. In some applications, it would be desirable to extend the amount of parallelism available in the instruction set architecture.

In addition, for some applications, it would be desirable for the system programmer not to have to re-order the location of data in memory. This often requires that the application be able to reference two separate streams from memory. However, the above system requires that the streams be re-ordered so that they could be accessed as a single stream of twice the number of bits. Further, the generated processors required that all local memories be accessed in a fraction of the processor cycle time. This limits the ability to use large memories in the system (as the time to access the memory is proportional to the size of the memory). Furthermore, the above system can not generate processors that can accommodate memories with variable latency. This is often useful when adding additional read or write ports to a memory (as would be required to support multiple load and store units).

SUMMARY OF THE INVENTION

The present invention relates to high-performance processors. Like the processor generation system described in the above-mentioned patents and applications, the system of the present invention generates the hardware and the software together. However, the present invention builds on the above-mentioned patents applications by adding new features that enable significantly higher performance.

According to one aspect, the present invention adds the ability to describe processors with three instruction sizes. Like the previous system, instructions can be 16- or 24-bits. In addition, instructions can be 64-bits. This enables a new range of architectures that can exploit parallelism in architectures. In particular, this enables the generation of VLIW architectures. Co-pending application TEN-014, Ser. No. 10/146,380 (see excerpt below) describes a processor architecture that uses the VLIW capabilities described herein to achieve significant performance gain on various kernels used in signal processing applications.

According to another aspect of the invention, the processor generator of the present invention allows a designer to add a configurable number of load/store units to the processor. In order to accommodate multiple load/store units, local memories connected to the processor can have multiple read and write ports (one for each load/store unit). This further allows the local memories to be connected in any arbitrary connection topology. Connection box hardware is automatically generated that provides an interface between the load/store units and the local memories based on the configuration.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein:

FIG. 4 is a block diagram illustrating an example implementation of a load/store unit according to the invention;

FIGS. 5A and 5B illustrate alternative connection topologies between multiple load/store units and local memories according to the invention;

FIG. 15 is a diagram illustrating vector processor support for 8-bit data types;

DETAILED DESCRIPTION OF THE PREFERRED EMBODIMENTS

Figure 1:
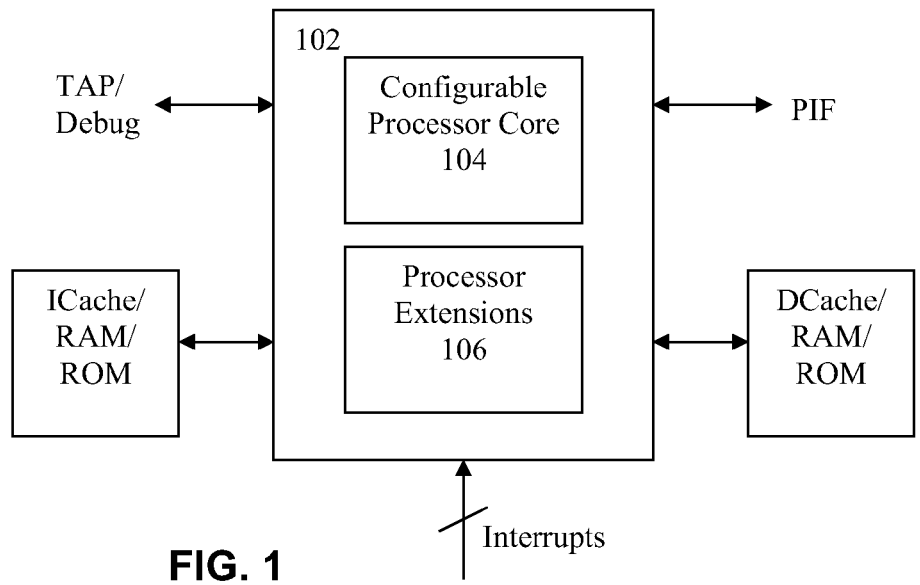
FIG. 1 is a high-level block diagram illustrating a prior art processor according to the above-mentioned patent and applications.

The present invention will now be described in detail with reference to the drawings, which are provided as illustrative examples of the invention so as to enable those skilled in the art to practice the invention. Notably, the figures and examples below are not meant to limit the scope of the present invention. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Further, the present invention encompasses present and future known equivalents to the known components referred to herein by way of illustration. The attached Appendices form part of the present disclosure and are incorporated herein by reference.

An aspect of the present invention is providing a system for generating high-performance processors. Another aspect is the design of the processor features.

The generation system includes mechanisms to generate the processor description (RTL code) and associated software tools (such as the instruction set simulator, compiler, and so on). The underlying mechanism for configuration is similar to that described in the above-mentioned prior patent and applications. Generally, this includes a powerful pre-processing language to be able to generate the appropriate code for a configuration (whether the code is RTL, C, or assembly). Preferably, however, the Instruction Set Architecture (ISA) is described mainly using TIE (Tensilica Instruction Extension language). The TIE compiler (tc) can then be used to generate large portions of the software tools and the hardware description. Co-pending application Ser. No. 10/146,655 (TEN-016), as excerpted below, describes further enhancements to TIE that are useful for the present invention.

As described in the above-mentioned patent and applications, the process starts when the user inputs the configuration parameters. These are then used to construct a simple database representation that does error checking (to ensure the parameter values and their combination is legal). This database is then used to generate the appropriate TIE description of the processor. The system then runs the TIE compiler (tc) to generate the hardware description and some of the configuration libraries for the software tools. The system then runs the pre-processor on the remaining files to appropriately select which features to include from each file. This is used to generate the remaining portion of the hardware description as well as various configuration libraries for the software tools. The system further includes evaluation tools which can suggest even further changes to the configuration, and thus the resulting hardware descriptions and software tools. The changes to the configuration environment described in the previous patent and application for generating and evaluating the processor according to the present invention will become apparent to those skilled in the art in view of the prior disclosures and the descriptions provided hereinbelow.

Figure 2:
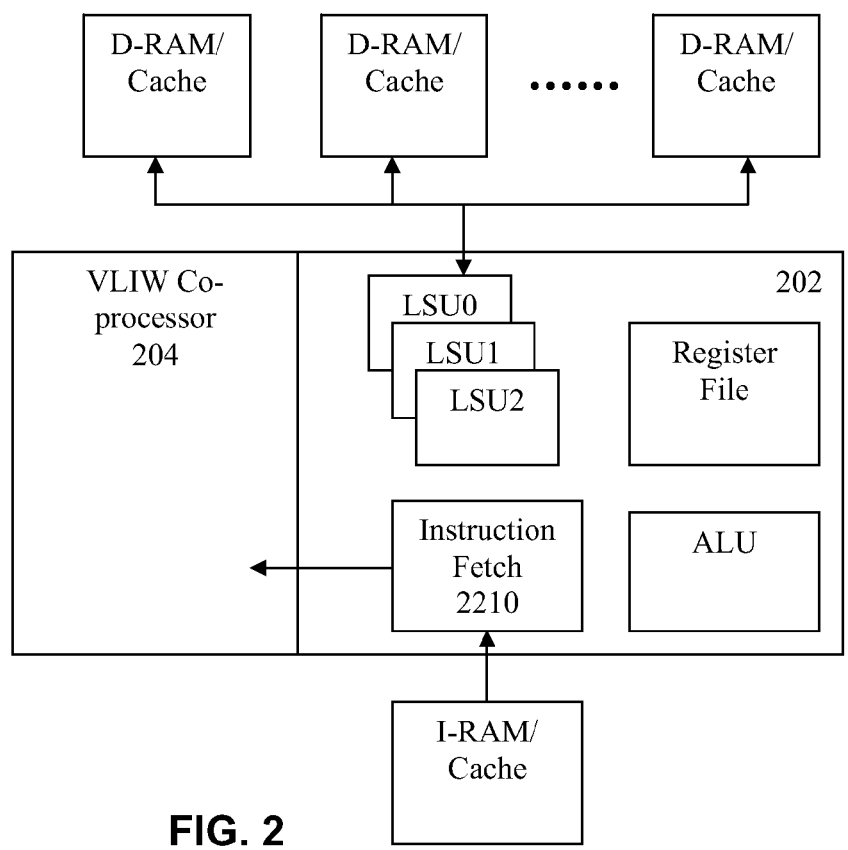
FIG. 2 is a high-level block diagram illustrating an example processor in accordance with the present invention.

FIG. 2 is a top-level diagram illustrating an example implementation of the present invention. As shown in FIG. 2, a generated high-performance processor 200 of the present invention includes a configurable core 202 and a VLIW co-processor 204.

As will be described in more detail hereinbelow, a notable feature of the present invention is the ability to handle three instruction sizes. In one example implementation, instructions can be 16-, 24-, or 64-bits (in the prior patent and applications, instructions could only be two sizes, such as 16- or 24-bits). The ability to handle a third and larger instruction size enables a new range of architectures that can exploit instruction-level parallelism (ILP). In particular, this enables the generation of VLIW architectures. Co-pending patent application TEN-014, Ser. No. 10/146,380 (see excerpt below) describes an example implementation of co-processor 204 that uses VLIW to achieve significant performance gain on various kernels used in signal processing applications.

According to one example, to enable high-performance implementations, the size of the instruction is encoded in the least significant nibble of the instruction (for a little-endian scheme, or the most significant nibble for a big-endian scheme). This allows the hardware to quickly compute the size of the instruction so that it can determine the starting byte of the next instruction. This is often one of the critical paths in machines with variable sized instructions. Placing the length information in the first nibble minimizes the hardware cost of providing a variable instruction size.

As shown in FIG. 2, instruction fetch module 2210 is responsible for accessing the local and external memories to compose instructions. Since instructions can have arbitrary size they are not necessarily aligned to a natural access boundary (i.e. a 64-bit instruction is not always aligned on a 64-bit boundary in memory). In one example configuration, the decoding of the instruction size is available after one or two gate delays. The length decoder is automatically generated by the TIE compiler based on user input, as described in more detail in co-pending application TEN-016, Ser. No. 10/146,655 (see excerpt below). The length decode information is then passed to the instruction fetch module 2210 so it can decide how to continue to fetch and compose instructions.

As is known, most modern processors exploit pipelining to improve the implementation frequency and hence application performance. Pipelining allows multiple instructions to be executed simultaneously. The execution of each instruction is broken up into distinct steps, or stages. The processor generation system described in the above-mentioned prior patent and applications produced processors with 5 stages which are commonly represented as,

I R E M W

Generally, during the I (or Instruction fetch) stage the machine accesses the local instruction memories and obtains the instruction to execute. During the R (Register Read) stage the machine decodes the instruction and reads the register operands from the register file. In the E (for execute) stage the machine performs ALU instructions and computes the effective memory address for loads and stores. In the M (memory) stage the processor accesses the local data memories to obtain load data. And in the W stage the machine will update the architecturally visible state (such as register files and memory on stores).

The address used to access the local instruction memories (also known as the Program Counter or PC) is actually computed in the cycle before the I stage. And so even if it does not strictly correspond to a stage, the pipeline can be described as

P I R E M W

The processor can execute multiple instructions simultaneously as they are in different stages. Since the pipeline has 5 stages the processor can execute a maximum of 5 instructions in parallel.

Notice that the pipeline implementation is tightly coupled with the access time of the memories. In this case the pipeline assumes that the local memory access time is 1 cycle.

According to one aspect of the invention, the processor generation system has the ability to modify the pipeline to accommodate instruction or data memories (whether they be caches, RAM or ROM) of different latencies. In particular, the current invention supports 1 or 2 cycle instruction or data memories. When adding a 2 cycle instruction memory the current system will generate a processor that executes instructions using a pipeline that looks like,

P H I R E M W

Notice there is an additional stage between the P cycle (when the PC is computed) and the I stage. This stage corresponds to the additional latency in accessing the memory. It is also possible to use 2 cycle latency data memories, in which case the pipeline would look like,

P I R E L M W

Again, there is an additional stage when accessing the memory. In this case the additional stage is between the E stage (when the address of loads/stores is computed) and the M stage (when load data is available).

Figure 3A:
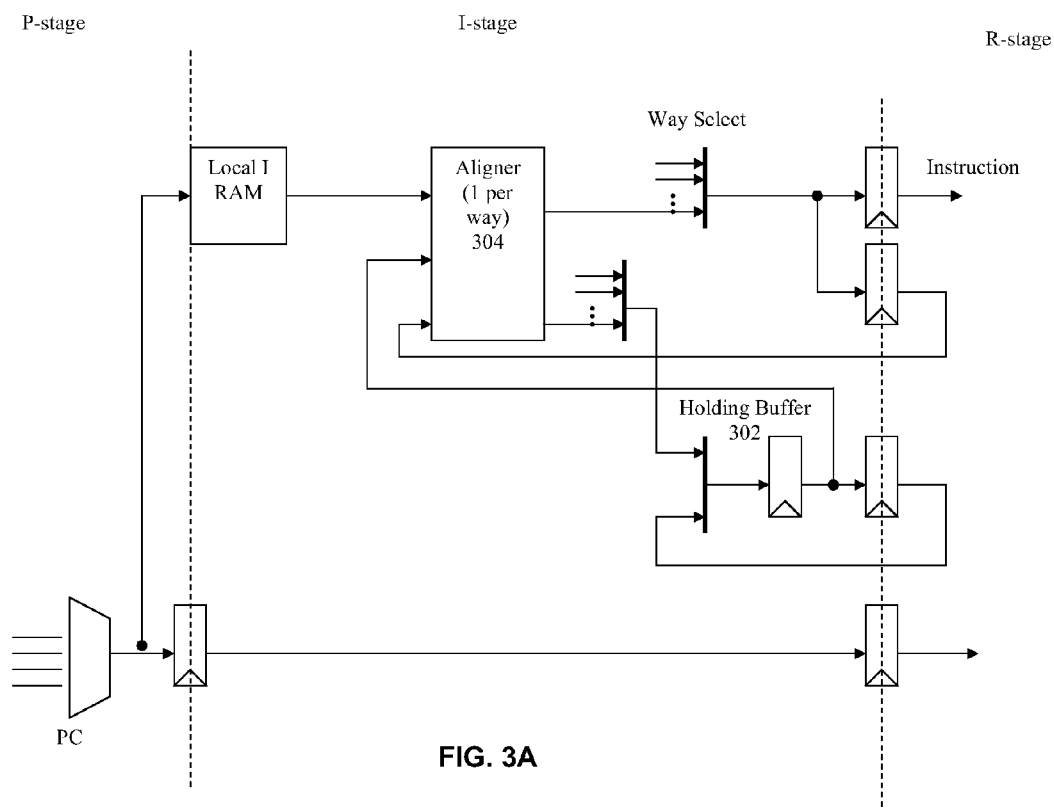
FIGS. 3A and 3B illustrate example implementations of how extra stages can be added to the processor pipeline according to the invention.

FIG. 3A shows a simplified block diagram of one example implementation of instruction fetch block 206 when configured for single-cycle memories (i.e. one cycle memory access). In the P stage the machine generates a Program Counter (PC) which is used to index into the memory. Most memories can only be accessed using an address aligned to the memories access width, hence the processor aligns the address to the memory's width. On the following cycle (the I stage) the data read from the memory is available and is used to compose an instruction. Any bytes left over (i.e. bytes read from the memory that are part of the subsequent instruction) are placed in the holding buffer. On the following cycle the processor will use the data from the holding buffer plus the data read from the memory to compose an instruction. Eventually (since the average instruction size must be less than the average fetch width) the holding buffer will contain a whole instruction. During that cycle the machine should hold the PC constant and not continue fetching. A simple FSM keeps track of how many valid bytes there are in the holding buffer.

Figure 3B:
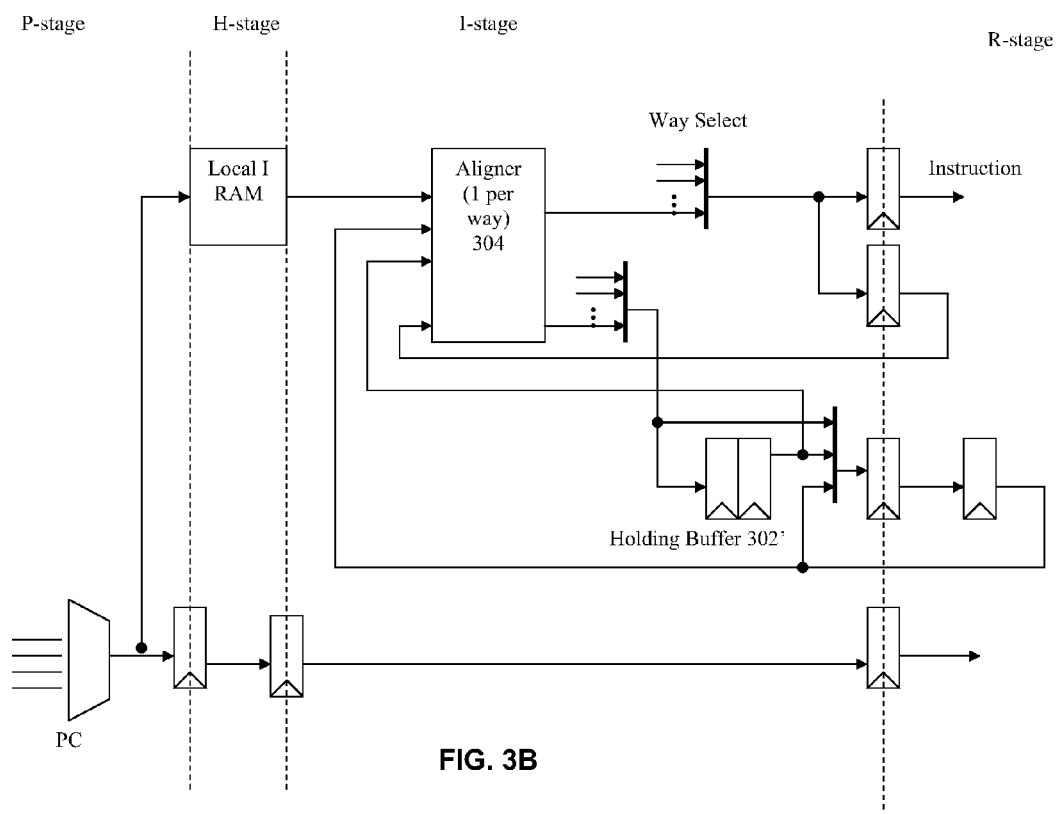

When the machine is configured to support two cycle instruction memories the complexity of the hardware grows significantly. This is illustrated in FIG. 3B. As in the configuration illustrated in FIG. 3A, the PC is generated in the P stage. The data from the memory is not available until the I stage (recall that the I stage comes after the H stage in these configurations). At that point the hardware composes the instruction in a similar way. However, the machine requires a three-deep holding buffer 302'. This is because by the time the machine detects the holding buffers have a complete instruction there are already two pending requests to the memory. To prevent the data from being lost (and therefore losing cycles to re-fetch it) the processor must have a place to put the data. The FSM that controls the holding buffer is more sophisticated to keep track of which entries are valid.

The synthesis tools provide evaluation results which can be used to optimize the pipeline stages to minimize the cycle time. This reduces the required changes in the rest of the design. As noted above, additional pipeline stages can be added in other locations, not just between the P and I stages. The processor generation system automatically generates the additional hardware needed to implement any additional pipeline stages in accordance with the optimized pipeline.

Referring back to FIG. 2, processor 200 further includes a configurable number of load/store units 208, three in this example (LSU0-2). It should be noted that a load and store unit is usually one of the most expensive functional units in a processor. Therefore designers try to add hardware to maximize the use of the load and store units before incorporating additional load/store units. Designers can increase the bandwidth of a single load/store unit by increasing the number of bits read from memory. By making the load/store unit 64-bits rather than 32-bits designers can double the bandwidth. However, this requires that application programmers be able to re-order data in memory to take full advantage of the additional bandwidth. The performance of the applications suffers if the data in memory can't be re-ordered.

According to an aspect of the invention, therefore, the generation program allows the processor to have up to 3 load/store units 208. The actual maximum number of load/store units that can be provided is a design choice, but since they are expensive, three is considered sufficient for most applications. For each load/store unit, TIE will make available a complete set of interface signals (see co-pending application TEN-016, Ser. No. 10/146,655, excerpted below, for more details) that indicate what memory location to access and various properties—such as how many bytes are required, whether to read or write the data, whether the data should rotated, sign-extended or aligned, and so on. Thus a single instruction can access multiple memory locations with different attributes.

FIG. 4 is a block diagram of an example implementation of a load/store unit 208 (configured to do both loads and stores). Each unit is configured independently and therefore can have different characteristics. Each unit also, to a large extent, operates independently from other load/store units.

As shown in FIG. 4, each load/store unit can include a load datapath 402 and a store datapath 404. The load datapath 402 is responsible for selecting the correct data from multiple sources (local memories, external memories, previous store data) and correctly rotating and aligning the data before forwarding it to the TIE-generated datapath. The store datapath 404 is responsible for combining and merging the store data and then providing the data to the local and external memories. Since loads have priority over stores (the processor must wait for the results of a load but it does not wait for a store to complete) the processor buffers stores in the store buffer 406 until there is an empty cycle when the data can be written. The store buffer 406 is described in more detail below.

Figure 8:
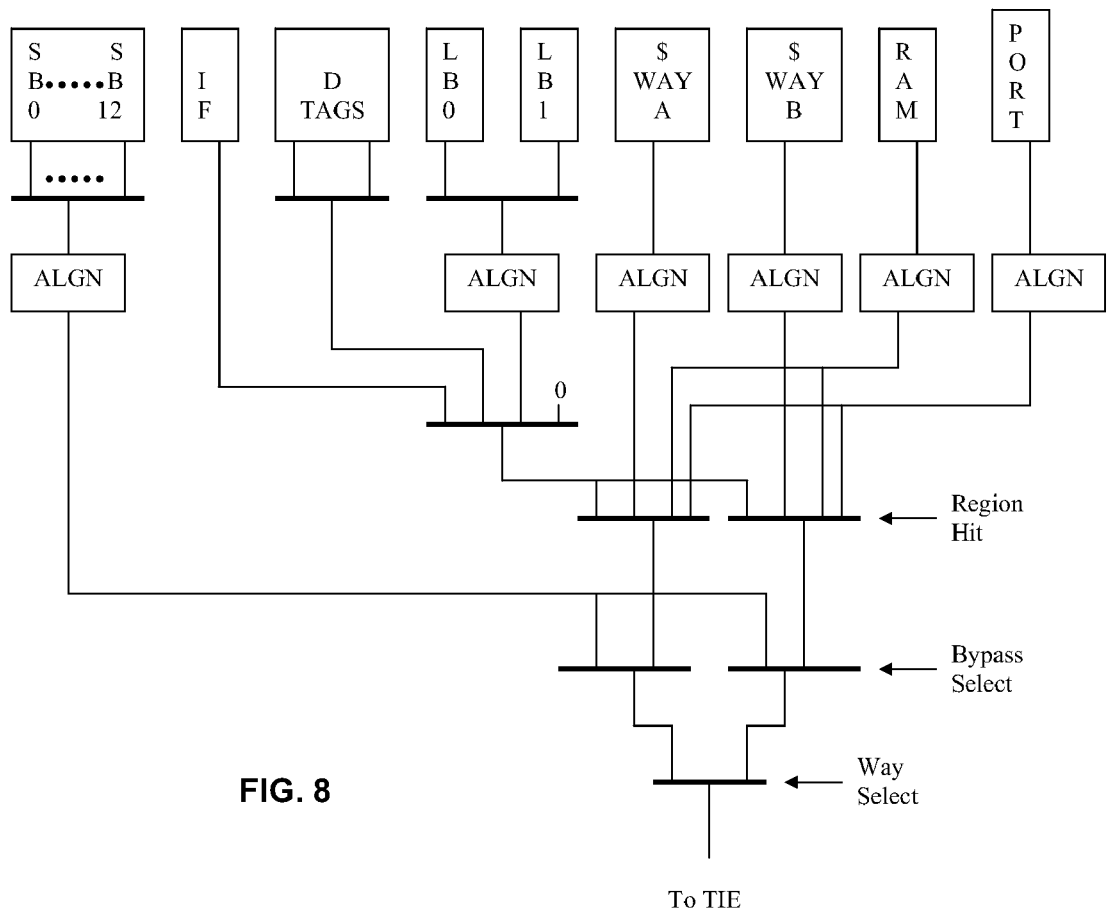
FIG. 8 is a block diagram illustrating an example of load alignment logic in accordance with the principles of the invention.

As further shown in FIG. 4, and as set forth above, the interface signals for each load/store unit (Sign, Rotate, Size, and Align) are derived from the user-specification, i.e. the TIE source code. The system of the prior patent and applications only allowed the user specification to control the operand size. If the instruction required sign-extension, rotation or alignment it had to be implemented by the user using TIE. By making these interface signals available it is now possible for user-defined instructions to share the core processor hardware. Furthermore, the core processor hardware can implement this functionality more efficiently. In the generated processors, load data can come one of several memories (DataRAM, DataROM, or a set-associative cache). This requires that the processor first detect a hit (i.e. determine which memory the access is to) and then select the appropriate data. In the case of a set-associative cache detecting a hit can take significant percentage of the cycle time as the processor must compare the tags of each way (a 20-bit comparison). One common trick used in processor design is to perform sign extension/rotate/alignment while the tag compare is going on. This requires that the sign-extend/rotate/alignment hardware be replicated for each memory (4 times in the case of a 4-way set-associative cache). Once the tag comparison is available the processor can select the final data rather than the raw data. This is a common feature in most processors. However, the system according to the invention is unique in allowing the user to directly control the sign-extend/rotate/alignment hardware using TIE. This not only saves hardware (as the user does not have to re-implement the same functionality) but also allows higher operating frequencies. An example implementation of how the aligner logic can be implemented in the load datapath is illustrated in FIG. 8, where each "way" corresponds to a different local memory. Those skilled in the art will understand how to implement the logic for the other load interfaces based on this example.

Although not shown in FIG. 4, the ByteDisable interface further allows for conditional execution of loads/stores. If the user TIE code sets all the ByteDisable bits to true the hardware will ignore the memory operation. The core processor will execute other aspects of the core but the load or store will be completely ignored. This allows enables the user to provide more efficient instructions.

Many applications have unequal read and write bandwidth. Particularly, most applications read more data then they write. For example, an application might read two numbers, perform an operation (e.g. add) and then store a single number. Since load/store units are very expensive, the present invention allows the designer to tailor the processor for the application by selecting whether a unit is a load, a store, or a load/store unit. In the above example, it might be sufficient to have a load unit and a load/store unit (which is cheaper than two load/store units). If a unit is configured as a load unit (i.e. it is not capable of performing stores) then the store datapath 404 and store buffer 406 are not needed. Conversely, a unit configured only as a store unit will not include the load datapath 402. Selection of the RTL code (for the hardware model) and of C code for the ISS is done using the preprocessing language. An example module declaration for a load/store unit 208 is provided in Appendix A, where the lines starting with a semicolon are interpreted by the pre-processor.

For some applications, the different load and store units do not necessarily need to access the same memories. According to the present invention, therefore, each load/store unit can be configured to access memories independently. In other words, the generated processor 200 can have an arbitrary network topology between the memories 210 and the load/store units 208. For example, as shown in FIG. 5A, it is possible to have a fully connected network, where every load/store unit 208 is connected to every memory 210, or a one-to-one connection topology as shown in FIG. 5B, where each load/store unit talks to only one memory, or any combination in between. Like other features this is also accomplished using the pre-processing language.

For processors with a connection topology such as FIG. 5A in which more than one load/store unit can be connected to the same memory, it is necessary to add additional read and/or write ports to the memory (whether the ports need to be read and/or write depends on the characteristics of the load/store units). For example, a system that connects two load/store units to a single memory will require two read/write ports for the memory. However, replicating memory ports is expensive—often adding one port will double the size of the memory. A cheaper way to mimic multiple ports is to use a banked memory system. In a banked memory system the memory is broken-up into smaller chunks (or banks). Which bank is activated depends on one (or more) bits of the address. Since each bank has one port it is possible to make multiple accesses in one cycle—as long as the accesses are to different banks. The hardware that maps between p port to b banks is connection box (CBox) 408.

According to one aspect of the present invention, the processor generation system can generate a CBox for an arbitrary number of ports and banks using any of the bits in the address to do the bank selection. Furthermore, the system can configure the CBox to support memory banks with single cycle or two cycle latency. The memory latency determines how many requests can be outstanding. In a banked memory system with 2 ports and two banks only one request can be pending. If the latency is 2 cycles, then there can be up to three pending requests. The finite state machines that sequence the requests need to be more sophisticated and this requires more buffering to be able to hold all the information for each request. An example of the Verilog code defining a CBox according to one possible implementation is attached as Appendix B. Lines starting with a semicolon (";") are interpreted by the preprocessor. Lines between =head1 or =head2 and =cut are documentation. As can be seen in this preferred example, the characteristics of the CBox are configurable on user selections such as number of connected load/store units, number and size of banks, bank select based on arbitrary bits of the memory address, and number and type (read, write or read/write) of bank ports.

If both ports access the same bank one of the ports must wait for the first port to complete before it can access the memory. The disadvantage of banking is the memory latency is no longer deterministic. If the ports access independent banks then the access can continue as before. If two (or more) ports access the same bank some of the ports will have to wait. Furthermore, more hardware is required to select which port has access to which bank and to correctly route the addresses and the data.

As with the instruction memory as described above, the present invention is capable of generating processors that can access data memories with variable latency. The processor has the ability to stall when the data memory is not available. The processor also incorporates the hardware required to correctly route the addresses and data to/from each bank plus the logic required to detect and resolve conflicts (via the stall mechanism). In one example, this is included in the CBox. The performance of a banked memory system depends on the particular access pattern. It is possible that no accesses ever stall or that every access must stall. To help the user determine the performance of their system the current invention adds modeling of the CBox to the instruction set simulator. In this way the user can determine the performance of their application.

Furthermore, the processor can assume the memory access time is more than a single cycle. If the memory access time is longer than 1 processor clock the processor can pipeline multiple accesses so that the memory can be accessed more efficiently. This is more efficient than causing the processor to stall on every access. Even if the access time is longer than 1 clock it is still possible to stall the processor if the data is not available.

Figure 6:
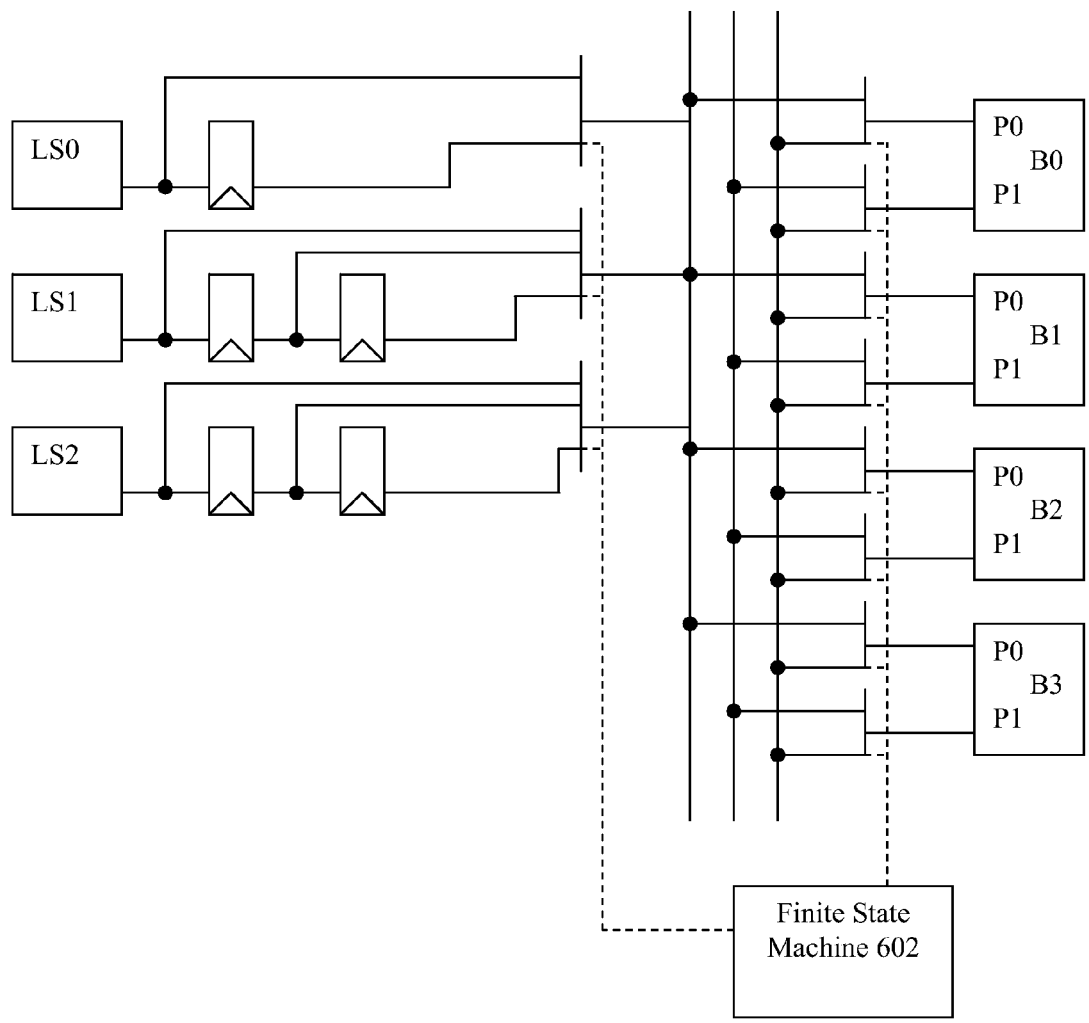
FIG. 6 illustrates an example implementation of the address path for a connection box according to the invention.

An example implementation of the address path for a connection box is shown in FIG. 6. As shown in FIG. 6, if only one or two of the load/store elements (LS0-2) make simultaneous requests from the memory in one cycle, the CBox will route the request to the appropriate banks by manipulating muxes in the paths therebetween via finite state machine (FSM) 602. Since each bank has two read/write ports no conflicts can occur. Conflicts can arise when all three load/store units make a request simultaneously and all the requests are to the same bank. In this case the FSM 602 in the CBox will allow the request from LS0 to proceed and will hold the requests from LS1 and LS2. Once the data from the LS0's request becomes available it is held in a register so that the data for all three requests can be returned to the core processor at the same time.

One challenge of implementing multiple load/store units is how to keep stores in program order. If unit 0 does a store followed by a store on unit 2 it is necessary to ensure that the data gets written to the memory in the correct order. However, in most application the order of most stores does not matter. It is only the order of stores to some memory locations (such as the addresses of memory-mapped devices) that must be kept in program order. The present invention takes advantage of this by allowing most stores to be out of order. If stores must be kept in order (the machine tells the difference based on the attributes of the memory region) the performance of the processor degrades slightly.

Another challenge in implementing a processor with multiple load/store units is how to forward store data to subsequent accesses across units. For example, assume that unit 0 writes 4 bytes starting at memory location 0x0. At the same time unit 2 also writes 4 bytes starting at memory location 0x4. On a subsequent cycle unit 1 does an 8 byte read from address 0x0. Since the data may not available in memory yet (it may still be in the load/store units) it is necessary for units 0 and 2 to forward the store data from previous cycles to unit 1. Furthermore unit 1 must combine the store data to form the read data. In the generated processors store data is forwarded from the store buffer. Since the store buffer does combining and merging it guarantees that at any point in time only one entry in the store buffer can match the load address.

Figure 7:
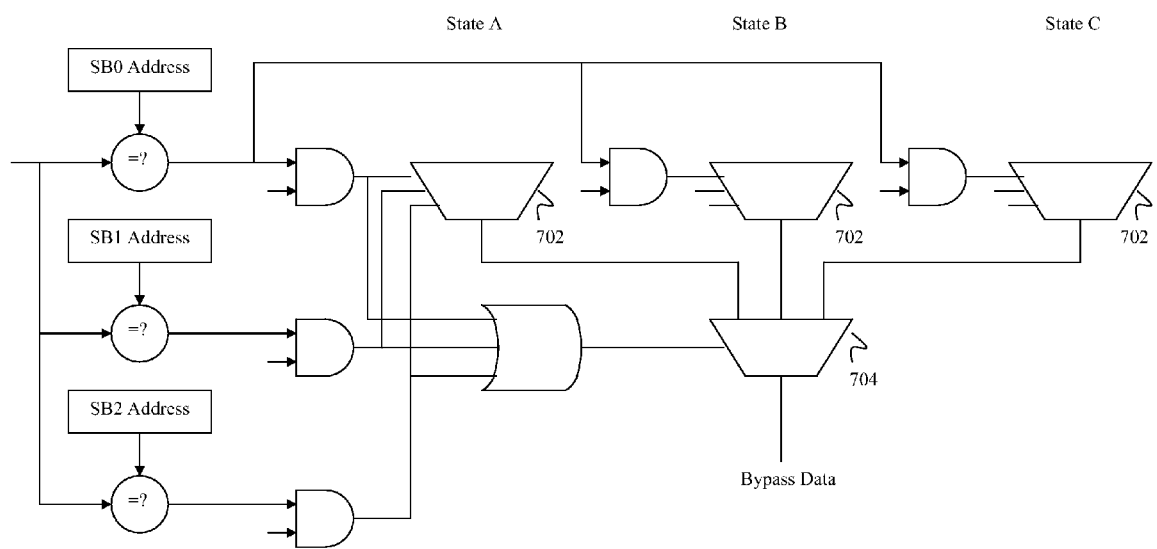
FIG. 7 is a block diagram illustrating an example of the logic for performing store to load bypass according to the invention.

FIG. 7 is a block diagram of the logic required for store to load bypass. As shown in FIG. 7, the store to load bypass hardware must determine if there is an address match (i.e. the store writes the same memory location the load is trying to read). Furthermore it must determine which is the last store to have written that location (there can be multiple stores to the same location in the store buffer). The current implementation takes advantage of the fact that store buffer entries can only be in one of three states (in this example, the three states labeled A=pending, B=dispatch, and C=bypass, correspond to whether the request to the memory has not been made, is being made this cycle, or has already been made but not acknowledged, respectively) and only one match can occur for each state. Bypassing is done by first comparing the address of the load with the address of each store buffer entry.

There are then 3 N–1 muxes 702 (where N is the number of entries in the write buffer) that select the entry (if any) that matched for that state. Depending on whether any entry matched for a given state a second level 3-1 mux 704 selects the appropriate entry to be bypassed. Priority between the states can be statically determined (pending has priority over dispatch, which has priority over bypass). To further reduce the cost of the machine the current invention allows the user to specify the depth of the store buffer 308. This unit is located between the processor pipeline and the local memories. It holds store data until it is committed to one of the local memories. Most machines fix the depth of the store buffer at the maximum number of stores that can be in the pipeline. The present invention allows the designer to increase the depth of the store buffer (if there are frequent stalls) or to reduce the depth (if stores are seldom clustered).

The store buffer holds store data (and attributes) until they can be forwarded to the appropriate memory. Conceptually the store buffer must act like a FIFO, although in practice not all stores must be done in FIFO order. Only stores with special attributes need to be kept in strict order. This allows simpler (i.e. smaller) hardware and helps performance. The store buffer is also responsible for merging data from the various load/store units and combining store data across different instructions. This helps reduce bus traffic on the external interface and helps in detecting when to forward data from stores to loads.

Vector Co-Processor for Configurable and Extensible Processor Architecture

The following description has been excerpted from related U.S. Patent Application TEN-014 No. 10/145,380.

Figure 9:
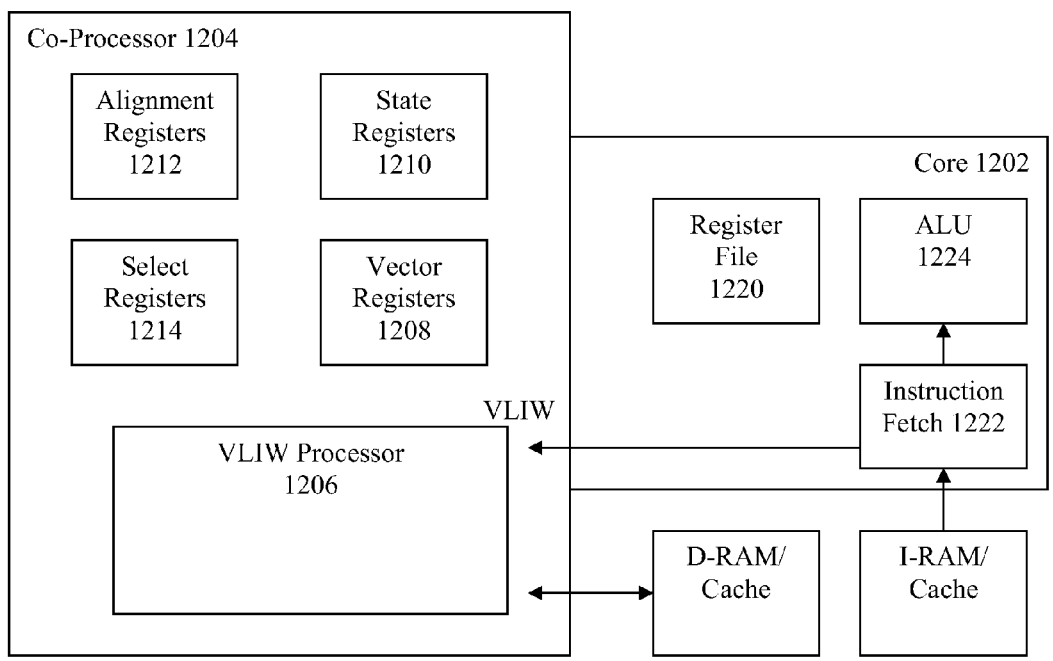
FIG. 9 is a block diagram of a processor including a co-processor according to the present invention.

FIG. 9 is a top-level diagram illustrating an example implementation of the invention. As shown in FIG. 9, the processor of the present invention includes a processor core 1202 and a vector functional unit (i.e. vector co-processor) 1204. In one example, processor core 1202 is implemented by a high performance RISC processor such as that described in U.S. Pat. No. 6,282,633, with improvements and enhancements as provided above and in co-pending application TEN-016, Ser. No. 10/146,655 (see excerpt below). As will become more apparent from the descriptions below, while the processor of U.S. Pat. No. 6,282,633 allowed for up to two different instruction sizes (16- and 24-bits, for example), the processor of the present invention allows for three instruction sizes, with the third and largest (VLIW) instruction size (e.g. 64-bits) being provided for execution by co-processor 1204.

Co-processor 1204 includes vector processing and VLIW capabilities that are new in the art and are implemented by, for example, TIE and extensibility features such as those described in the processor generation system of the prior patent applications, as well as additional processor extensibility and configurability improvements provided above and in co-pending application TEN-016, Ser. No. 10/146,655 (see excerpt below). In one example embodiment, co-processor 1204 can perform up to three vector operations in every instruction. Although the capability of performing vector operations can be found in previous processor architectures, the combination of features of co-processor 1204 of the present invention is rather unique, as will become more apparent from the descriptions below. Such features include, for example, the ability to efficiently code most of the non-performance critical code in compact 16/24-bit format, while allowing VLIW instructions for the processor-intensive application kernels.

In accordance with an aspect of the invention, co-processor 1204 includes a VLIW processor 1206. In one example, the VLIW processor executes a 64-bit wide instruction that can combine up to three operations per instruction. Further in accordance with the principles of the invention, co-processor 1204 is a Single Instruction Multiple Data (SIMD) processor, in which each operation operates on a "vector" data operand from vector registers 1208. The vector data operand can include a configurable number of scalar operands, all of which get processed by the same instruction. In one example implementation, a vector consists of eight scalar data elements. The combination of VLIW and SIMD processing techniques on this processor provides a significantly higher level of performance compared to DSP processors that use only one (or none) of these techniques.

Figure 10:
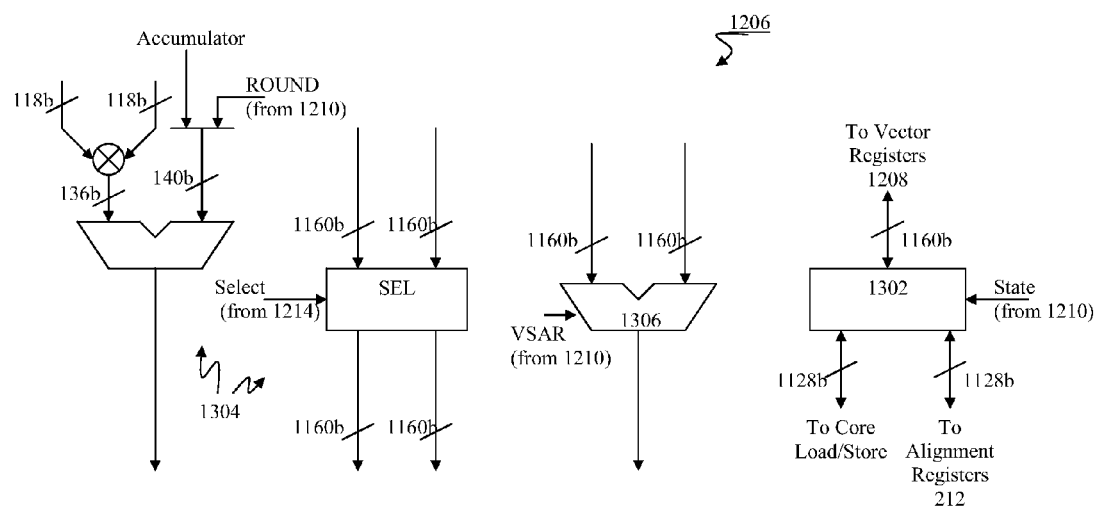
FIG. 10 illustrates a VLIW processor that can be included in a co-processor in accordance with an aspect of the invention.

FIG. 10 illustrates one possible example of VLIW processor 1206 in further detail. As shown in FIG. 10, unit 1206 includes a co-processor load/store unit 1302 that executes load/store operations from/to memory, possibly in conjunction with a core processor load/store unit, and further in accordance with values in state registers 1210 (e.g. CBEGIN and CEND) and alignment registers 1212, a MAC/select unit 1304 for performing multiply/accumulate operations and selection operations, possibly in accordance with values in select registers 1214, an ALU/Shift unit 1306 for performing arithmetic/logic and shift operations, possibly in accordance with values in state registers 1210 (VSAR). It should be noted that MAC unit 1304 is shown as only including one multiplier, it can contain several, and in an example embodiment described in detail below, it includes four multipliers. The implementation details of the basic load/store functionality of processor 1206 are described above and so such details will not be repeated here so as not to obscure the present invention. The implementation details of additional functionalities of processor 1206 will become apparent from the descriptions provided herein, with appropriate references to the co-pending applications and appendices that are incorporated herein. According to one aspect of the invention, such functionalities of units 1302, 1304 and 1306 are implemented by adding co-processor instructions that are described using TIE language extensions, which language and extensions are detailed in the prior and co-pending applications, and will be described in more detail below.

Figure 11:
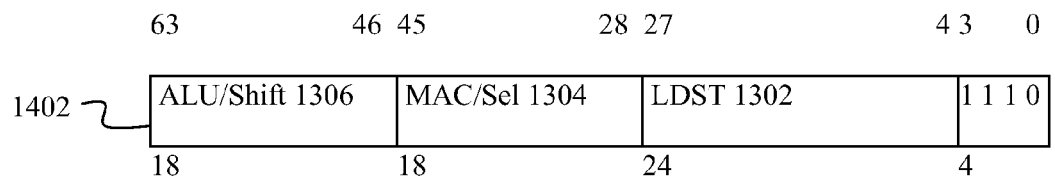
FIG. 11 illustrates an example structure of a VLIW that can be used in the co-processor of the present invention.

In one possible example implementation of co-processor 1204, a 64-bit instruction word is coded to specify three independent operations. It should be noted that other large instruction sizes and number of independent operations is a design choice, and so the invention is not limited to these selections. The general format of a 64-bit/3 operation example of a co-processor instruction word is shown in FIG. 11. As shown in the example of FIG. 11, when the least significant four bits of the instruction take the decimal value 14, this corresponds to the instruction space used to define the co-processor instructions.

Once bits [3:0] of an instruction are decoded by instruction fetch unit 1222 to indicate a co-processor instruction, the remaining bits are interpreted to execute in co-processor 1204 as follows:

The next 24 bits of the instruction word (bits [27:4]) define the first instruction slot, which contains a co-processor load/store instructions for unit 1302.

The next 18 bits of the instruction word (bits [45:28]) define the second instruction slot, which contains the Multiply-Accumulate (MAC) instructions for MAC unit 1304 (as well as certain select instructions, in conjunction with an advantageous implementation of the invention as will be described in more detail below).

The final 18 bits (bits [63:46]) define the third instruction slot, which contains the ALU and shift instructions for ALU unit 1306.

Details of one example of how VLIW instructions with separate instruction slots as described above can be added in the processor architecture of U.S. Pat. No. 6,282,633 and the prior patent applications are provided in co-pending application TEN-016, Ser. No. 10/146,655 (see excerpt below). From those descriptions, as well as the examples provided herein, those skilled in the art will be able to practice the invention with different VLIW bit sizes and numbers of instruction slots per VLIW instruction.

Referring back to FIG. 9, co-processor 1204 further includes alignment registers 1212, state registers 1210 and select registers 1214. An example implementation of the state registers 1210 and three register files 1208, 1212 and 1214 are summarized in TABLE 1 below.

TABLE 1

| Name | Size | Function |
| --- | --- | --- |
| State | | |
| -VSAR | 5 bits | Vector Shift Amount Register |
| -ROUND | 40 bits | Rounding value |
| -CBEGIN, CEND | 32 bits each | Virtual address registers for circular buffer support |
| Vector | 16 × 160 bits | General purpose register file |
| Alignment | 4 × 128 bits | Register file to accelerate unaligned loads and stores |
| Select | 8 × 64 bits | Vector SEL and DSEL control values |

As shown in TABLE 1, an example implementation of state registers 1210 includes a VSAR register, a ROUND register, a CBEGIN register and a CEND register. The VSAR state register is a 5-bit register that specifies the shift amount for variable shift operations. The ROUND state register is a 40-bit register that stores a rounding value that is typically added to a data element stored in a higher precision format before it is converted into a lower precision format. CBEGIN and CEND are both 32-bit registers that store the beginning and end address of a circular buffer in memory. These registers are used in conjunction with special co-processor load and store instructions that provide automatic wrap around of addresses at the circular buffer boundary.

In this example embodiment, the vector register file 1208 includes sixteen 160-bit registers. These are the operand registers for all the co-processor data processing instructions. Load instructions load data into these registers and store instructions store the contents of these registers to memory. This register file has six read and three write ports as shown below in TABLE 2. Of these ports, one read and two write ports (indicated with an asterisk in the table) are paired read/write ports. A paired read port is one that can read two adjacent registers in one access and a paired write port can write two such registers in one access. These ports are used for certain instructions (such as the multiply instruction) that have operands spanning two registers.

The alignment register file 1212 is a special purpose register file used to accelerate the loading and storing of unaligned data to/from the general purpose register file, as will be described in more detail below. There are four registers in this file, each of which is 128-bits wide. The alignment register file has one read and one write port.

The select register file 1214 is a special purpose register file used in conjunction with the select (SEL) and dual select (DSEL) instructions. These instructions rearrange the data from the source vector registers into the destination vector register, as will be described in more detail below. The select register file specifies the selection control values for this rearrangement. There are eight registers in this file, each of which is 64-bits wide. The select register file has two read ports and one write port.

TABLE 2 below summarizes the number of read and write ports between the various register files and the different units in each unit 1206 according to one example implementation.

TABLE 2

| | VEC 208 | ALIGN 212 | SEL 214 |
| --- | --- | --- | --- |
| LDST 302 | 1r, 1w | 1r, 1w | 1r, 1w |
| MAC 304 | 3r*, 1w* | 0r, 0w | 1r, 0w |
| ALU 306 | 2r, 1w* | 0r, 0w | 0r, 0w |
| Total | 6r, 3w | 1r, 1w | 2r, 1w |

In a preferred implementation, co-processor 1204 processes fixed point data. For example, the basic data element (i.e. a scalar) can be 16 bits wide, and a vector can consist of 8 such elements. Thus an input vector in memory is assumed to be 128-bits wide. Co-processor 1204 can also support a wider data type that is twice the width of the basic data type i.e. 32-bits, and thus there are four such elements (i.e. scalars) in a vector. This double width data type can be generated as a result of multiply or multiply/accumulate operations on the narrow data type, as will become more apparent from the descriptions below.

Figure 12:
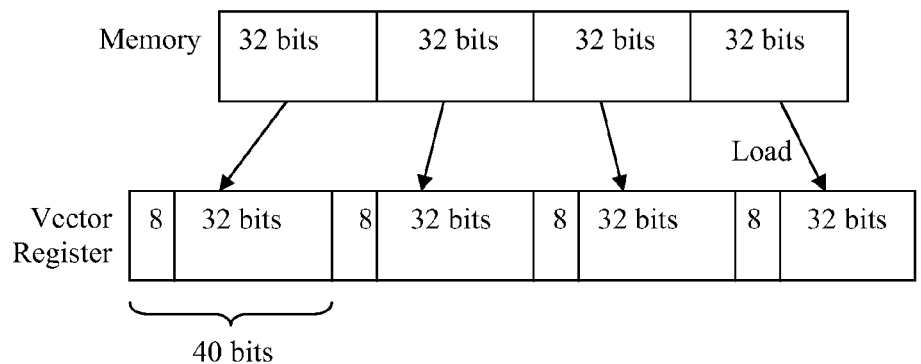
FIG. 12 illustrates an example of how an input vector in memory can be loaded into a vector register according to one aspect of the invention.

According to one aspect of the invention, as shown in FIG. 12, when a 128-bit vector is loaded from memory into one of vector registers 1208, it is expanded to 160-bits. The 32 extra guard bits provide higher precision for intermediate results of computations. For example, during a load operation, a 16-bit scalar in memory is expanded to occupy 20-bits in the register, and a 32-bit scalar from memory is expanded to 40-bits. Co-processor 1204 can support both signed and unsigned data types, and provides a symmetrical set of load and store instructions for both these data types. For signed data, a load results in sign extension from 16 to 20 (or 32 to 40) bits, whereas for unsigned data the load results in zero extension. A store operation results in saturation of data if the register value is beyond the range of values that can be represented in memory. Because of the presence of guard bits and the semantics of the load and store instructions, the data processing instructions of co-processor 1204 (such as the ALU and MAC instructions) all treat the data as signed. This allows the co-processor to correctly process unsigned data as long as there is no overflow into the most significant bit of the elements of a vector register. It thus becomes the responsibility of the programmer to ensure that the input data is scaled appropriately to prevent such an overflow when processing unsigned numbers. Those skilled in the art will note that this problem is similar to the general problem of preventing overflows in any fixed point processor.

It should be noted that a large number of DSP algorithms use 16-bit, fixed point data. However, in some situations, the input and output data may be specified with only 8 bits of precision, but the computation needs to be done with 16-bit or more precision. This allows for a higher dynamic range for intermediate results, which improves the accuracy of the computation. In order to facilitate this requirement, the co-processor 1204 of the invention supports loading of 8-bit data into a vector register, and then in a single instruction, sign extend (or zero extend) this data to 20-bits and store the results into two vector registers. This is done immediately following a load and before any computation is performed. Similarly, after all the computations have been performed (in 20-bit precision), a single instruction takes data values from two vector registers, saturates the data values to 8-bit precision and stores the result in a single vector register. This operation is performed as the last step of the computation, just before the results are stored to memory.

In accordance with the above, co-processor 1204 includes a special instruction (LEXP8S/LEXP8U, an example of which is attached as Appendix D) that is used to sign extend or zero extend each 8-bit value into a 20 bit value, and the result of this operation is now stored in two adjacent vector registers. All subsequent processing inside of co-processor 1204 then happens on the 20-bit representation. These operations are illustrated in FIG. 15. Finally, another special instruction (PACK20S/PACK20U) can be issued to convert this 20-bit data from the two vector registers into 8-bit data in a single vector register before it is written out to memory.

The aspects of the alignment registers 1212 in accordance with the invention will now be described in more detail. In particular, a vector processing engine preferably includes means to efficiently load and store vectors of data from/to memory. In many cases, however, this is complicated by the fact that the data in memory is not aligned to the size of the vector. Loading and storing of such "unaligned" data from/to memory is generally inefficient. For example, in a memory comprised of a fixed word size, desired vector data of the fixed word size may exist at an offset from the word boundaries, such that the desired data exists in two adjacent locations in the memory. Thus, in order to load the desired vector from memory, first the data must be loaded from the two different memory locations into two different processor registers, then subsequent shift instructions must be performed on both registers to align the data in the two registers. Then another logical OR operation must be performed to merge the two data registers into a single register.

According to one aspect, the co-processor architecture of the present invention provides an efficient mechanism for accessing unaligned data in memory. This is done through the use of alignment registers 1212 and a set of load and store instructions that in the steady state provide a throughput of one unaligned load/store per instruction. The design of these unaligned load/store instructions is such that the same instruction sequence can be used to access the data, whether the data is aligned or unaligned (to the vector size) in memory. It is thus not necessary to check for alignment before initiating such load and store instructions. This reduces code size and improves runtime performance. Another very important advantage of this design is that it can be used in situations where the alignment of the data in memory is not known a priori—the code sequence works in either case.

In the example design set forth above, each "vector" consists of eight 16-bit elements. A single 16-bit element will be referred to as a scalar, while the set of eight consecutive 16-bit elements are referred to as a vector. The scalar size is 16-bits or 2 bytes, and the vector size is 128-bits or 16 bytes. A vector that is stored in memory is considered to be "aligned" if its start address (in bytes) satisfies the condition "address modulo 16=0". Thus vectors stored at byte address 0, 16, 32, 48, 64, 96, 128 etc. are said to be aligned. Given a 128-bit or 16 byte wide interface to memory, such a vector can be loaded from memory into the processor register in a single memory access.

Figure 13:
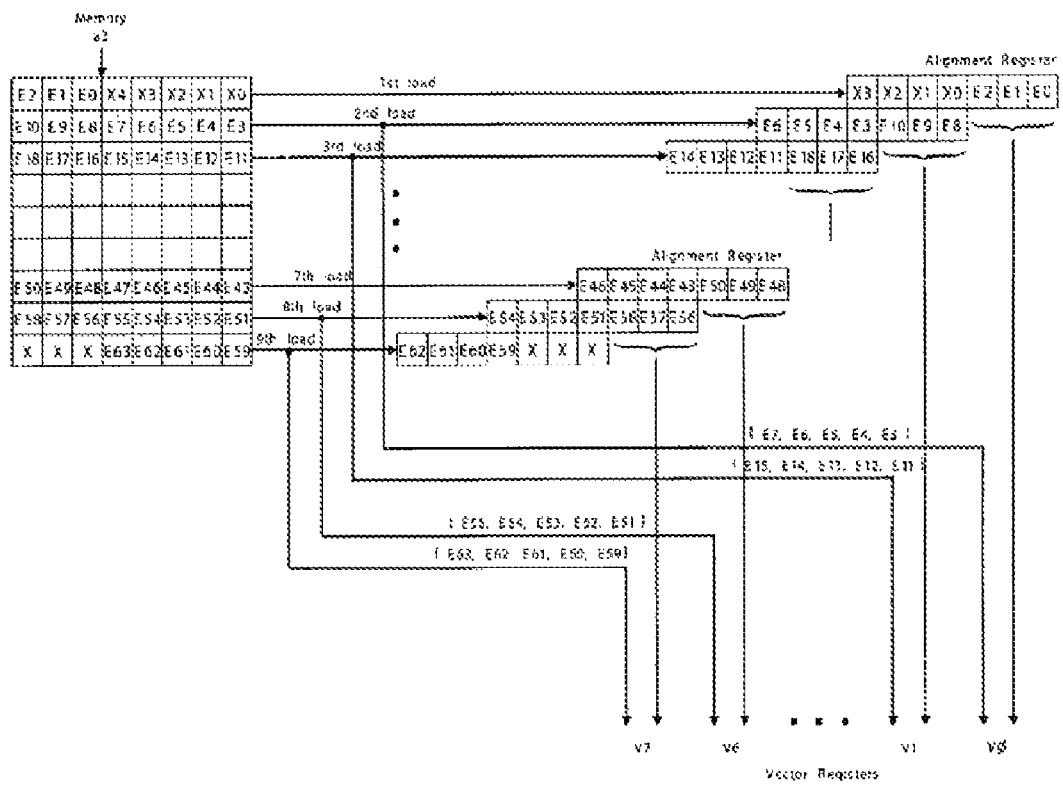
FIG. 13 is a diagram illustrating features of the alignment registers of the co-processor in accordance with an aspect of the invention.

Consider the problem of loading an unaligned vector from memory. As shown in FIG. 13, refer to elements E0-E7, E8-E15 etc., each of which represents a vector that is not aligned in memory. The following illustrates how an unaligned load operation is performed using the architecture of the present invention in a more optimal fashion. The processor initiates a vector load from the address corresponding to element E0. The memory will always read data from an aligned address, so it reads the values {E2, E1, E0, X4, X3, X2, X1, X0}. However, the load/store unit of processor core 1202 includes special logic in the load data path that detects the fact that the load was initiated on the address corresponding to E0, and not to the aligned address corresponding to X0. This logic then rotates the data so that the data coming into co-processor 1204 is now {X4, X3, X2, X1, X0, E2, E1, E0}. This data is loaded into the alignment register, which is a special "temporary store" for such data. In one embodiment of the current invention, the alignment registers are only 112 bits wide, and hence the values {X3, X2, X1, X0, E2, E1, E0} are stored in the register while the value X4 is discarded. The next vector load is initiated from the address corresponding to element E8, which is the address of element E0 incremented by the vector size (16 bytes). This load reads the values {E10, E9, E8, E7, E6, E5, E4, E3} from memory, which gets rotated to become {E7, E6, E5, E4, E3, E10, E9, E8}. At this time, the logic in unit 1302 will combine the values E7-E3 of the load data bus, with values E2-E0 from the alignment register to form the vector {E7, E6, E5, E4, E3, E2, E1, E0} and load this value into vector register file 1208. At the same time, the alignment register is also updated with values {E6, E5, E4, E3, E10, E9, E8}. In the very next cycle, one could load E15-E11 from memory, combine it with E10-E8 from the alignment register and end up with E15-E8 in another vector register. Thus, if loading an array of vectors, one is able to perform an unaligned load every clock cycle. The only overhead was the very first load which is called the "priming load" since it is used to initialize the alignment register, or for "priming the pipeline."

Provided below is an example code sequence that could be used to load an array of unaligned vectors from memory:

```
LV16A.IU v0, u0, a3, 16      // Prime alignment register u0
LOOP       a4, .Loopend       // Execute loop code a4 times
    LV16A.IU v0, u0, a3, 16   // v0 <- next unaligned vector
    ............              // Code to process loaded data
    ............              // Code to store computed
results
.Loopend:
```

TIE code for implementing an example unaligned load instruction such as LV16A.IU is provided in Appendix E.

In this instruction, v0 represents the vector register into which the unaligned vector is loaded, and u0 represents the alignment register to be used. The operand a3 represents the address register, and 16 is the offset value that gets added to the address register (a3) to form the final address for the load. Note that the instruction uses the "auto increment" addressing mode which means that address register a3 is automatically updated to point to the next vector in memory on completion of the load. Note also that this example program code uses a hardware loop construct such as that described in U.S. Pat. No. 6,282,633.

It was mentioned that in one embodiment of the present invention, alignment register 1212 is only 112-bits wide, even though the data we load from memory is 128 bits. It may be noted from FIG. 13 that only elements E2-E0, E10-E8 etc. of the alignment register are being used, and the rest of the elements are discarded. For an 8-element vector, the address can be unaligned by a maximum of 7-elements, and this is the maximum number of elements that would be used from the alignment register. Thus, in order to save hardware cost, the alignment register is designed to be only 7-elements, or 112 bits wide.

It should be noted that the code sequence shown above only works when the address (in address register a3) is known to be unaligned. Specifically, the code will load the incorrect vector values if the address is aligned to a 16-byte boundary. The problem is that the first unaligned load instruction (which is outside the loop) should only be executed if the address is unaligned. Thus in a situation where the alignment of the address is not known a priori, the updated code sequence would be as follows:

```
EXTUI     a8,a3,0,4           // extract least significant 4
                              // bits of address into a8
BEQZ      a8,.Laladdr         // If (a8==0) we are aligned to
                              // vector boundary, so branch
LVS16A.IU v0,u0,a3,16         // we are not aligned, so prime
                              // the alignment register
.Laladdr:
    LOOP      a4,.Loop_end
        LVS16A.IU v0,u0,a3,16
        ............
        ............
.Loop_end:
```

In the above code sequence, the first two instructions check if the address is aligned to a 16-byte boundary. If the address is aligned, a branch to the label Laladdr is made and the priming load instruction is skipped; otherwise the priming instruction is executed. The rest of the code remains the same as in the previous example.

In software applications and application libraries written in high level programming languages such as C and C++, it is common practice to pass data through memory pointers. In most such situations, the compiler cannot determine if the memory address pointers are aligned or not. As shown in the example code above, under these circumstances one will need to execute the two additional instructions and potentially suffer a branch penalty.

An aspect of the present invention is providing an innovative technique to address the above problem. Consider a special priming load instruction that is slightly different from the LVS16A.IU instruction described above. This instruction, LVS.P, takes only two input operands—an alignment register (u0, for example) and an address register (a3, for example). If the address in the address register is not aligned to a 16-byte boundary, the instruction serves the same purpose as the first LVS16A.IU instruction in the above code. It initializes the alignment register and increments the address register to point to the next vector in memory. If on the other hand the address is aligned to a 16-byte boundary, this instruction would do nothing—thus it would be the equivalent of branching over the LVS16A.IU instruction. The unaligned load code can now be rewritten as follows:

```
LVS.P u0,a3                   // Special priming load
LOOP a4, .Loop_end
    LVS16A.IU v0,u0,a3,16     // Regular unaligned load
    ............
    ............
.Loop_end:
```

The special priming load instruction thus allows generation of more compact code, and also avoid a branch penalty. This is especially useful for code generated by a compiler, where the alignment of the address may not be known a priori. The priming load instruction is even more useful when it itself is inside a loop i.e. it needs to be executed repeatedly.

The problem of storing unaligned vectors to memory will now be described in more detail. With reference to FIG. 13, consider vector register v0 which contains {E7', E6', E5', E4', E3', E2', E1', E0'} which will be written over elements E7-E0 in memory. Address register a3 points to the first element of this vector, namely E0. The process starts by executing an instruction, SVA.P, which is similar to the priming load instruction explained earlier (an example TIE code implementation is provided in Appendix G). This results in the alignment register being loaded with {X4, X3, X2, X1, X0, E2, E1}. Note that in this case we have discarded element E0 instead of element X4 as in the case of the LVA.P instruction.

The next instruction to be executed is the unaligned store instruction, SVS16A.IU (an example TIE code implementation of which is provided in Appendix H). This instruction will take X4-X0 from the alignment register, combine it with E2'-E0' from the vector register to form {X4, X3, X2, X1, X0, E2', E1', E0'}. This data is rotated on its way out (just as the load data was rotated on its way in), to become {E2', E1', E0', X4, X3, X2, X1, X0} and this is what is written to memory. Note that the old values E2-E0 were updated with the new values E2'-E0', while the values X4-X0 remain unchanged. Further, as part of the unaligned store operation, the alignment register gets updated with the value {E7', E6', E5', E4', E3', E2', E1'}, and the address register gets updated to point to the next vector in memory (starting at E3). Thus the next unaligned store instruction will combine E7'-E3' from the alignment register with E10'-E8' from the vector register to write the next vector to memory. From now on, there is a throughput of one unaligned store operation per instruction. At the very end, after the last unaligned store operation, there will be some elements left in the alignment register that need to be "flushed out" to memory. With reference to FIG. 13, this would be elements E63'-E59'. In one example of the present invention, a special instruction, SVA.F, known as the "store flush" instruction, is provided (an example TIE code implementation of which is attached in Appendix I). This instruction takes an alignment register and an address register as its input operand. If the address is not aligned to a 16-byte boundary, it does a partial store of the contents of the alignment register to memory—specifically in this case it will write elements E63'-E59' to memory. If on the other hand the address is aligned to a 16-byte boundary, the store flush instruction does nothing. Based on the above discussion, the following code sequence is one example of how to do a series of unaligned stores to memory:

```
SVA.P u0,a3                   // Priming store (initialize
                              // alignment register)
LOOP a4, .Loop_end
    ............              // Compute the data to be stored
    ............
    SVS16A.IU v0,u0,a3,16     // Unaligned store instruction
.Loop_end:
SVA.F u0,a3                   // Store flush
```

In a manner very similar to the unaligned load operation, the unaligned store implementation performs one unaligned store per instruction after the initial overhead of a single priming instruction, and the final flush instruction.

An improvisation over the above unaligned load/store implementation according to an alternative embodiment will now be described. Note in the above explanation of the unaligned store instruction that the two rightmost elements of the alignment register did not play any role in the execution of the instruction. Elements E2-E1 were loaded into these bits with the priming load, and were then overwritten by E2'-E1' of the unaligned store instruction. These would subsequently be overwritten by E10'-E9' and so on. Consider now that the alignment register is 128-bits wide instead of 112-bits. In this case, the three rightmost elements of the alignment register would not play any role in the execution of the unaligned store instruction—it would have contained elements E2-E0, E2'-E0' etc. which are never used. Note also from the explanation of the unaligned load instruction that these three elements are precisely the ones that get used for the LVS16A.IU instruction. The unaligned load implementation on the other hand does not use the leftmost elements of the alignment register, and these are precisely the elements that get used by the unaligned store instruction SVS16A.IU. Thus for any unaligned address, the load and store instructions use a complimentary set of bits in the alignment register. This means that if the alignment register is designed to be 128-bits wide, and only the relevant bits of the alignment register are updated by the unaligned load and store instructions, then the same alignment register can be used to load as well as store an unaligned stream of data. If the alignment register can be shared, it means that the processor needs fewer alignment registers, which results in cost savings in hardware. The size of the alignment registers is increased from 112-bits to 128-bits in this alternative embodiment, but since this reduces the total number of alignment registers required in the design, it is a worthwhile tradeoff. An example code sequence is given below that can be used to perform a "read-modify-write" operation on an array of unaligned vectors.

| LVA.P | u0,a5 | // Priming Load for loads |
|---|---|---|
| SVA.P | u0,a6 | // Priming Load for stores |
| LOOP | a4, .Loop_end | |
| LVS16A.IU | v0,u0,a5,16 | // Load unaligned vector |
| ADD20 | v0,v0,v1 | // Add a value to the vector |
| SVS16A.IU | v0,u0,a6,16 | // Store unaligned vector |
| .Loop_end: | | |
| SVA.F | u0,a6 | // Flush alignment register |

Thus has been demonstrated a "symmetrical" unaligned load and unaligned store implementation that can share an alignment register, and can be used to very efficiently implement "read-modify-write" type operations on unaligned vector data.

This unaligned store implementation described above makes one assumption that may not be valid in certain systems. Note that the priming instruction SVA.P reads values X4-X0 from memory, and the first unaligned store instruction wrote the same values back to memory. This assumes that the memory contents of X4-X0 did not change between the time they were read by the SVA.P instruction and written by the SVS16A.IU instruction. If this is not true, then the SVS16A.IU instruction ends up corrupting memory. This could especially be a problem in a multi-processor system with shared memory, where making such assumptions could be dangerous. This is a disadvantage of this implementation.

What would be ideal for the unaligned store implementation is that the first unaligned store instruction does a partial store and only updates elements E2-E0 to E2'-E0'. It would not write any data to the locations X4-X0, in much the same way as the flush instruction does a partial store. Unfortunately this is harder to do than is obvious at first glance.

Note that the store flush is a separate instruction that is executed once at the end of the instruction stream, and is outside the loop. What is needed now is that the store instruction, which is inside the loop, should behave differently during the first iteration of the loop (do a partial store) and in subsequent iterations of the loop (do a full store). One way to implement this behavior would be to "unroll" the first iteration of the loop, and create a special store instruction that has the desired behavior. In this case, the code would look as follows:

| ............ | // Compute data to be stored |
|---|---|
| ............ | |
| Special_Partial_Store | // Don't write X4-X0 |
| LOOP  (a4-1), .Loop_end | |
| ............ | // Compute the data to be stored |
| ............ | |
| SVS16A.IU v0,u0,a6,16 | // Unaligned store instruction |
| .Loop_end: | |
| SVA.F  u0,a6 | // Store flush |

The entire code segment inside the loop is repeated once outside the loop and the unaligned store instruction is replaced by the special instruction which does a partial store. The loop is then executed for (N−1) iterations. A disadvantage of this approach is that code size increases due to the unrolling of the loop. In embedded processor applications, having a larger code size is a significant disadvantage and hence the above solution is not a good one.

The present invention provides a unique implementation that does not require the unrolling of the loop and does a partial write in the first iteration of the loop, so as not to disturb the memory locations that should not be written. In this implementation, a "flag" bit is added and associated with each alignment register. Also, the priming instruction (for unaligned stores) is replaced with another instruction called ZALIGN (an example TIE code implementation of which is attached as Appendix J), which will set the alignment register contents along with the associated flag to 0. The new code sequence looks as follows:

| ZALIGN u0 | // Set alignment register & flag to 0 |
|---|---|
| LOOP  a4, .Loop_end | |
| ............ | // Compute the data to be stored |
| ............ | |
| SVS16A.IU v0,u0,a6,16 | // Unaligned store instruction |
| .Loop_end: | |
| SVA.F  u0,a6 | // Store flush |

Every unaligned store instruction is now sensitive to the value of this flag. If the flag is 0, then the unaligned store instruction is executed as a partial store, based on the least significant bits of the address. In the first iteration of the loop, the flag is 0 because it was immediately preceded by the ZALIGN instruction. This causes the SVS16A.IU instruction in the first iteration of the loop to do a partial store to memory. Only the appropriate bits from the vector register (elements E2'-E0' in this example) are written to memory, and memory locations X4-X0 are untouched. Every unaligned store instruction sets the flag value to 1, so after the SVS16A.IU instruction of the first iteration is executed, the flag is set to 1. In the second (and subsequent) iterations, the flag is always set to 1, and hence the store is a full 128-bit store, combining the contents of the alignment register and vector register to generate the write data (elements E10'-E3' in the second iteration of this example).

In one embodiment of the current invention, the "flag" bit is implemented as bit 0 of the alignment register. Note that for unaligned stores, the least significant 16-bits of the alignment register are never used to store data (a fact that was exploited in a design where the alignment registers are only 112-bits wide). This makes it easy to associate the flag bit with the alignment register, and does not require adding any additional register bits to the design. The disadvantage is that no longer can 128 bits of the alignment register be available to store data, and hence the same alignment register cannot be shared between loads and stores. However it should be noted that this is not a fundamental limitation of the invention. It is easy to extend this idea to an implementation that uses all 128 bits of the alignment register to store data, thus allowing it to be shared for loads and stores, and allocate separate storage for the flag bit.

As set forth above, one can use the special alignment registers 1212 when accessing data from unaligned locations in memory. Normally, this requires one alignment register per stream of data being accessed in memory. The design of this mechanism according to the present invention exploits the fact that complementary bits of the alignment register are used by load and store instructions. This allows for the same alignment register to be used for one stream of data being loaded from memory and another stream of data being stored to memory. This feature results in the reduction of the number of alignment registers required in the design, thus providing cost savings.

Further aspects of the select registers 1214 in accordance with the invention will now be described. In this regard, it should be noted that while processing vector data in a SIMD fashion provides performance improvements, this approach also comes with its own unique challenges (as compared to scalar processing). One such challenge is that it is often necessary to rearrange the data in the vector register i.e. the order of the data elements in the register (after loading from memory) is not the order required for processing. Co-processor 1204 of the present invention thus provides "select" and "dual select" instructions to address this issue. The select instruction takes two vector registers as its input and generates a single vector register as its output. Each element of the output register can be independently selected to be any of the sixteen elements of the two input registers. Thus this instruction allows arbitrary rearrangement of the elements of the input vectors into the output vector. The dual select instruction takes two input vector registers and generates two output vector registers, again allowing each element of the output vector to be any element of the input vector. TIE code for implementing an example select instruction is provided in Appendix K.

Figure 14:
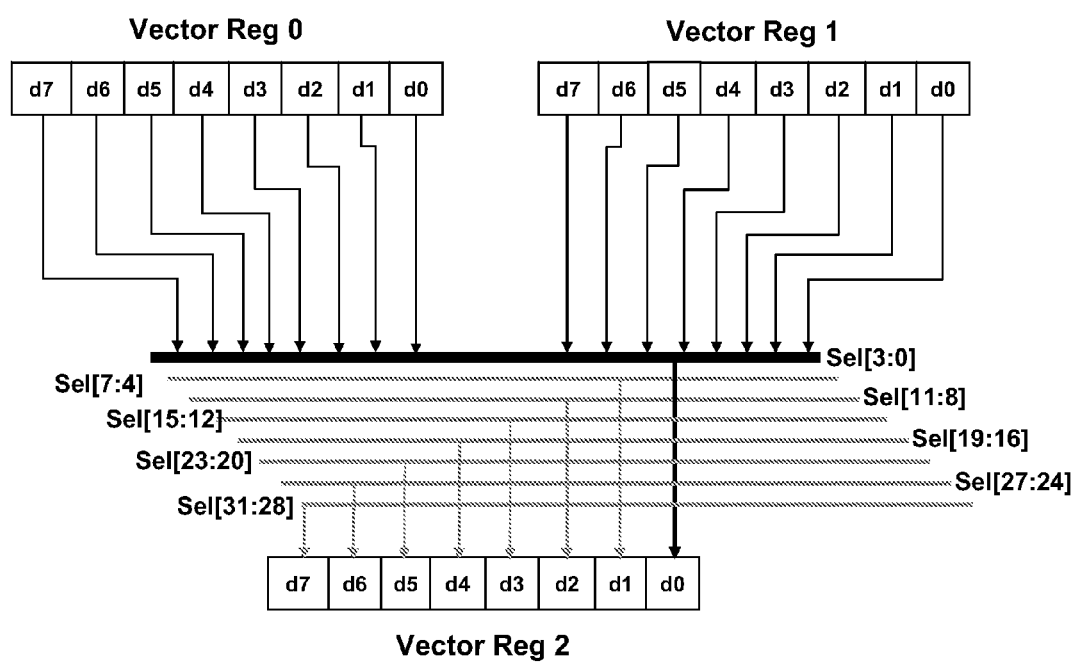
FIG. 14 is a diagram illustrating features of the select registers of the co-processor in accordance with an aspect of the invention.

As further illustrated in FIG. 14, the select instruction is used to rearrange data in a vector register. The selection control information is specified either as an immediate operand or using the select register file 1214. The select register file allows arbitrary selection of data whereas the immediate format provides eight common selection control values to be used without the penalty of loading the select register file. The dual select instruction allows the data from the two input vectors to be rearranged into two result registers.

The inventive aspects of MAC unit 1304 in accordance with the present invention will now be described in more detail. In this regard, it is first noted that most DSP algorithms perform a large number of "multiply-accumulate (MAC)" operations. This requires a multiplier, which is an expensive piece of hardware. Although each vector register 1208 holds eight scalar values, there are only four multipliers in hardware (only one multiplier is shown in FIG. 10 for ease of illustration). Thus, in order to multiply all eight data values, one would need to issue two multiply instructions. This is illustrated in the code below:

```
MUL18.0    v0, v6, v7    // v0 <- even(v6) * even(v7)
MUL18.1    v1, v6, v7    // v1 <- odd(v6) * odd(v7)
```

In the above example, the MUL18.0 instruction multiplies the even elements of register v6 with the corresponding elements of register v7 and this result is stored in register v0. Similarly, the MUL18.1 instruction multiplies the odd elements of register v6 with the corresponding elements of register v7 and the result is stored in register v1. In one example, only four multipliers are provided in hardware, because multipliers are expensive. The penalty for this is that it takes two instructions and two cycles to compute the vector multiply result.

The present invention improves upon this situation by using an "iterative" multiply instruction. The ability to implement "iterative" instructions is described in more detail in the co-pending application TEN-016, Ser. No. 10/146,655 (see excerpt below). An iterative multiply instruction is a single instruction, that performs eight multiply operations over a period of two clock cycles, using four hardware multipliers. This instruction would be written as:

```
MUL18   v0:v1, v6, v7    // v0 <- even(v6) * even(v7)
                         // v1 <- odd(v6) * odd(v7)
```

In the first cycle, the four even data elements are multiplied, and in the next cycle the four odd elements are multiplied. Thus while the operation is similar to the MUL18.0 and MUL18.1 instruction combination mentioned earlier, this method allows only one instruction to be issued instead of two. Given that in most situations, one needs to compute all eight multiplication results, the iterative multiply instruction MUL18 (an example TIE code implementation of which is attached in Appendix L) provides an advantage over the pair of instructions MUL18.0 and MUL18.1. It allows the same amount of work to be done with half the number of instructions, which in turn means that less memory is needed to store the program code. This is a very important advantage in cost sensitive embedded applications.

The iterative multiply instruction provides another important advantage as follows. Recall that DSP algorithms perform a large number of multiply operations, and that multipliers are expensive to implement in hardware. Thus a DSP processor that can keep all the multipliers busy on every execution cycle can be thought of as an optimal implementation (highest achievable performance for the given amount of hardware). This goal is quite hard to achieve because there are typically other computations that have to be done besides the multiplication. For example, a FIR filter requires that the filter input data be shifted relative to the filter coefficients prior to each multiply accumulate operation. Consider the following code excerpt taken from an FIR filter implementation:

```
DSEL        v2:v3, v6, v2, s2    // shift input data by one
MULA18.0    v0, v2, v5           // multiply/accumulate even indices
MULA18.1    v1, v2, v5           // multiply/accumulate odd indices
DSEL        v2:v3, v3, v2, s2    // shift input data by one
MULA18.0    v0, v2, v7           // multiply/accumulate even indices
MULA18.1    v1, v2, v7           // multiply/accumulate odd indices
```

The above code excerpt uses the dual select (DSEL) instruction that was described above. In this particular case it is used to shift the input data by one element prior to each group of multiplications. The MULA18.0 and MULA18.1 instructions represent a multiply accumulate operation, in which the two input register operands are multiplied and the result accumulated in the result register. In every cycle that the processor executes a DSEL instruction, the multiplier hardware is idle. Thus, if one DSEL instruction is issued for every pair of multiply instructions, the multipliers are idle 33% of the time.

Now consider the use of iterative multiply instructions in this situation. As noted earlier, the issue of one iterative multiply instruction keeps the multiplier hardware occupied for two clock cycles. Thus, issuing an iterative multiply every other cycle achieves 100% utilization of the multipliers. Further, the iterative multiply instructions use the paired write port of vector register file 208, and this result is written to the register file after all eight multiplications are complete. As a result of this implementation, in the cycle immediately following an iterative multiply instruction, all processors resources except the multipliers are unused. One can thus schedule any non multiply instruction in this slot, and it "comes for free" in the sense that issuing this instruction does not reduce the multiplier hardware usage. With this in mind, the FIR kernel code excerpt can be recoded as shown below:

DSEL v2:v3, v6, v2, s2
    MULA18 v0:v1, v2, v5
    DSEL v2:v3, v3, v2, s2
    MULA18 v0:v1, v2, v7

The sample code above thus illustrates that the presence of the iterative multiply instruction allows the processor to achieve a throughput of 4 MAC operations per instruction, which is the best that can be achieved with four multipliers in the hardware. It should be noted that the use of the DSEL instruction is just one example of how the "free" slot can be used. Since any non multiply instruction can be scheduled in this slot, the innovation allows for a vast array of DSP kernels to improve their MAC utilization by "hiding" some or all of their overhead processing in this slot. Referring back to FIG. 10, in one example implementation, the multiplier and multiplicand input operands of MAC unit 1304 are 18-bit wide, fixed-point data values. This generates a 36-bit product, which is accumulated in a 40-bit accumulator. Since the multiply operation results in eight 40-bit elements, they are stored in two adjacent vector registers addressed by bits [3:1] of the result operand field. According to an aspect of the invention, MAC unit 1304 provides four different "accumulation" options—no accumulation (multiply only), multiply/add, multiply/subtract, multiply and add ROUND register.

Figure 16:
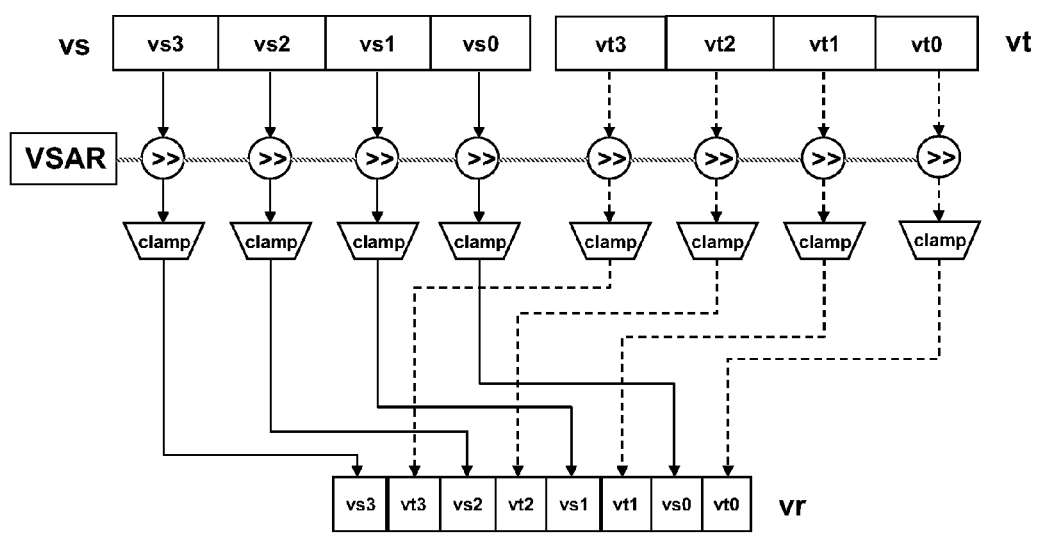
FIG. 16 is a diagram illustrating vector processor support for a PACK instruction according to the invention.

It is common practice in DSP algorithms to maintain the accumulator value in a higher precision format (as compared to the input data values), in order to reduce the amount of rounding error in the final result. However, at some point it is necessary to convert this higher precision data format back to the original precision of the input data, since the final results are expected in this format. Further, since the accumulator value is 40 bits wide, the results of the multiply are stored in two vector registers. One (e.g., register vs) stores the product of the four even elements of the input vector and the other (e.g., register vt) stores the product of the four odd elements of the input vector as illustrated in FIG. 16. While we can continue to accumulate values of subsequent MAC operations in these two separate accumulators, the final result needs to be in a format such that the odd and even elements are adjacent to each other.

The present invention provides a special instruction, labeled PACK, to convert the accumulator values back to the original input format (an example TIE code implementation of a PACK instruction is attached as Appendix M). As shown in FIG. 16 and mentioned above, vector register vt represents the four 40-bit accumulator values corresponding to the odd numbered elements and vector register vs corresponds to the four 40-bit accumulator values corresponding to the even numbered elements. First, the 40-bit values are shifted right by an amount equal to the contents of state register VSAR. This shifted value is then saturated (or clamped) to a 20-bit value. The eight 20-bit values are then interleaved to form a result vector (vr) which now contains the result in the desired format. The PACK instruction can be executed in a single cycle, and its presence is crucial for the effective use of the multiply instructions.

According to a preferred aspect of the invention, MAC unit 1304 provides even further support for "complex" number multiplication. Many DSP applications (such as the Fast Fourier Transform) operate on complex numbers; numbers that have "real" and "imaginary" components. A complex number is represented as {a+jb} where "a" and "b" represent the real and imaginary parts of the number respectively. The product of two complex numbers, {a+jb} and {c+jd} is defined as the complex number {(ac−bd)+j(ad+bc)}.

On a typical microprocessor, complex number multiplication requires that the real and imaginary components be segregated into separate registers as a consequence of their different roles in complex arithmetic. Thus, in order to implement the above multiplication, four separate registers would be used as inputs to the computation, one each for the components "a", "b", "c" and "d." Many DSP algorithms involve "register-intensive" computations in the sense that the algorithm requires the availability of numerous data registers. An example of this would be the radix-four Fast Fourier Transform. Software pipelining of these algorithms is very difficult because of the high amount of "register-pressure." Thus, any technique that reduces the number of registers required in the computation would substantially ease the coding of this kernel.

Figure 17:
FIG. 17 is a diagram illustrating vector processor support for complex multiply operations.

The present invention addresses the above problem by providing special multiply instructions that operate upon complex numbers stored in an interleaved format. With reference to FIG. 17, the eight scalar elements of operand (vector) register 0 and 1 now represent four complex numbers, with their real and imaginary parts placed adjacent to each other. It may be noted that arithmetic operations such as addition and subtraction can be performed on complex numbers stored in an interleaved format using the same instructions as those used to operate upon real numbers. However, as explained earlier, multiplication of complex numbers is sufficiently different from the multiplication of real numbers that the real multiply instructions cannot directly be used to operate on this interleaved data storage format. MAC unit 1304 provides a special complex multiply instruction, RMULA18 (an example TIE code implementation of which is attached as Appendix N), to accumulate the real part of the complex product into a vector of real elements (FIG. 17 real product register), and another complex multiply instruction, IMULA18, to accumulate the imaginary part of the complex product into a vector of imaginary elements (FIG. 17 imaginary product register).

Consider the RMULA18 instruction that computes the real part of the complex product and accumulates this result in the destination register. This is also an iterative instruction that performs eight multiplies over a period of two cycles. With reference to FIG. 17, this instruction computes the four products a0c0, a1c1, a2c2 and a3c3 in the first cycle. These values are then added to the contents of the result register, which is the accumulator. In the next cycle, it computes the four products b0d0, b1d1, b2d2 and b3d3, and subtracts this value from the contents of the result register. We have thus performed the computation $$\text{accumulator}=\text{accumulator}+(ac-bd);$$

using the RMULA18 instruction. The IMULA18 instruction operates in a similar manner to compute the imaginary part of the complex product and accumulate the result in the accumulator register. The complex multiply instruction also provided the same four accumulation options as the real multiply instructions-no accumulation (multiply only), multiply/add, multiply/subtract, multiply and add ROUND register.

The availability of the complex multiply instructions thus allows storage of complex data in their natural, interleaved format. Such a scheme allows the computation of the complex product to use only two registers as inputs, in contrast to the four registers required in the absence of these instructions. The results of complex multiply instructions are stored in two separate registers—one containing the real component and the other the imaginary component. Further, these accumulator registers store data in the higher precision, 40-bit format. The PACK instruction described above can then be used to convert the real and imaginary accumulator registers back to the original, lower precision (20-bit), interleaved format complex number representation once all multiply accumulate operations are complete. Thus the complex multiply instructions, along with the PACK instruction, substantially eases the coding of register-intensive algorithms that operate on complex data type.

Even further efficiencies can be gained by exploiting the architecture of co-processor 1204 in conjunction with the extensibility and configurability features of the co-pending and prior patent applications. In this regard, even further inventive aspects of ALU 1306 in accordance with the present invention will now be described. For example, ALU 1306 provides a few special ALU instructions to accelerate the performance of many DSP kernels on a vector processor. One such operation is reduction add, which adds all the elements of a single input vector operand to produce a scalar sum as the result. The scalar sum is then replicated into all the elements of the result vector. Another set of instructions is an extension of the min and max instructions mentioned above. In addition to selecting the minimum (or maximum) values into the result vector register, this instruction also sets the Boolean registers to indicate which of the (two) input vector elements was the selected element.

Another special instruction is the "butterfly add" instruction. The Fast Fourier Transform (FFT) is an algorithm very frequently implemented on DSP processors. This algorithm requires the repeated computation of the sum and difference of the input data elements i.e. the computation of (a+b) and (a−b). This would typically be computed by issuing two separate instructions—an ADD and a SUBTRACT instruction on the same operands. The butterfly add instruction is a special instruction that computes both the above values in a single cycle. This improves code density and the run time performance of the FFT kernel when implemented on co-processor 1204. The presence of this instruction also helps the FFT algorithm reach a higher number of "MAC operations per cycle", which as explained earlier is an important measure of a DSP processors efficiency. TIE code for implementing an example of a butterfly add instruction is provided in Appendix O.

The "multiply sign" instruction is another possible special instruction (an example TIE code implementation of which is attached as Appendix P). It is modeled after the "copy sign" operation used in floating point data manipulations. The scalar operation corresponding to this instruction is illustrated by the pseudo-code below:

```
if (input0>0) {// input operand 0 is positive
  result=input1;
} else if (input0<0) {// input operand 0 is negative
  result=−input1;
} else {// input operand 0 is zero
  result=0;
}
```

In addition, a preferred implementation of co-processor 1204 provides a number of different ALU and shift instructions. Most of these instructions come in two flavors—one that operates on the 20-bit narrow register type and the other that operates on the 40-bit wide register type.

For example, add, subtract, minimum and maximum are the three operand arithmetic instructions supported. Two operand arithmetic instructions that generate the absolute value and the negated value of the input vector are also supported.

Logical AND, NAND, OR and Exclusive-OR operations are supported by the instruction set. Since these operators operate on a per bit basis (as opposed to on a narrow or wide scalar element), there is only one version of these instructions. Compare instructions are provided that compare the contents of two vector registers and update the Boolean registers based on the result of the comparison. The operators provided are less than, less than or equal and equal to.

In accordance with the state registers preferably provided in accordance with the invention, shift instructions come in two formats—one specifies the shift amount as a 5-bit immediate operand and the other uses the state register VSAR to specify the shift amount. This class of instructions provide left shift and arithmetic right shift operations.

Still further advantages can be obtained by exploiting the architectural features of the present invention and the co-pending applications. As is known, most modern day processors use pipelining techniques to achieve high performance. While pipelining does improve the performance of a processor, one of the well-known problems with pipelined processors is the stalling of the pipeline due to data hazards. For example, most DSP kernels are data intensive, and require fetching a large amount of data from memory. In most processor architectures, accessing data from memory takes more time than accessing data from registers. In situations where we need to load data from memory and then immediately operate upon that data, this creates a data hazard, and hence a "bubble" in the pipeline. The second instruction (that wants to process the data) has to wait for the first instructions (that loads the data) to complete and the load data to be available before it can be issued. The present invention addresses the above problem by "pushing down" the execution units to a later pipeline stage, so that they require their operands later in the execution pipeline. This implementation will now be described in more detail.

In a preferred implementation of the present invention, using the techniques described in more detail above, co-processor 1204 uses a 7-stage pipeline, where the stages are labeled H, I, R, E, L, M and W.

While pipelining does improve the performance of a processor, one of the well-known problems with pipelined processors is the stalling of the pipeline due to data hazards. Consider the following code sequence in which we load a value into a vector register and then execute an instruction to negate that value.

```
LVS16.I v0, a6, 0          // v0 = Mem[a6 + 0]
NEG20 v1, v0               // v1 = v0 negated
```

In the code, the NEG20 instruction is a "register to register" operation. It is a single cycle instruction in that the computation is performed in one cycle and the results are available in the next cycle. This computation would typically be performed in the E stage. The LVS16.I is a load instruction, whose address is generated in the E stage, the external memory uses the L stage to access the data, and it is presented back to the processor in the M stage. Because a vector load instruction requires some post processing (such as merging data with the alignment register), we need one additional cycle to complete the load. Thus the load data is available for use by a subsequent instruction only when the load instruction has reached the W stage.

In a typical pipeline implementation, the flow of these instructions would then be as follows (note that the H stage is omitted as it is not relevant to the discussion):

| Cycle | I | R | E | L | M | W |
|---|---|---|---|---|---|---|
| 1 | LVS16.I | | | | | |
| 2 | NEG20 | LVS16.I | | | | |
| 3 | | NEG20 | LVS16.I | | | |
| 4 | | NEG20 | * | LVS16.I | | |
| 5 | | NEG20 | * | * | LVS16.I | |
| 6 | | NEG20 | * | * | * | LVS16.I |
| 7 | | | NEG20 | * | * | * |
| 8 | | | | NEG20 | * | * |
| 9 | | | | | NEG20 | * |
| 10 | | | | | | NEG20 |

Note in the above figure that in cycle 4, although the LVS16.I instruction proceeded from the E to the L stage, the NEG20 instruction stalled in the R stage. This is because the NEG20 instruction uses the vector register v0 as its input operand, but the value of v0 is not available until the LVS16.I instruction goes through the W stage.

Such stalls are common in pipelined microprocessor implementations, and one way to get around them is for the programmer to schedule instructions such that they do not stall. In the above example, instead of scheduling the NEG20 instruction immediately after the load, the programmer could schedule three other unrelated instructions while the load instruction was fetching the data. If the NEG20 instruction came after these three instructions, there would be no wasted cycles due to stalls.

In many Digital Signal Processing (DSP) applications, the programmer is constrained by how fast he can issue load instructions to memory and use the results of the load. In these cases, it is usually not possible to reorder code to avoid the stall condition. Thus the performance of such code is substantially impacted by the 3 stall cycles between the LVS16.I and NEG20 instructions. The present invention includes a unique way to address this problem in coprocessor 1204, which is designed to accelerate the performance of DSP code.

While most of the core processor 1202 instructions read the register file in the R stage and execute the ALU operation in the E stage, the co-processor instructions have been "pushed" three cycles down in the pipeline stage. Thus co-processor 1204 ALU instructions read the register file in the M stage and do the computation in the W stage. In the modified pipeline data flow diagram below, note that when the NEG20 instruction is in the M stage (when it needs to read the input operand), the LVS16.I instruction is in the W stage and the result of the load is indeed available. As a result of this change, there are no stalls between the LVS16.I and the NEG20 instruction.

| Cycle | I | R | E | L | M | W |
|---|---|---|---|---|---|---|
| 1 | LVS16.I | | | | | |
| 2 | NEG20 | LVS16.I | | | | |
| 3 | | NEG20 | LVS16.I | | | |
| 4 | | | NEG20 | LVS16.I | | |
| 5 | | | | NEG20 | LVS16.I | |
| 6 | | | | | NEG20 | LVS16.I |
| 7 | | | | | | NEG20 |

It should be noted that this change does not come for free. As a result of delaying the NEG20 computation by three cycles, the result of this computation becomes available three cycles later. Thus if there is a situation in which the NEG20 instruction was followed by an instruction to store the computed data to memory, the processor will now experience a stall, whereas previously it did not have one. This is illustrated by the following code sequence

```
NEG20 v1, v0              // v1 = v0 negated
SVS16.I v1, a6, 0         // Mem[a6 + 0] = v1
```

| Cycle | I | R | E | L | M | W |
|---|---|---|---|---|---|---|
| 1 | NEG20 | | | | | |
| 2 | SVS16.I | NEG20 | | | | |
| 3 | | SVS16.I | NEG20 | | | |
| 4 | | SVS16.I | * | NEG20 | | |
| 5 | | | SVS16.I | * | NEG20 | |
| 6 | | | | SVS16.I | * | NEG20 |
| 7 | | | | | SVS16.I | * |
| 8 | | | | | | SVS16.I |

When the SVS16.I instruction is in the M stage, it needs to provide the store data. The store data comes from vector register v1, and this result is not available until the NEG20 instruction has gone past the W stage. Thus, in cycle 3, the SVS16.I instruction stalls in the R stage (stalls are always detected and enforced in the R stage) while the NEG20 instruction proceeds to the E stage.

Thus the stall condition is moved from the "load side" to the "store side" of the computation. Note that only a single cycle stall was incurred on the store, although a 3 cycle stall on the load was saved. Thus there is a net performance gain. Further, in most computations (and especially in DSP kernels), the number of loads is much larger than the number of stores. Thus removing the stall following the load and introducing one before the store improves the performance of the processor even if we did have to suffer a 3 cycle stall with the store.

It should be noted that the additional stall comes into play only when the ALU instruction is followed by a store, not when it is followed by another ALU instruction. All "register to register" ALU operations would read their input operand in the M stage and generate the result in the W stage. Thus there are no stalls in the case of back to back ALU instructions.

This technique of the present invention of pushing the execution unit to a later pipeline stage is thus an innovation that can provide significant performance advantages in program code that heavily relies on loading data from memory and immediately processing it.

Method and Apparatus for Adding Advanced Instructions in an Extensible Processor Architecture.

The following description is excerpted from U.S. Patent Application TEN-016 No. 10/146,655.

The Tensilica Instruction Extension (TIE) Language Reference Manual forms part of the present disclosure, is attached as Appendix S hereto and is incorporated herein by reference.

Figure 18:
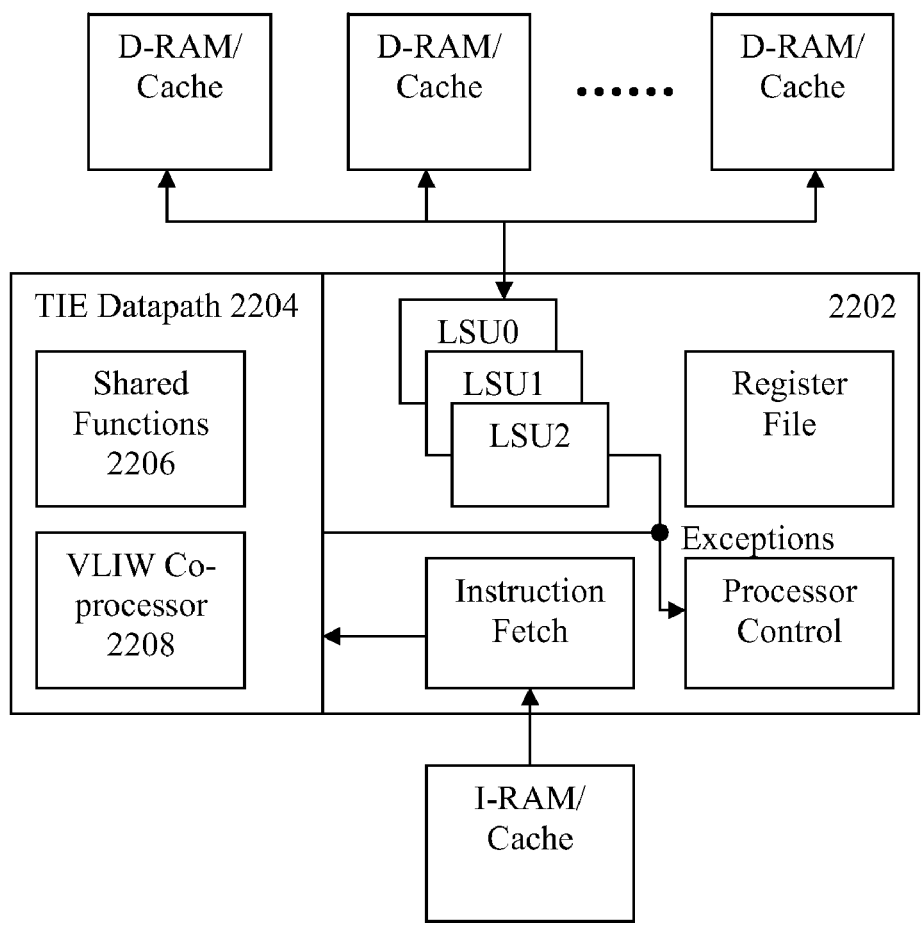
FIG. 18 is a block diagram illustrating a high performance processor generated in accordance with the principles of the invention.

FIG. 18 is a top-level diagram illustrating an example generated processor made possible in accordance with instruction extensions of the invention. As shown in FIG. 18, in general, the generated processor includes an instruction fetch unit 2206 that is able to decode advanced instructions such as VLIW instructions. The system includes an enhanced extension language (TIE) for formal capturing of both the new instructions for execution by VLIW co-processor 2208, as well as other customized instructions for the TIE datapath 2204. The extension language further provides for complex load/store instructions for use by a configurable number of load/store units 2212, more powerful description styles including shared functions 2206, more powerful register operands for exploiting register file 2214, new ways of defining processor exceptions during run-time operations, and a new set of built-in modules.

This invention builds upon the technology described in the prior patent and applications, in which the basic TIE language and its compiler and other tools are described for generating a customized high performance processor, along with supporting hardware descriptions and software tools for the customized processor. This invention extends the TIE language with new constructs for generating additional processor hardware and associated tools, and this disclosure describes what the new language constructs are and how the TIE compiler supports these constructs. Accordingly, the contents of the prior disclosures are incorporated herein by reference, and details of only the new features of the invention will be provided. In sum, however, the combined disclosures will enable those skilled in the art to practice a method for generating both hardware implementations and software tools for the extended processors.

As set forth above, and as shown in FIG. 18, an aspect of the present invention is the ability to decode advanced instructions, such as VLIW instructions for execution by a VLIW co-processor. One possible implementation of a VLIW co-processor that can take advantage of the VLIW instructions enabled by this invention is described in more detail in co-pending application TEN-014, Ser. No. 10/146,380 (see excerpt above). In such an example implementation, the VLIW instructions are provided in addition to 16- and 24-bit instructions for execution by processor core 2202 (the structure for executing the core instructions is not shown in detail for clarity of the invention, but can be implemented by the structure described in U.S. Pat. No. 6,282,633, for example).

Figure 19A:
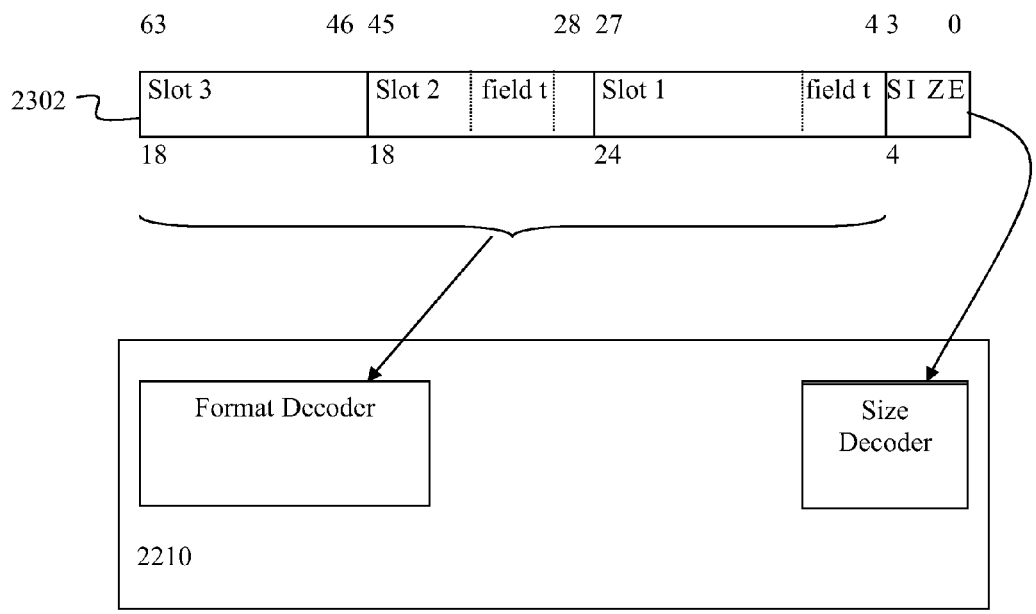
FIGS. 19A and 19B illustrate an example VLIW instruction format, and the associated decoding and execution logic, generated in accordance with an aspect of the invention.

An example VLIW instruction 2302 in accordance with the invention is illustrated in FIG. 19A. In this example, the VLIW instruction is 64 bits. However, the invention is not limited to this size of VLIW instruction. It is advantageous for the instruction length to be determined from the least significant bits of the instruction for little-endian systems. For the example in FIG. 19A, the least significant nibble (bits 0-3) of instruction 2302 specifies the instruction length. For big-endian systems, the size specification is preferably in the most significant bits.

In a VLIW instruction set according to one example of the invention, an operation (op) is a computational task to be performed by an execution unit. As shown in FIG. 19A, a VLIW instruction defined by the TIE of this invention includes a particular combination of slots, three in this example. Since there can be many instruction formats, a slot can belong to multiple formats. The slots in a VLIW instruction define separate pipelined execution units that operate independently. Nevertheless, an instruction slot can perform multiple ops and an op can belong to multiple slots.

Figure 19B:
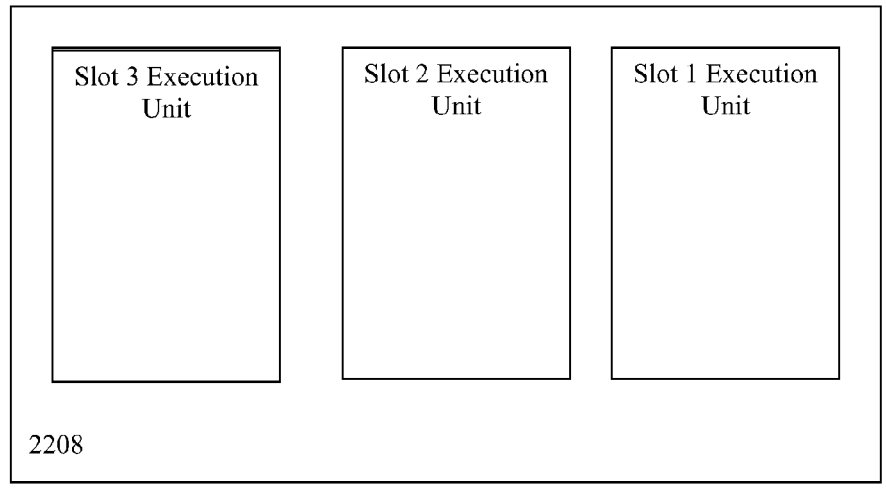

As further shown in FIG. 19B, how TIE is used to define VLIW instructions and formats will lead to the production of customized hardware in the processor. For example, the definition of the size of the VLIW and other instructions will determine the structure of a length decoder 2304 in instruction fetch unit 2210. Further, the definition of the various instruction formats will lead to the generation of a particular format decoder 2306 in instruction fetch unit 2210. Finally, the set of operations defined for each slot will determine the structure of each separate pipelined execution unit 2308 in VLIW co-processor 2208.

Figure 20:
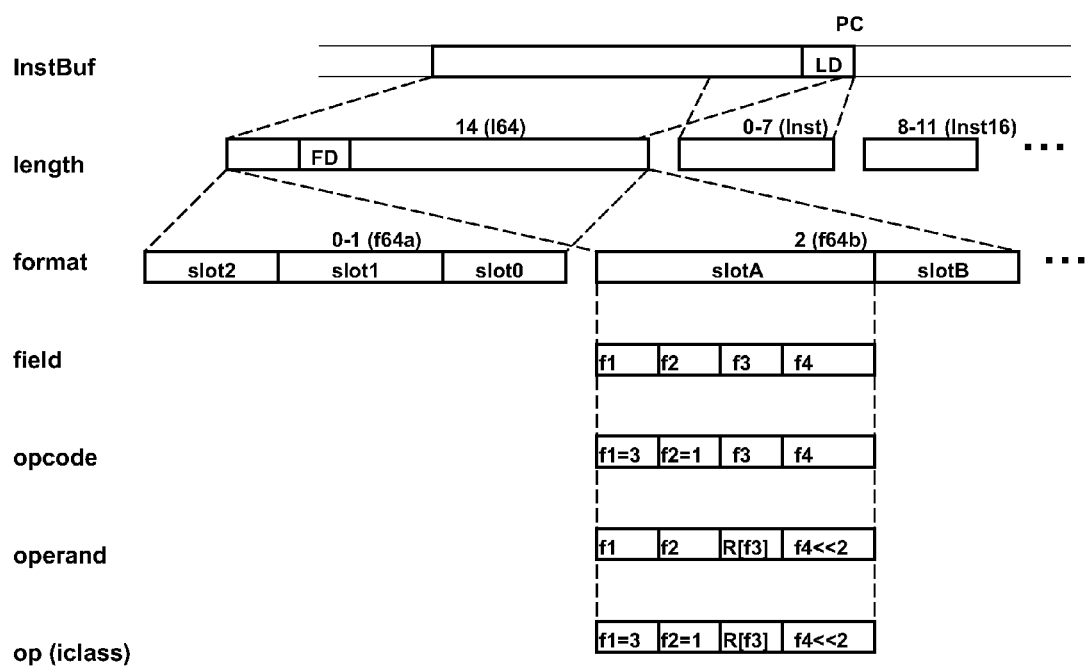
FIG. 20 is a diagram illustrating how VLIW instructions are processed in accordance with an aspect of the invention.

Generally, the process of determining the set of operations for a VLIW instruction in a processor defined according to one example of the invention is shown in FIG. 20. As shown in FIG. 20, the beginning of the instruction is pointed to by the program counter (PC). The length (number of bits) of the next instruction is determined by looking at the value in the length-decoding bits (LD). In one example of the invention, value 14 in the LD field indicates that the length of the current instruction is 64 bits. A given format can be further decoded into several formats by looking at the value in the format-decoding bits (FD). In one example implementation, value 2 in the FD field indicates format f64b. Each format consists of a set of operation slots. Once the format is known, the slots can be extracted, the fields in the slots can be extracted, the opcodes can be decoded, and the operands can be computed. These are the basic steps for identifying the set of operations to be performed. The details of these steps are described in the subsequent sections.

The following sections describe the new TIE constructs for capturing VLIW instructions and for generating associated hardware descriptions and software tools.

An initial step in describing VLIW instruction extensions is to specify their length. In one example implementation, a new instruction length can be defined by the TIE statement:

length [i-name] [i-length] {expression} where i-name is a unique identifier that can be used to reference the length, i-length specifies the instruction length in bits, and expression is optionally used to specify decoding logic for determining the instruction length in the variable InstBuf. In one example implementation, i-length must be specified in multiples of 8 bits and only the least significant nibble (for little endian systems) is used in the expression.

Figure 21:
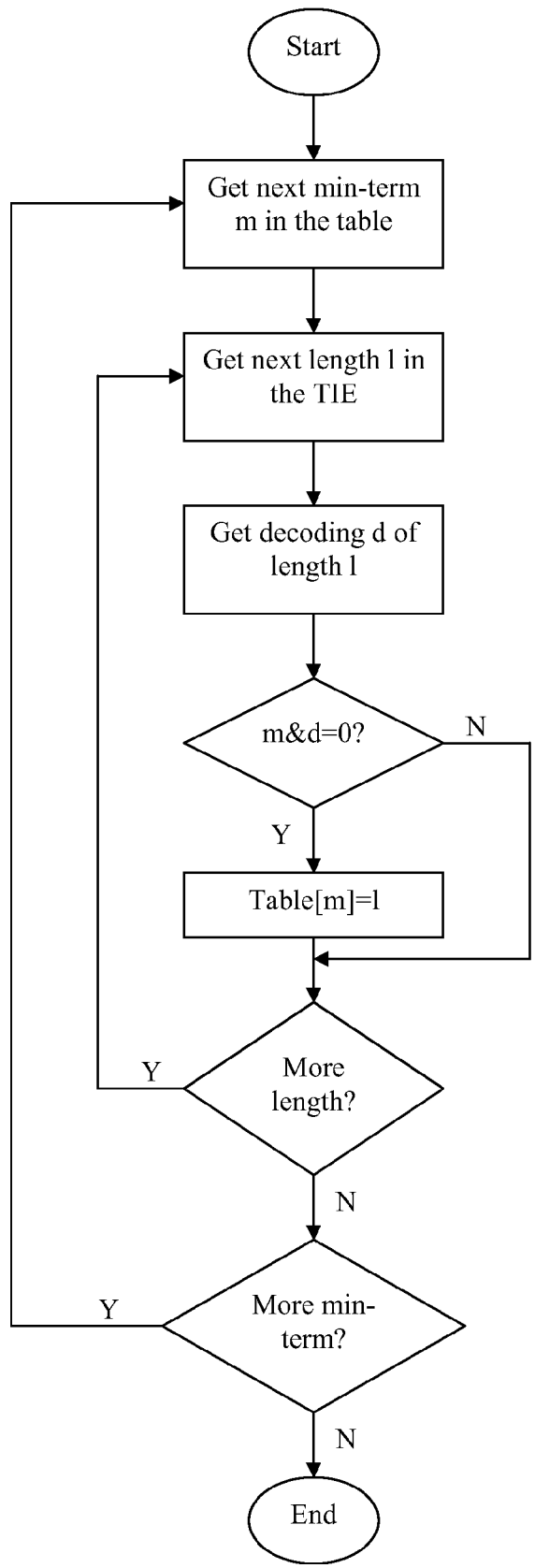
FIG. 21 illustrates a method for determining the length of a defined instruction.

When instruction length definitions have been included in the TIE program, the program is processed by the TIE compiler. The hardware logic and software tools generation functions in the TIE compiler share a common method. This method creates a length table mapping the min-terms in the length decoding fields to instruction lengths. Only the instruction bits referenced by the length expressions are relevant. The table contains an entry for every possible combination of values of these bits. These combinations of bit values are analogous to min-terms in a logic expression and they are treated as such by the TIE compiler. One way of generating the length table from TIE length statements is described in FIG. 21. For example if the TIE program contains the following length expressions:

```
length l24 24 {InstBuf[3]==0} length l16a 16 {InstBuf[3:2]==2'b10} length l16b 16 {InstBuf[3:1]==3'b110} length l64 64 {InstBuf[3:1]==3'b111}
```

The following length table will be generated:
Instbuf[3:1] Length name

| Instbuf[3:1] | Length name |
|---|---|
| 000 | l24 |
| 001 | l24 |
| 010 | l24 |
| 011 | l24 |
| 100 | l16a |
| 101 | l16a |
| 110 | l16b |
| 111 | l64 |

Figure 22:
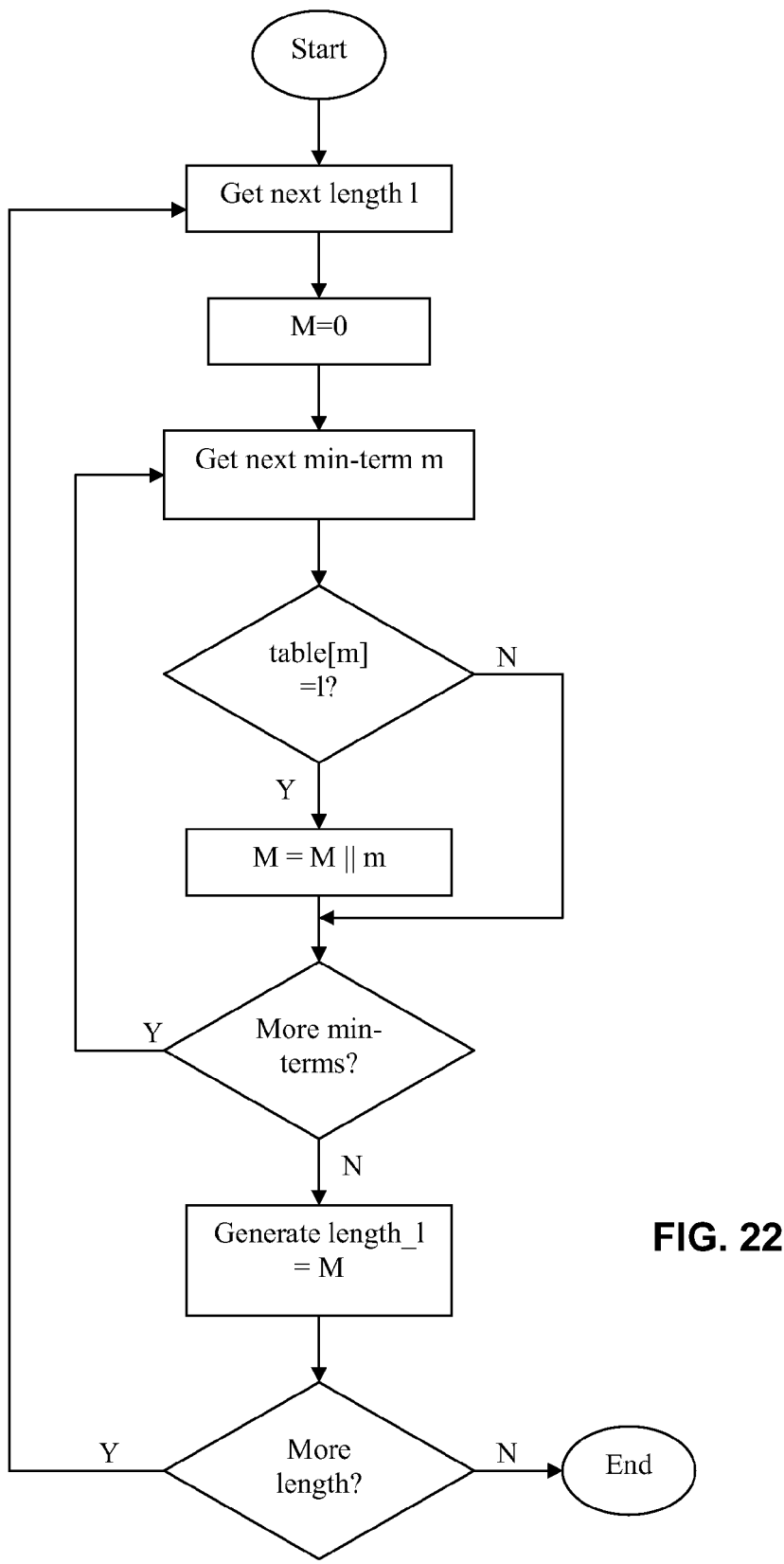
FIG. 22 illustrates a method for determining the decoding length for newly defined instructions.

Using the length table constructed above, the hardware decoding logic can be constructed by the process described in FIG. 22. Using the above example, the generated hardware would look like

```
length__24=InstBuf[3:1]==3'b000|InstBuf[3:1]==
    3'b001|

InstBuf[3:1]==3'b010|InstBuf[3:1]==3'b011;

length__16=InstBuf[3:1]==3'b100|InstBuf[3:1]==
    3'b101|

InstBuf[3:1]==3'b110;

length__64=InstBuf[3:1]==3'b111;
```

Figure 23:
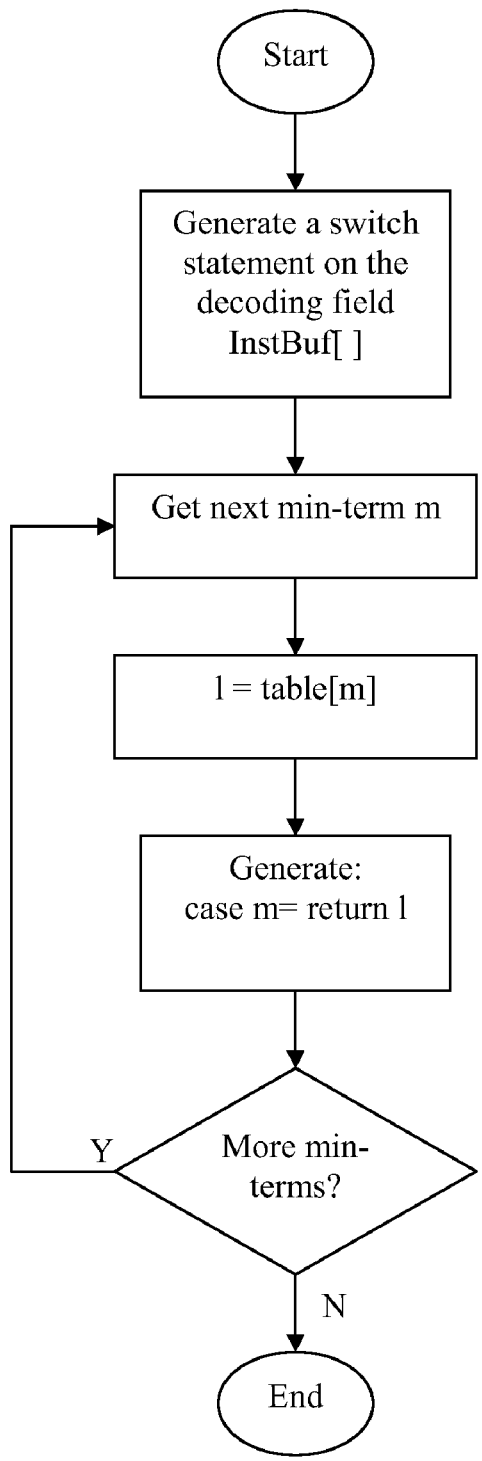
FIG. 23 illustrates a method for generating a length table according to the invention.

Using the length table constructed above, the software decoding routine can be constructed by the process described in FIG. 23. Using the above example, the generated software decoding routine would look like:

```
switch (InstBuf[3:1]) {
case 0: return 24;
case 1: return 24;
case 2: return 24;
case 3: return 24;
case 4: return 16;
case 5: return 16;
case 6: return 16;
case 7: return 64;
}
```

It should be noted that in the above example, the decoding field is restricted to be 4-bits wide. This is a preferred embodiment that yields efficient hardware decoding logic. The general method, however, allows for any number of bits in the decoding logic, and the present invention includes such alternative embodiments.

It should be further noted that the above example puts restrictions on the decoding logic expression. Again, this is a preferred embodiment for efficient decoding logic. The general method allows for arbitrary specification of the decoding logic.

Another step in adding VLIW extensions is defining the format of such instructions. In one example implementation, the format of a new VLIW instruction can be defined using the following TIE statement:

format [name] [length] {decoding} where name is a unique identifier for the format, length is the name of a previously defined length, and the optional decoding is an expression to specify the decoding logic for the instruction format.

Figure 24:
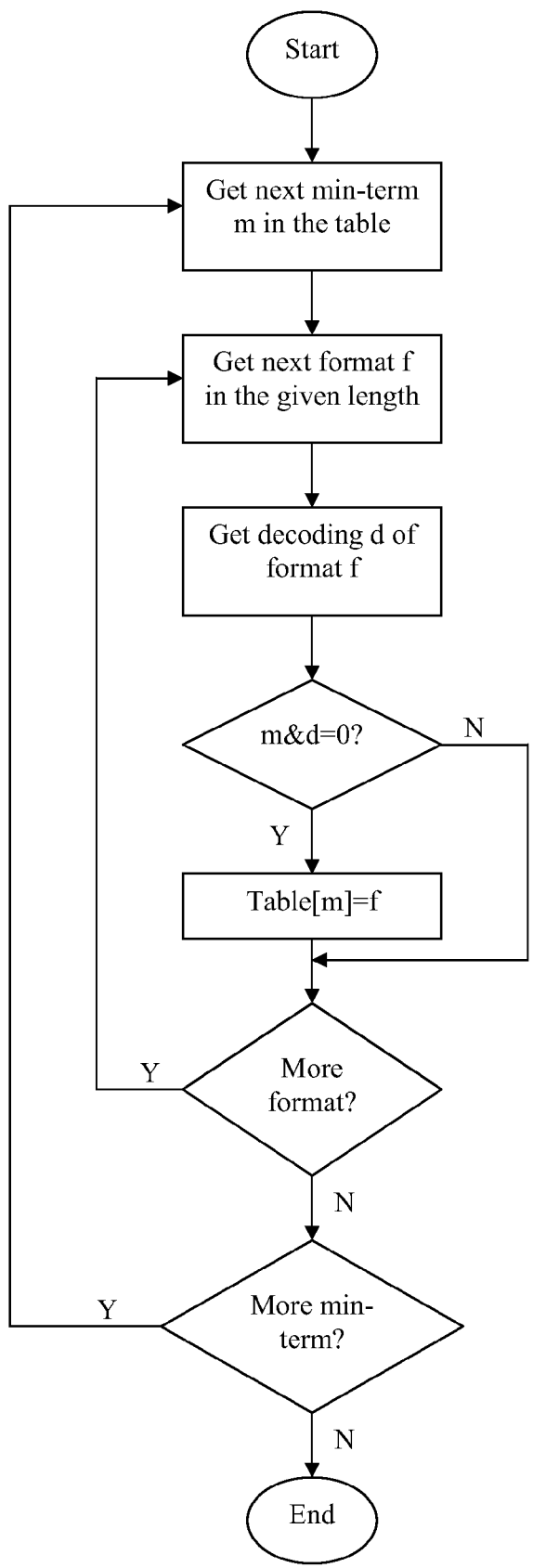
FIG. 24 illustrates a method for generating a format table according to the invention.

When a TIE program is created containing such format statements, the hardware logic and software tools generation functions of the TIE compiler share a common method. It is to create a format table for each instruction length mapping the min-terms in the format decoding fields to instruction format code. The process for generating the format table from TIE format statements is described in FIG. 24. For example, if the TIE program contains the following format definitions:

```
format four_slots l64 {InstBuf[63]==1'b0} format three_slots l64 {InstBuf[63:62]==2'b10} format two_slots l64 {InstBuf[63:62]==2'b11}
```

A format table such as the following is created for length l64:
Instbuf[63:62] format code

| Instbuf[63:62] | format code |
|---|---|
| 00 | format_four_slots |
| 01 | format_four_slots |
| 10 | format_three_slots |
| 11 | format_two_slots |

Figure 25:
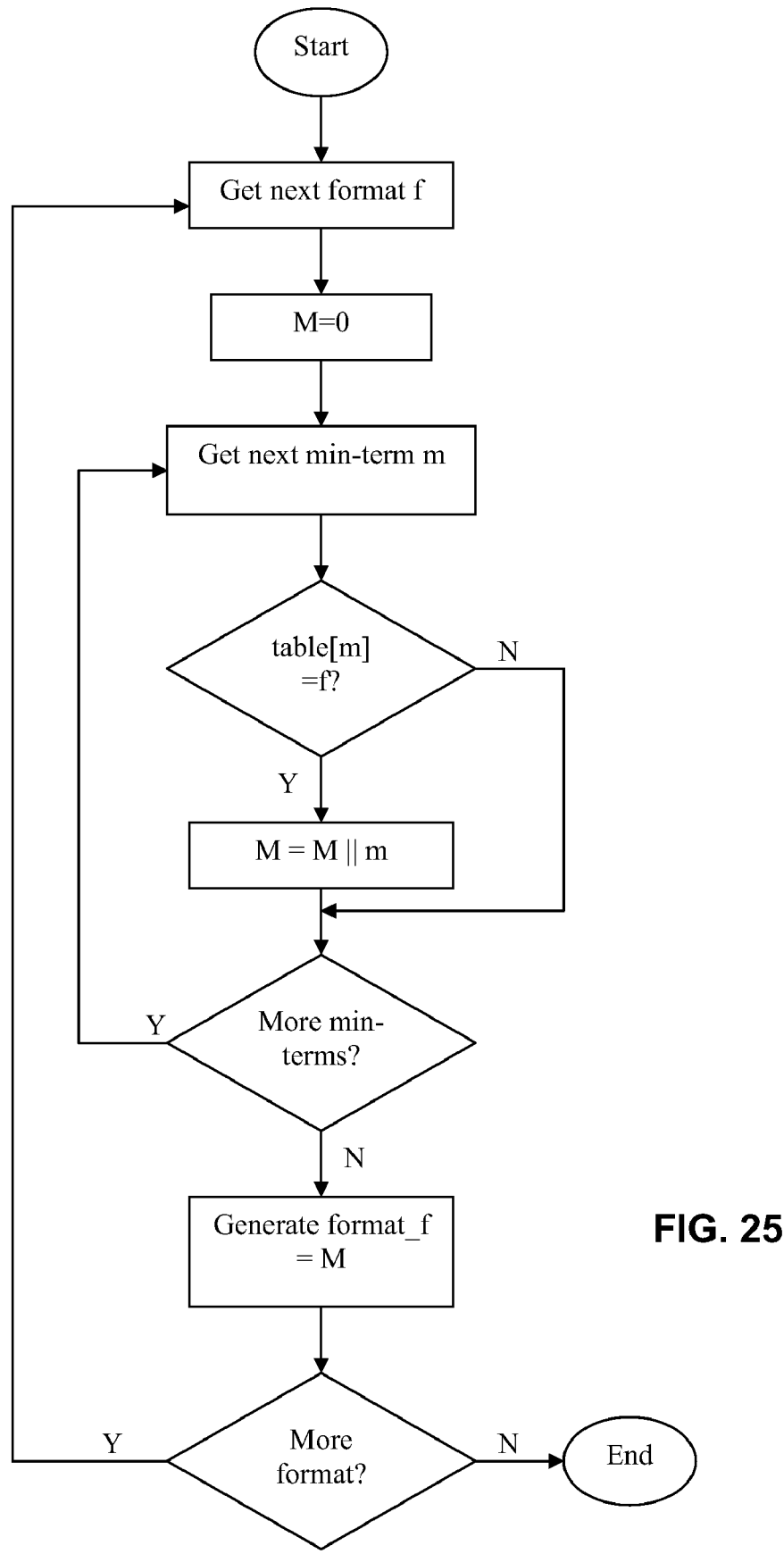
FIG. 25 illustrates a method for determining an instruction format table according to the invention.

Using the format code table constructed above, the hardware format decoding logic can be constructed by the process described in FIG. 25. Using the above example, the generated hardware would be

```
format four_slots=(InstBuf[63:62]==2'b00|InstBuf
    [63:62]==2'b01) & l64;

format three_slots=(InstBuf[63:62]==2'b10) & l64;

format two_slots=(InstBuf[63:62]==2'b11) & l64;
```

Figure 26:
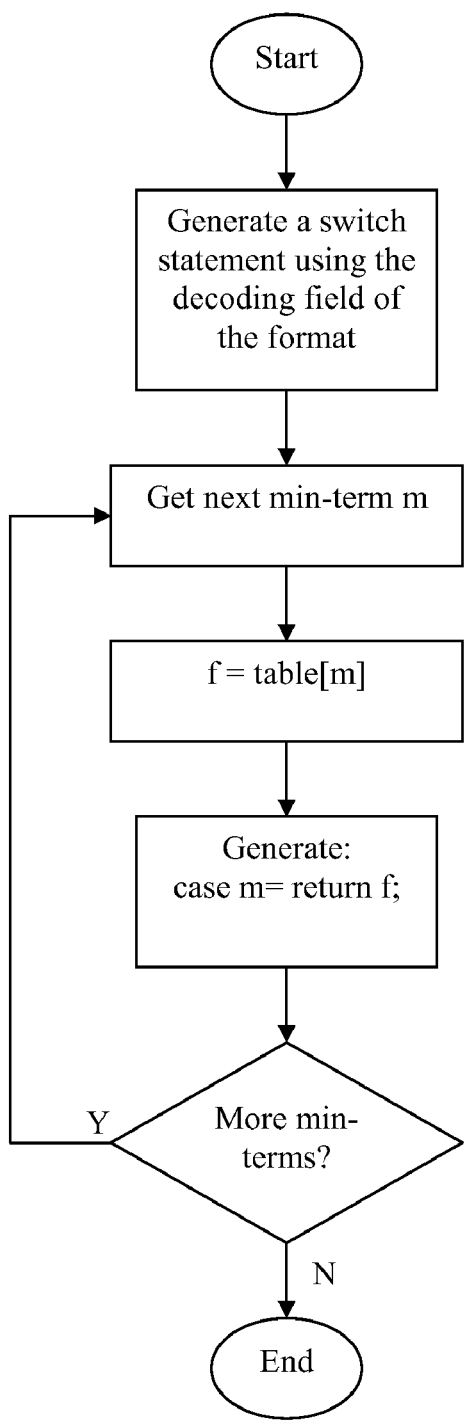
FIG. 26 illustrates a method for generating a software tool for a format table according to the invention.

Using the format code table constructed above, the software format decoding routine can be constructed by the process described in FIG. 26. Using the above example, the generated software decoding routine would look like:

```
switch (InstBuf[63:62]) {
case 0: return format_four_slots;
case 1: return format_four_slots;
case 2: return format_three_slots;
case 3: return format_two_slots;
}
```

Another step in adding VLIW extensions is defining the format of an operation slot. In one example implementation, the format of a new operation slot for a VLIW instruction can be defined using the following TIE statement:

slot [name] [format-name[index:index]]

where name is a unique identifier for the slot, and format-name is the name of a previously defined format. The bit indices should be valid indices of the format, i.e., they must be within the instruction length for the format. Although a slot name can be defined multiple times, in the same or different formats, all definitions contain the same number of bits.

When a TIE program is created containing such slot statements, the hardware logic and software generation functions of the TIE compiler will generate logic capable of extracting the slots. For example, the TIE program can include the following statements:

length l64 64 {InstBuf[3:0]==15}
format f64 l64
slot alu {f64[23:4], f64[27:24]}
slot mac f64[43:28]
slot s1 f64[53:44]
slot s1 f64[63:54]

In the hardware implementation, it is often convenient to use a variable to represent the contents of a slot. The value of the slot variable is derived directly from the definition. Using the above example, let slot_alu be the variable for the alu slot, the HDL statement would look like assign slot_alu={InstBuf[23:4], InstBuf[27:24]};

This HDL is produced from the TIE slot statement by simply replacing the format name (e.g., "f64") with the instruction buffer ("InstBuf").

In software tools, it is also useful to use one variable to represent the contents of a slot. Using the same example and letting slot_alu be the variable for the alu slot, the C statement would look like slot_alu=InstBuf & 0xfffff0|(InstBuf >>24) & 0xf;

(Generating a sequence of shift and mask operations in C to extract and combine the slot fields is straightforward and the method should be readily apparent.)

A next step in adding VLIW extensions is defining fields for operation slots. In one example implementation, the format of a new operation slot for a VLIW instruction can include fields, and fields can be used in different slots. A new operation field can be defined using the following TIE statement:

field [name] [field-name[index:index] or slot-name[index:index]]

where name is a unique identifier for the field, and field-name and slot-name are the names of a previously defined field or slot, respectively. The bit indices are relative to the field or slot, not absolute within the instruction buffer, and should be valid indices of the field or slot.

When a TIE program is created containing such field statements, the hardware logic and software generation functions of the TIE compiler will generate logic capable of extracting the fields. In particular, the TIE compiler will determine the slot sets for each created field. The slot set for a field is the set of slots containing that field. For example, the TIE program can include the following statements:

```
field f1 s1[3:0]      // s1 is a slot
field f1 s2[4:1]      // s2 is a slot
field f2 s1[7:4]      // s1 is a slot
field f2 s3[2:0]      // s3 is a slot
field f3 {f2[0], f1}
```

The compiler will then generate the following slot sets:
slot set of f1: {s1, s2}
slot set of f2: {s1, s3}
slot set of f3: {s1} (i.e., field f3 is only defined in slot s1)
Another step in adding VLIW extensions is defining opcodes. In one example implementation, a new opcode for a VLIW instruction can be used in different slots. A new opcode can be defined using the following TIE statement:

opcode [name] [field-name=sized constant]

where name is a unique identifier for the opcode, and field-name is the name of a previously defined field. Preferably, the instruction extensions are defined as sub-opcodes of the CUST0 or CUST1 predefined opcode names with the exception of user-defined load and store instructions.

When a TIE program is created containing such opcode statements, the hardware logic and software generation functions of the TIE compiler will generate decoder logic capable of recognizing the opcodes. As one aspect of this, the TIE compiler will determine the slot sets for each created opcode, where the slot set for an opcode is the set of slots containing the fields that specify that opcode. For example, the TIE program can include the following statements:

```
field f1 s1[3:0]      // s1 is a slot
field f2 s2[4:1]      // s2 is a slot
field f2 s1[7:4]      // s1 is a slot
field f2 s3[2:0]      // s3 is a slot
opcode o1 f1=3
opcode o2 f2=0 o1
```

The following slot sets will then be determined.
slot set of f1: {s1, s2}
slot set of o1: {s1, s2}
slot set of f2: {s1, s3}
slot set of o2: s1

As can be seen, Opcode o1 is defined in both slot s1 and s2. Opcode o2 is only defined in slot s1.

Instruction (operation) classes, which associate opcodes with operands, are defined with TIE iclass statements. The set of slots in which an iclass is defined is referred to as the slot-set of the iclass. Since an iclass is defined in terms of opcodes and operands, the slot set for the iclass may not be directly obvious. An example method for determining the slot-set of an iclass is determining the intersection of the slot-sets for all the opcodes and the slot sets of the fields used by operands in the iclass definition.

Given the slot set of each iclass, the method of generating the decode logic to identify the opcode in each slot is the same as the method described in the aforementioned applications. As with the TIE description in the afore-mentioned applications, the iclass, semantic and reference definitions for the opcode will determine the behavior of an instruction including the opcode, and thus the hardware and software associated with the execution unit for the VLIW slot-sets determined for the opcode.

Referring back to FIG. 18, and as more fully explained above, another aspect of the present invention is the ability to operate with a configurable number of load/store units. A further aspect is to provide an enhanced interface to the load/store units. To allow multiple load/store instruction extensions to share certain common logic, the present invention adds some new construct to the TIE language. The definition and usage of these constructs are described hereinbelow.

Using the processor generation system of the prior patent and applications, a load instruction reads the entire word (multiple bytes) from the memory. There was no way to read a subset of bytes in the word without reading the rest. For certain memory-mapped devices, reading a value effectively removes the data from the device. For such devices, reading unwanted data (bytes) is very un-desirable and could cost a great deal of additional hardware to work around the problem.

Likewise, a store instruction in the prior system always writes the entire word into the memory. Writing only a subset of bytes in the word was not possible. The present invention provides a general way for specifying the individual bytes to be read or written during a load or store operation, through the use of newly-provided LoadByteDisable and StoreByteDisable interface signals.

Figure 27:
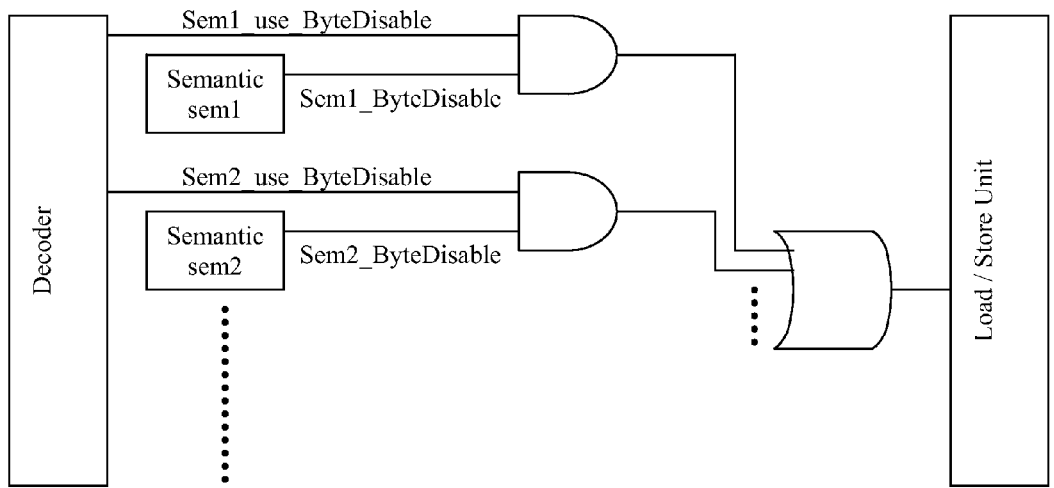
FIG. 27 illustrates providing byte disable logic for a load/store unit in accordance with the invention.

With this scheme, the byte-disable logic is implemented once in the load/store unit and shared among all load/store instructions, including all processor core 2202 instructions as well as all user-defined TIE datapath 2204 instructions. FIG. 27 shows how to combine different load/store instruction semantics to produce shared load-byte-disable and store-byte-disable signals for the common load/store unit.

In another example limitation of the prior system, the data read from the memory is rotated in a particular way, according to the low-order bits of the virtual address from which the data is read. The data written to the memory is not rotated at all. If a load or a store instruction requires the data to be rotated in some other way, additional logic must be used. The present invention provides a more general way of specifying the rotate amount for the read and write data, eliminating the need to have extra rotating logic in the individual instruction semantic logic and allowing multiple instructions to share the rotation logic.

Figure 28:
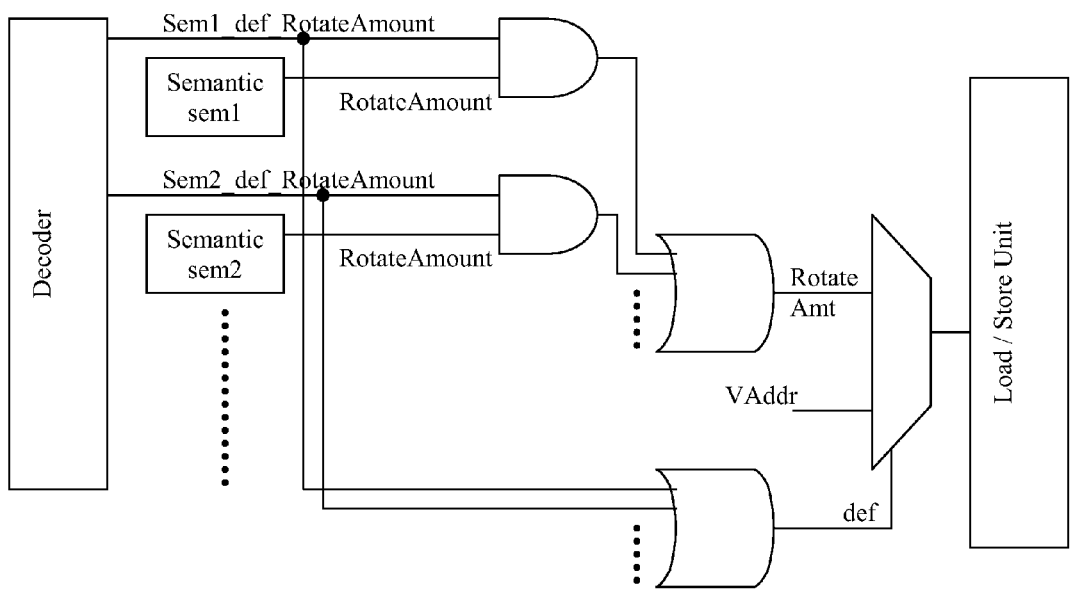
FIG. 28 is a block diagram illustrating rotation logic for a load/store unit in accordance with the invention.

This new capability is provided with the RotateAmount interface signal. With this scheme, the rotation logic is implemented once in the load/store unit and shared among all load/store instructions, including all processor core 2202 instructions as well as all user-defined TIE instructions. FIG. 28 shows how to combine different load/store instruction semantics to produce a single shared rotate-amount signal for the common load/store unit.

As another example, for many load instructions dealing with signed data, it is common to perform sign extension on the data read from the memory. Using the prior system, this can be done in the instruction semantics. However, the sign extension logic typically involves replicating the sign bit many times, therefore increases the output loading of the sign bit and potentially makes it the critical timing path in the semantic logic. As described above, the present application describes a way to perform this sign extension by moving the operation off the critical timing path in the load/store unit. The present invention provides a way for user-defined instructions to use the sign-extension logic in the load/store unit instead of in the instruction semantics, avoiding potential timing problems in the design. To capture the sign-extension requirement, the present invention adds two new signals to the TIE language, SignExtendFrom and SignExtendTo. SignExtendFrom specifies the position of the byte containing the sign bit, which typically is the most significant of the load data. SignExtendTo specifies the position of the most significant byte in the sign-extended data. For example, if the read data is 8'b10001111, SignExtendFrom is 1 and SignExtendTo is 2, the extended data would be 16'b1111111110001111.

With this new capability, the user TIE instruction can load sign-extended data from memory without any extra hardware. The following is an example of how to use this feature:
------
interface SignExtendFrom 5 core out
interface SignExtendTo 5 core out
iclass sign_load {SL}
   {out art, in ars, in imm8} { }
   {out SignExtendFrom, out SignExtendTo, in MemDataIn32, out VAddr}
reference SL {
   assign VAddr=ars+imm8;
   assign SignExtendFrom=5'd2;
   assign SignExtendTo=5'd4;
   assign art=MemDataIn32;
}
------

This description specifies a sign-extended load instruction that reads 16-bit data from memory location specified by "ars+imm8", sign-extended it to 32 bits, and put the sign-extended data to "art".

In almost all applications, there are load/store operations performed only when certain conditions are met. Doing the conditional load/store operations using multiple instructions is often inefficient. For example, the following code sequence:
-------
if (cond) {
   x=load(addr);
}
-------
will typically result in several instructions: evaluating the condition, branch, and load. Further inefficiency comes from the extra delay associated with typical branch instructions. It is desirable to compute this task in a single instruction that can conditionally load the data. However, in the prior system, if a load or a store instruction is issued, there was no way to cancel the load or store operation, making it impossible to implement a conditional load/store instruction. The present invention makes this possible through the use of LoadByteDisable and StoreByteDisable interface signals described earlier. The definition of LoadByteDisable/StoreByteDisable specifies that if all bytes are disabled the associated load/store operations are canceled. The following example illustrates how to use this feature:
------
interface LoadByteDisable 5 core out
iclass cond_load {CL}
   {out art, in ars, in imm8} {in cond}
   {out LoadByteDisable, in MemDataIn32, out VAddr}
reference SL {
   assign VAddr=ars+imm8;
   assign art=MemDataIn32;
   assign LoadByteDisable={5{VAddr[0]==1'b1}};
}
------

This description implements a load instruction that conditionally loads the data when the address is even.

Allowing multiple parallel operations performed by an instruction is a key to increasing the system performance. The VLIW architecture supported by this invention does this by providing multiple operation slots in an instruction as described above. This makes it possible to perform several memory operations concurrently. The implementation of multiple load/store units is described in more detail above. The present invention adds additional capability in TIE for user to associate a load/store instruction with a specific load/store hardware unit. Furthermore, the present invention provides a method for specifying a load/store instruction independent of any particular load/store units and a method for automatically mapping the unit-independent operations to the available hardware load/store units.

Figure 29:
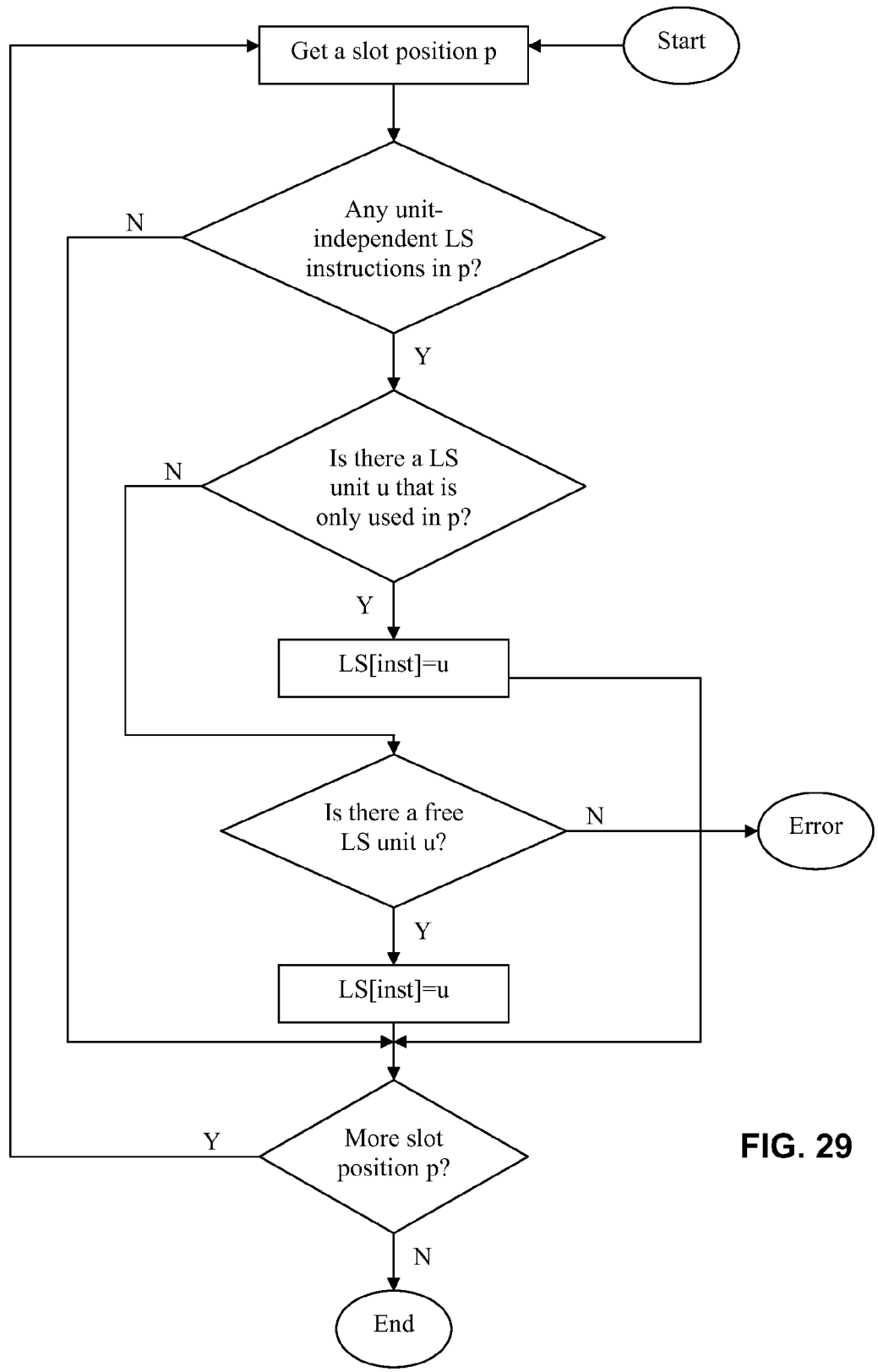
FIG. 29 illustrates a method for associating a load/store unit with an instruction according to the invention.

For any load/store operations specified using unit-independent memory interfaces, an automatic procedure can be used to assign the operations with specific hardware load/store units to optimize certain criteria, such as the total number of units required, or the maximum application performance. One preferred embodiment is illustrated in FIG. 29. The process of assigning a load/store unit to a unit-independent load/store operation starts by looking for a load/store unit that is already used in the same slot position of that instruction. Since each slot position can issue no more than one op per cycle, such an assignment will not result in any resource (load/store units) contention. If such a load/store unit cannot be found, the assignment process looks for a load/store unit that is not used anywhere. When the second step fails, the process issues an error message to the user.

Referring back to FIG. 18, another aspect of the present invention is the ability to define shared functions. In the prior processor generation system, the semantics of TIE instructions are expressed as a collection of assignments of variables with logic expressions. Even though this was sufficient for specifying any instruction semantics, there was no way of expressing common computational procedures among a group of instructions. As an example, the following is the semantic description of two TIE instructions Load and Store:

```
reference Load {
    wire [31:0] buf;
    assign VAddr=ars+imm8;
    assign buf=MemDataIn32;
    assign art=swap? {buf[7:0], buf[15:8], buf[23:16], buf[31:24]}:buf;
}
reference Store {
    wire [31:0] buf;
    assign VAddr=ars+imm8;
    assign buf=swap? {art[7:0], art[15:8], art[23:16], art[31:24]}:art;
    assign MemDataOut32=buf;
}
```

The "Load" instruction loads 32 bits from memory and conditionally swap the bytes depending on the value of the state register "swap". Likewise, the "Store" instruction stores 32 bits to memory before conditionally swap the bytes depending on the value of the state register "swap". The byte swapping computation is present in both semantics, but have to be specified twice. Using TIE function construction, this description can be made more structured and understandable as follows:

```
function [31:0] byteswap(S, [31:0] D) {
    assign byteswap=S ? {D[7:0], D[15:8], D[23:16], D[31:24]}:D;
}
reference Load {
    assign VAddr=ars+imm8;
    assign art=byteswap(swap, MemDataIn32);
}
reference Store {
    assign VAddr=ars+imm8;
    assign MemDataOut32=byteswap(swap, art);
}
```

The TIE function construct of the present invention is even useful to structure a single instruction semantics when it performs the same computations several times in parallel. In the following example, the instruction addsub4×8 performs two 8-bit additions or subtractions depending on the value of the state register "sub".

```
semantics addsub4×8 {addsub4×8} {
    wire [7:0] t0=ars[7:0]+(sub ?~art[7:0]:art[7:0])+sub;
    wire [15:8] t1=ars[15:8]+(sub ?~art[15:8]:art[15:8])+sub;
    wire [23:16] t2=ars[23:16]+(sub ?~art[23:16]:art[23:16])+sub;
    wire [31:24] t3=ars[31:24]+(sub ?~art[31:24]:art[31:24])+sub;
    assign arr={t3, t2, t1, t0};
}
```

Clearly, the 8-bit addsub unit is specified four times. Using the new TIE function construct of this invention, the same description can be made more structured and more understandable as:

```
function [7:0] addsub8(sub, [7:0] a, [7:0] b) {
    assign addsub8=a+(sub ?~b:b)+sub;
}
semantics addsub4×8 {addsub4×8} {
    wire [7:0] t0=addsub8(sub, ars[7:0], art[7:0]);
    wire [15:8] t1=addsub8(sub, ars[15:8], art[15:8]);
    wire [23:16] t2=addsub8(sub, ars[23:16], art[23:16]);
    wire [31:24] t3=addsub8(sub, ars[31:24], art[31:24]);
    assign arr={t3, t2, t1, t0};
}
```

The prior processor generation system allows for several instruction semantics to share common hardware. But in order to achieve the sharing, the user has to merge the description of the instructions into a single semantic section and specify the sharing manually. For example, let ADD2, ADD3, and ADD4 be three instructions which add two, three, or four numbers. Using prior art invention, the description would look like:

```
semantic add {ADD2, ADD3, ADD4} {
    assign sum=D0+D1+(ADD2 ? 0:D2)+((ADD2|ADD3) ? 0:D3);
}
```

Using the shared function construct of this invention, the instruction semantics can be specified separately as

```
function [31:0] a4([31:0] d0, [31:0] d1, [31:0] d2, [31:0] d3) shared {
    assign a4=d0+d1+d2+d3;
}
semantic add2 {ADD2} {
    assign sum=a4(D0, D1, 0, 0);
}
semantic add3 {ADD3} {
    assign sum=a4(D0, D1, D2, 0);
}
semantic add4 {ADD4} {
    assign sum=a4(D0, D1, D2, D3);
}
```

Figure 30:
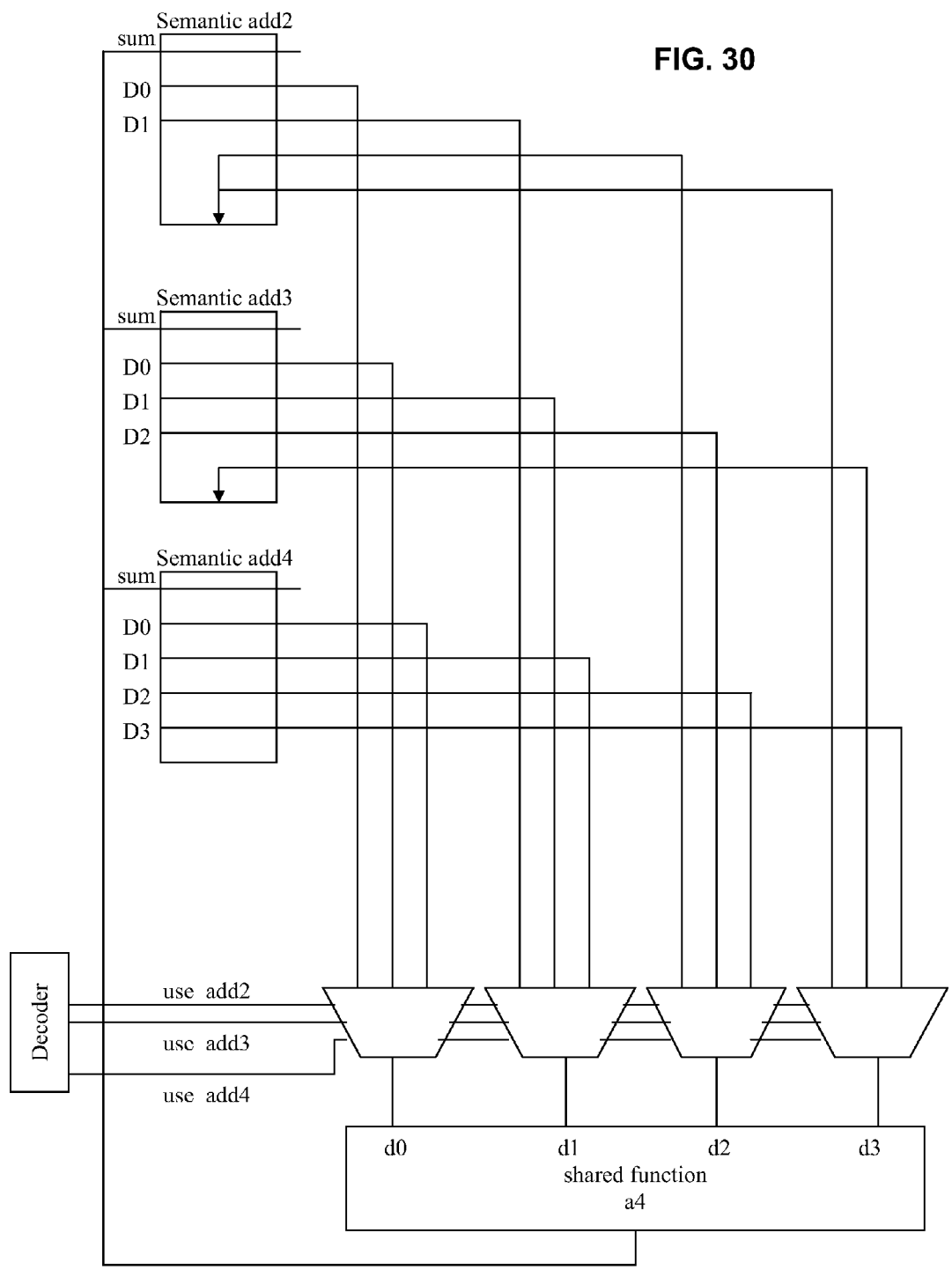
FIG. 30 illustrates providing a shared function in accordance with the invention.

Unlike software, hardware description language does not offer a direct way for two different modules to share a logic block. This invention provides a process by which the TIE compiler can automatically generate the RTL implementation for multiple semantic modules to share a function. The process involves the following steps:
    (1) create a module for the shared function
    (2) create a wrapper module for the shared function module
    (3) for each input of the shared function
        (a) create a mux with N inputs where N is the number of semantic modules using the shared function
        (b) feed the output of the mux to the shared function
    (4) for each semantic module using a shared function (a) create an output for each input of the shared function
(b) create an input for the output of the shared function
(c) feed the semantic outputs to the wrapper module as inputs
(d) feed the wrapper module output to the semantics as an input (5) create in the decoder one signal for caller of the shared function and pass the signals to the wrapper module (6) use the decoding signals to select the appropriate inputs in the wrapper module Using this process, generated RTL for the above example is shown in FIG. 30.

The shared function in the present invention provides TIE with the capability of describing an instruction that uses a hardware computational unit several times (thus the term iterative instruction). This was not possible in the prior generation system. With this feature, the computational hardware would have to be replicated multiple times, resulting in extra hardware cost. For example, if one wanted to implement an instruction that does two 16-bit multiplications, using the prior system, the only way to do this is to use two 16-bit multipliers, as illustrated in the following description:

---------
semantics mul2 {MUL2} {
    wire [15:0] lo=ars[15:0]*art[15:0];
    wire [15:0] hi=ars[31:16]*art[31:16];
    assign arr={hi, lo};
}
---------

Using TIE shared function construct of the present invention, the instruction can be described using:

---------
function [15:0] mul16([15:0] a, [15:0] b) shared {
    assign mul16=a*b;
}
semantics mul2 {MUL2} {
    wire [15:0] hi=mul16(ars[31:16], art[31:16]);
    wire [15:0] lo=mul16(ars[15:0], art[15:0]);
    assign arr={hi, lo};
}
schedule mul2_sch {MUL2} {
    def arr 2;
}
---------

Figure 31:
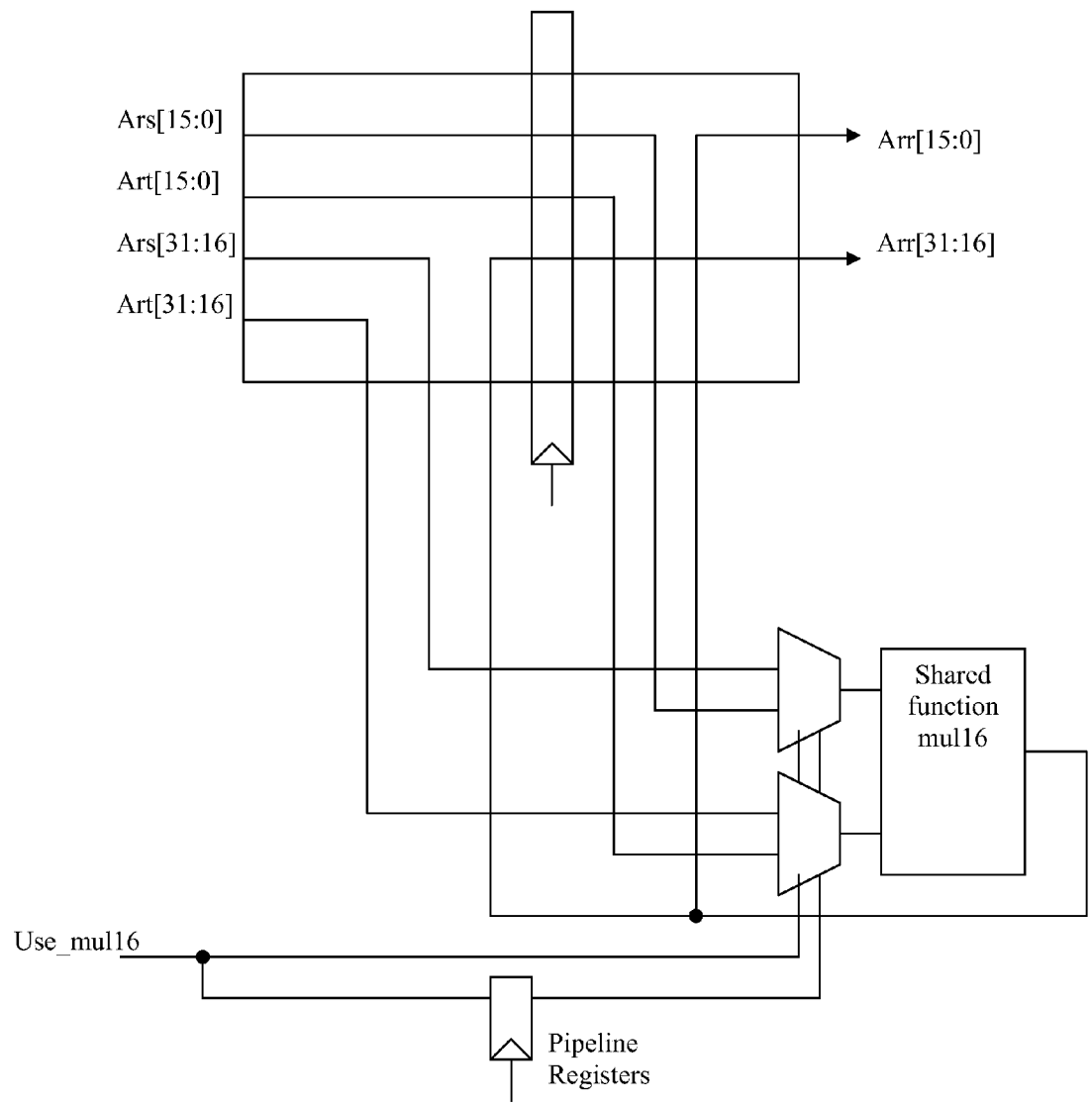
FIG. 31 illustrates an example of a shared function performing an iterative instruction in accordance with the invention.
Figure 32:
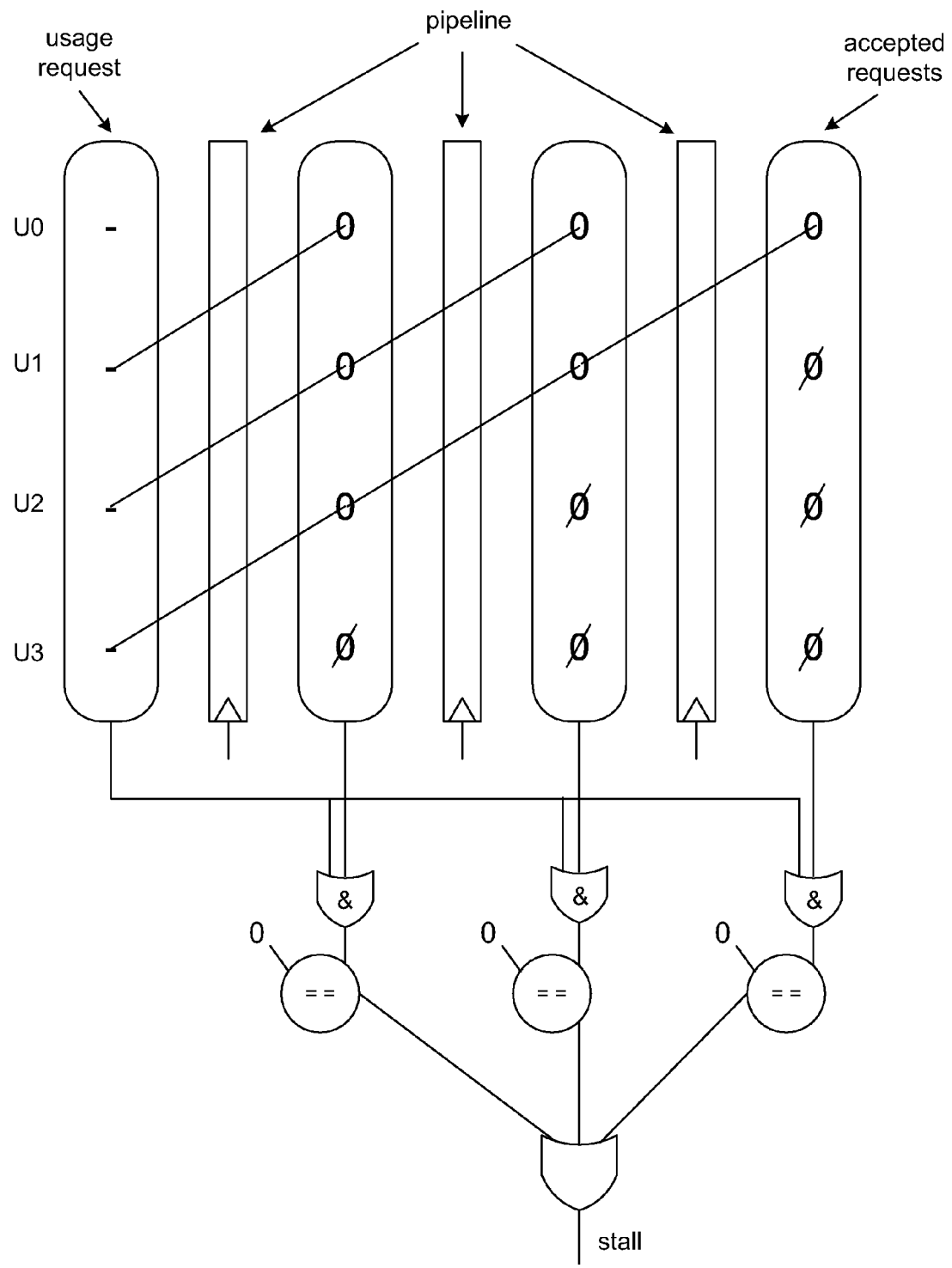
FIG. 32 illustrates pipeline stall logic useful in accordance with a processor of the invention.

With this description, the 16-bit multiplier is only implemented once in hardware and used twice during the single execution of the instruction MUL2. The RTL implementation of using a shared function several times in a single iterative instruction is very similar to using a shared function in several different instructions. FIG. 31 shows the RTL structure for the above example. Since an iterative instruction uses a shared function in multiple cycles, it is important that the instruction issuing logic understands the resource constraints imposed by the use of shared functions. In particular, the processor needs to be stalled whenever such a resource conflict is detected. Using the previous example, if the program has a back-to-back MUL2 instructions, the second one must be stalled for one cycle. Without the stall, the processor would see the first MUL2 in stage 2 and the second in stage 1, both trying to use the shared function mul16 at the same time. To inform the processor of any up-coming resource contentions, each shared function generates a stall signal that tells the processor control whether the current instruction needs to be stalled. There can be any number of ways of implementing the stall logic. In one embodiment, the shared function RTL provides an interface to take as an input a usage request and tells the processor control whether the request can be granted (i.e., yes when the stall signal is true). Internally, it keeps all of the previously accepted and un-finished requests and uses them to compare with any new request. FIG. 32 shows the stall logic for a shared function that is to be used in 4 different cycles by various instructions.

As set forth above in reference to FIG. 18, another aspect of the present invention is more efficient and more flexible use of register files. The register operand of an instruction specifies which register in the register file is to be used as the input or output for the computation. In the prior processor generation system, there was only one way of specifying the register operand: to encode the actual register number in the register operand field of the instruction. For example, the following is a TIE description for a register operand using prior art invention:

----------
operand art t {AR[t]}
----------

This register operand definition specifies that the actual register number in the AR register file is the value stored in the instruction field "t". The present invention provides a much more general way of specifying register operands.

An important aspect of increasing the amount of computation performed by an instruction is to increase the number of input and output data. However, due to the limited number of bits in an instruction, there is a limit as to how many register operands can be used by an instruction. This invention provides a way for a single register operand to specify multiple adjacent registers in the register file. This new capability is based on an enhanced register file and register operand description. An example description would be:

--------------
regfile INT8 8 16 s INT16=2 INT32=4
--------------

Figure 33:
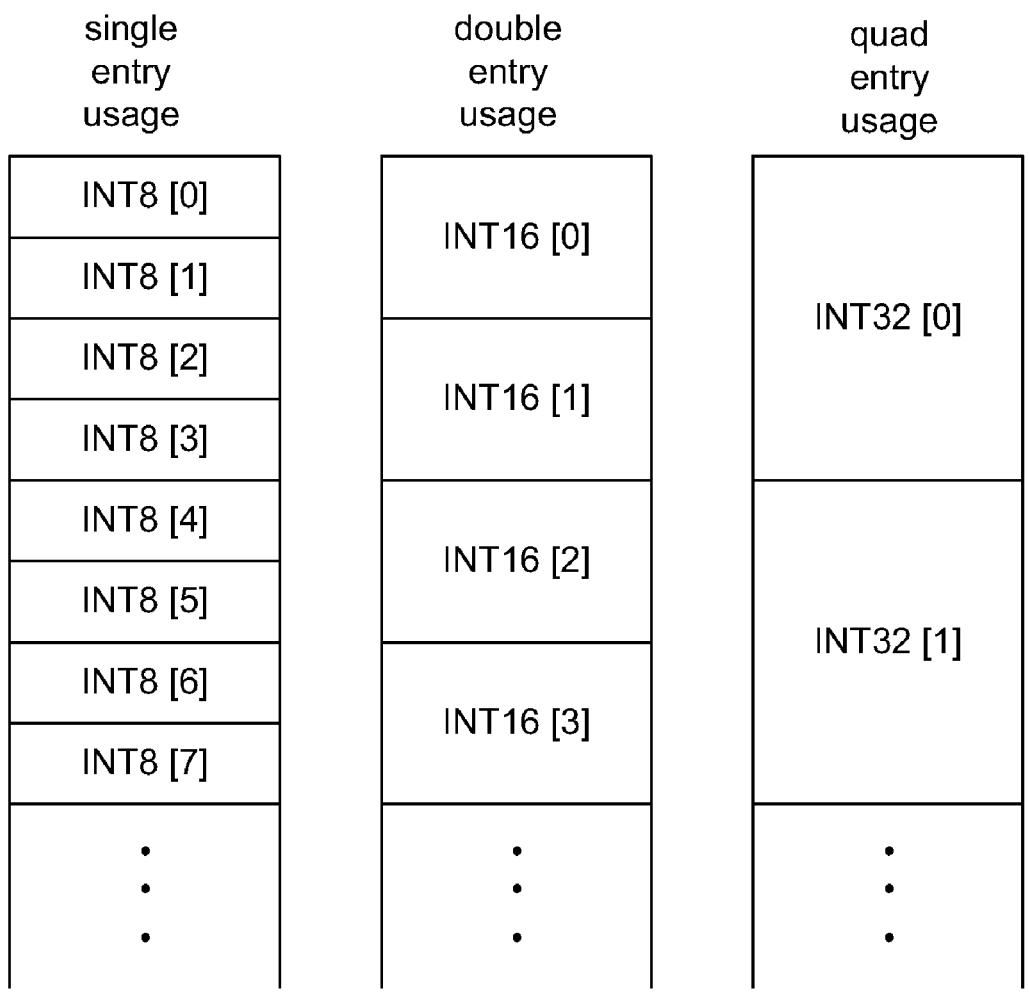
FIG. 33 illustrates enhanced operand register file semantics according to the invention.

This example of TIE code declares a register file INT8 for holding 32 8-bit integers. When every two entries are grouped, the register file can be used to hold 8 16-bit integers. When every four entries are grouped, the register file can be used to hold 4 32-bit integers. FIG. 33 shows this register file with multiple usages.

There are two ways of using this new capability to increase the computational efficiency of an instruction. The first is to group several adjacent registers together as a way of passing more data to and from the instruction semantics (the computational logic). This is illustrated with the following example:

----------------------
regfile RFS 32 16 r RFD=2 RFQ=4
field rd r[3:1]
field sd s[3:1]
field td t[3:1]
field rq r[3:2]
field sq s[3:2]
field tq t[3:2]
operand rfss s {RFS[s]} /* single entry operand */
operand rfst t {RFS[t]} /* single entry operand */
operand rfsr r {RFS[r]} /* single entry operand */
operand rfds sd {RFD[sd]} /* double entry operand */
operand rfdt td {RFD[td]} /* double entry operand */
operand rfdr rd {RFD[rd]} /* double entry operand */
operand rfqs sq {RFQ[sq]} /* quad entry operand */
operand rfqt tq {RFQ[tq]} /* quad entry operand */
operand rfqr rq {RFQ[rq]} /* quad entry operand */
iclass adds {ADDS} {out rfsr, in rfss, in rfst}
iclass addd {ADDD} {out rfdr, in rfds, in rfdt}
iclass addq {ADDQ} {out rfqr, in rfqs, in rfqt}
reference ADDS {
assign rfsr=rfss+rfst;
}

```
reference ADDD {
    wire [31:0] t0=rfds[31:0]+rfdt[31:0];
    wire [31:0] t1=rfds[63:32]+rfdt[63:32];
    assign rfdr={t1, t0};
}
reference ADDQ {
    wire [31:0] t0=rfqs[31:0]+rfqt[31:0];
    wire [31:0] t1=rfqs[63:32]+rfqt[63:32];
    wire [31:0] t2=rfqs[95:64]+rfqt[95:64];
    wire [31:0] t3=rfqs[128:96]+rfqt[128:96];
    assign rfqr={t3, t2, t1, t0};
}
```
----------------------

The "regfile" statement defines a base register of 16 entries each of which is 32-bit wide. Because the 64-bit wide register only has 8 entries, it is accessed using 3-bit fields rd, sd, and td. Likewise, the 4-entry 128-bit wide register file is accessed using 2-bit fields rq, sq and tq. This description capability makes it possible to define the more efficient instruction ADDD and ADDQ which perform two and four additions respectively.

The second way of using the wide register file is to use the multiple register entries to represent wider data. For instance, a single-precision floating-point register file can also be viewed as a double-precision register file with half as many entries.

As another example, consider the following use of wide register operands for a cartesian point data type:

----------------------
```
regfile SCALAR 32 16 x POINT=2
ctype point 64 64 POINT
field sc s[2:0]
field rc r[2:0]
field tc t[2:0]
operand cs sc {POINT[sc]}
operand cr rc {POINT[rc]}
operand ct tc {POINT[tc]}
iclass point_arith {CADD} {out cr, in cs, in ct}
reference CADD {
    assign cr={cs[63:32]+ct[63:32], cs[31:0]+ct[31:0]};
}
```
----------------------

This example defines a 32-bit 16-entry base register file "SCALAR" and a "POINT" view that groups every two base registers into a wide register. It then declares a ctype "point" so that it can be used in an application code to declare the point data type. Since the wide register file "POINT" only has half as many registers (eight), it only needs 3 bits to address a register, thus the definition of field "sc", "rc", and "rt". The wide operand "cs", "cr", and "cr" are defined using the field "sc", "rc", and "tc" to access the wide register file "POINT". Finally, the cartesian point addition instruction "CADD" is defined. This description makes it possible to write application code like:

----------------------
point C1, C2, C3;
. . .
C3=CADD(C1, C2);
. . .
----------------------

There are multiple ways of implementing a register file with multiple groupings. A preferred way is to build it hierarchically and is outlined here:

step1: dividing the register file into banks. Build multiple banks of the base register file. The number of entries in each bank register file is obtained by dividing the number of entries in the base register file by the largest group number. For the above example, each bank will have 8 entries. The number of banks to build is the same as the largest group number. For the above example, two banks will be built.

step2: building read ports. The width of the read port is determined by multiplying the base register file width by the largest group number. For the above example, the width is 64. The read port is driven by a mux selecting the read data from various banks according to the low-order bits of the read address. For the above example, the least significant 32-bit of the read port is selected from bank0 if the least significant bit of the read address is 0 and from bank1 if the bit is 1.

step3: building write ports. The register file has one write data port for each group width. The write data to each of the bank is selected from the appropriate write data depending on the current write group number. For the above example, the write data to bank0 is the single width write data if the write group number is 1, and is the low order 32 bits of the double write data if the write group number is 2.

step4: building stall logic. The register file stall logic is simply the logical OR of the stall signals from each bank. The code attached as Appendix Q shows a RTL implementation for the above example. The code attached as Appendix R shows an implementation of the above procedure in perl.

In the RTL implementation, each input/output register operand is mapped to a read/write port of the corresponding register file. In the prior system, this mapping was done automatically by the TIE compiler. There was no way to override the outcome of the mapping procedure. Since the number of read and write ports of a register file effect both the silicon area and the clock speed of the implementation, it is desirable to be able to specify the operand to register-file port association manually in the TIE description when attempting to optimize certain aspect of the design. The present invention adds this new capability to TIE.

Figure 34:
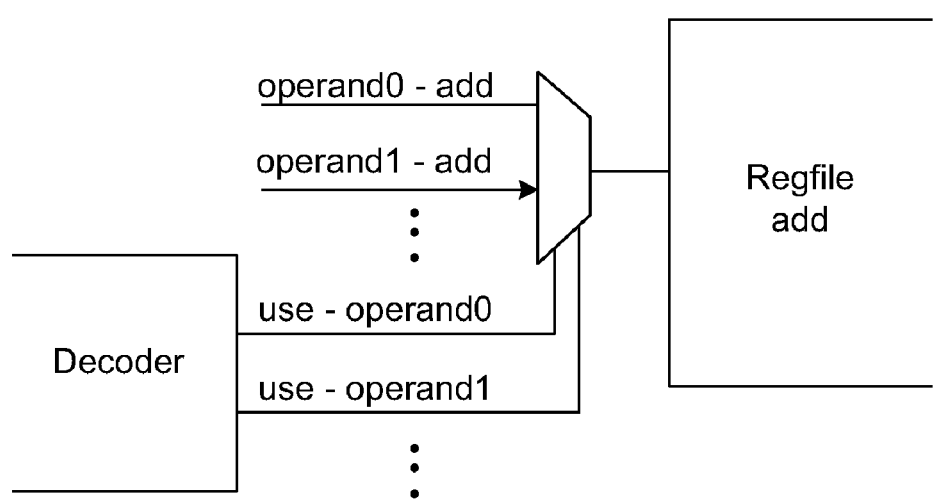
FIG. 34 illustrates enhanced operand register file interface according to the invention.

With multiple register operands mapped to a single physical register file port (read or write), additional muxing logic is needed to generate the read or write address. The data inputs to the mux come from each operand assigned to the port. The select signals to the mux are generated by the decoder. FIG. 34 illustrates the circuit structure of the logic.

In operand definition, the operand semantics is the logic for computing the actual register number from the value stored in an instruction field. In the prior system, the register operand semantics must be a simple identity function, that is the register number must be directly present in an instruction field. Even though this has the advantage of being simple, it is sometimes too restrictive. The present invention extends the TIE language to allow for arbitrary operand semantic description. The "operand" language construct is used to capture an operand semantics.

Syntax:
   operand: operand operand-name field-name regfile-name {computation}
   operand: keyword
   operand-name: an unique operand name
   field-name: an previously defined field name
   regfile-name: an previously defined register file name
   computation: operand semantic logic
operand-name is the name of the operand to be defined. field-name is the name of a previously defined field which is used as an input to the operand semantic logic. regfile-name is the name of a previously defined register file with which this operand is associated. computation is any logic description for the operand semantics. The field-name must be used as an input in the computation. In addition, the computation can also use other processor states and constants. The computation eventually assigns a value to operand-name. In addition, it can assign values to other processor states.

For example, consider defining an operand to access a subset of the registers in a register file. Given the limited number of bits in an instruction, it is some time desirable to reduce the number of bits dedicated to an register operand when only a subset of the registers need to be accessed. This is illustrated in the following TIE description:

```
state BANK 2
state COUNT 16
regfile XR 32 16 x
field t3 t[2:0]
field t2 t[1:0]
field t1 t[0:0]
operand xeven t3 XR {
    assign xeven={t3, 1'b0};
}
operand xhigh t3 XR {
    assign xhigh={1'b1, t3};
}
operand xfirst t1 XR {
    assign xfirst={3'b0, t1};
}
operand xbanked t2 {
    assign xbanked={BANK, t2};
}
operand xtracked t XR {
    assign xtracked=t;
    assign COUNT=COUNT+1'b1;
}
```

In this example, the register file XR can be accessed in many different ways. "xeven" can be used to access any even registers. "xhigh" can be used to access the upper half of the register file. "xfirst" can be used to access one of the first two registers. "xbanked" can be used to access the register in any one of the four banks of XR registers as specified by the state BANK. "xtracked" can access any one of the 16 registers, but has the side effect of keeping the number of times it is used in the state COUNT. The process of implementing hardware for a general register operand is outlined below:
  create a module for the operand
  create an input for the instruction field used by the operand
  create an input for each state used by the operand semantics
  create an input for each interface signal used by the operand semantics
  create an output for the operand
  create an output for each state defined by the operand semantics
  create an output for each interface signal defined by the operand semantics
  create an output for each exception signal defined by the operand semantics
  copy the operand semantics to the module
  For example, the following operand description:

```
operand ars s AR {
    wire [3:0] wb1=WindowBase+1;
    wire [3:0] wb2=WindowBase+2;
    wire [3:0] wb3=WindowBase+3;
    assign WindowOverflow4=(s[3:2] !=2'b00) ?
        (((PSWOE && !PSEXCM)) && (WindowStart[wb1])): 0;
    assign WindowOverflow8=(s[3]==1'b1) ?
        (((PSWOE && !PSEXCM)) && (WindowStart[wb2])): 0;
    assign WindowOverflow12=(s[3:2]==2'b11) ?
        (((PSWOE && !PSEXCM)) && (WindowStart[wb3])): 0;
    assign ars=s+{WindowBase, 2'b00};
}
``` will result in a verilog module with

| input s | /* operand field */ |
|---|---|
| input WindowStart | /* used state */ |
| input WindowBase | /* used state */ |
| input PSWOE | /* used state */ |
| input PSEXCM | /* used state */ |
| output WindowOverflow4 | /* exception */ |
| output WindowOverflow8 | /* exception */ |
| output WindowOverflow12 | /* exception */ |
| output ars | /* operand output */ |

In the prior processor generation system, a register operand must be defined as a function of an instruction field. The present invention allows for the definition of a register operand to be independent of any instruction field. An operand not depending on any instruction field is called an "implicit" operand. The present invention adds the following construct to the TIE language to capture the implicit operand.
  Syntax:
  implicit-operand-def: implicit_operand operand-name regfile-name {computation}
  implicit_operand: keyword
  operand-name: an unique operand name
  regfile-name: a previously defined register file name
  computation: operand semantic logic
where operand-name is an unique name of the operand to be defined. regfile-name is a previously defined register file with which this operand is associated. computation is any logic description and must eventually assign a value to operand-name.

Consider the following example of defining implicit operands to access a register file:

```
state INDEX 4
regfile XR 32 16 x
implicit_operand x0 XR {
    assign x0=0;
}
implicit_operand xr XR {
    assign xr=INDEX;
}
```

This example defines two implicit operands. "x0" can be used to access the first register in the register file XR. "xr" can be used to access any register numbered by the state INDEX. Both of these operands are implicit because they do not depend on any instruction fields. The RTL implementation of the implicit operand is very similar to that of the general operand, with the exception that the field input to the operand module is omitted because implicit operands do not depend on any instruction field.

In the prior processor generation system, a TIE instruction cannot raise exceptions. For example, it was not possible to define a TIE instruction that performs a division and raise a divide-by-zero exception if the divisor is zero. Likewise, it was not possible for a TIE load instruction to raise an unaligned-load exception when the address is not aligned. The present invention adds this new capability. The process of defining an exception has two steps: defining an exception and specifying the conditions under which the exception is to be raise. They are described hereinbelow.

An processor exception can be defined using the TIE exception construct. An exception has semantics that is the logic to be evaluated when the exception is taken. An exception can be raised by an instruction in its semantic logic or operand logic. An exception can also be raised as the result of evaluating the semantics of another exception. Exceptions have priorities. If an instruction raises several exceptions, the one with the highest priority will be taken by the processor.

Syntax:

exception-def: exception name {higher-priority-list} {computation} exception: keyword name: an unique exception name higher-priority-list: list of exception names with higher priority computation: exception logic for what to do when this exception is taken where "name" is an unique name of the exception. "higher-priority-list" is a list of exception names with higher priority. It is not necessary for an exception to be in the list if it has higher priority than at least one other exception in the list. For example, if exception A has higher priority than exception B which in turn has higher priority than exception C, it is sufficient to just put B in the higher-priority-list of C. "computation" specifies the logic to be evaluated when the exception is taken. It can read processor states and interface signals, and assign values to processor states and interface signals. Moreover, it can also raise another exception upon certain conditions. The exception semantic logic must contain an assignment to the processor interface signal "ExceptionVector". Optionally, it can assign certain value to the processor state EXCCAUSE as a way of passing some information to the exception handler for the cause of the exception.

Consider an example of defining an overflow exception for an add instruction:

```
exception add_overflow {
    WindowOverflow4, WindowOverflow8, WindowOverflow12
}{
    assign ExceptionVector=32'h40000810;
}
```

This example defines a new exception "add_overflow". It has lower priority than the exception WindowOverflow4, WindowOverflow8, and WindowOverflow12. When this exception is taken, the processor will jump to location 32'h40000810 which should be loaded with the handler for this exception.

To allow for an instruction to conditionally raise an exception, the TIE iclass construct has been extended to have an additional clause for specifying a list of exception names. With the iclass definition, the instruction semantics can assign values to the exception names. The list of exceptions in the iclass qualifies the exceptions that can ever be raised for the opcodes in the iclass. For example, if an add instruction can raise the overflow exception defined in the previous section, its iclass may look like:

```
iclass add {ADD} {out arr, in ars, in art} { } { } {out add_overflow}
```

With this iclass definition, the semantic logic can assign "add_overflow" with 1 when an overflow occurs during the addition.

```
reference ADD {
    wire [31:0] tmp=ars+art;
    assign arr=tmp;
    wire ss=ars[31];
    wire st=art[31];
    wire sr=tmp[31];
    assign add_overflow=~ss & ~st & sr|ss & st & ~sr;
}
```

Raising an exception in an operand semantics is allowed by this invention, and can be specified by assigning the exception with a logic expression. When the expression is evaluated to 1, and when the exception is included in the list of exceptions for the iclass of the opcode, the exception is raised. For example:

```
regfile XR 32 16 x
operand xr r XR {
    assign xr=r;
    assign last_exception=r==4'b1111;
}
```

It raises the "last_exception" when an instruction attempts to access the last entry in the register file.

An exception raised by an instruction or operand semantics is called a primary exception.

An exception raised by another exception is called a secondary exception. Raising a secondary exception in an exception semantics is also allowed by this invention, and can be specified by assigning the exception with a logic expression. When the expression is evaluated to 1, the exception is raised. For example:

```
exception exc_s { } {
    assign ExceptionVector=...
}
exception exc_p { } {
    assign ExceptionVector=...
    assign exc_s=COND==4'b1011;
}
```

When the exception "exc_p" is raised by an instruction, it will raise the exception "exc_s" if the state "COND" has value "4'b1011".

The example implementation described here handles primary and secondary exceptions. However, the method is general and handles any fixed depth of exception nesting. The extension from the example implementation is entirely straightforward and obvious to one skilled in the art.

Figure 35:
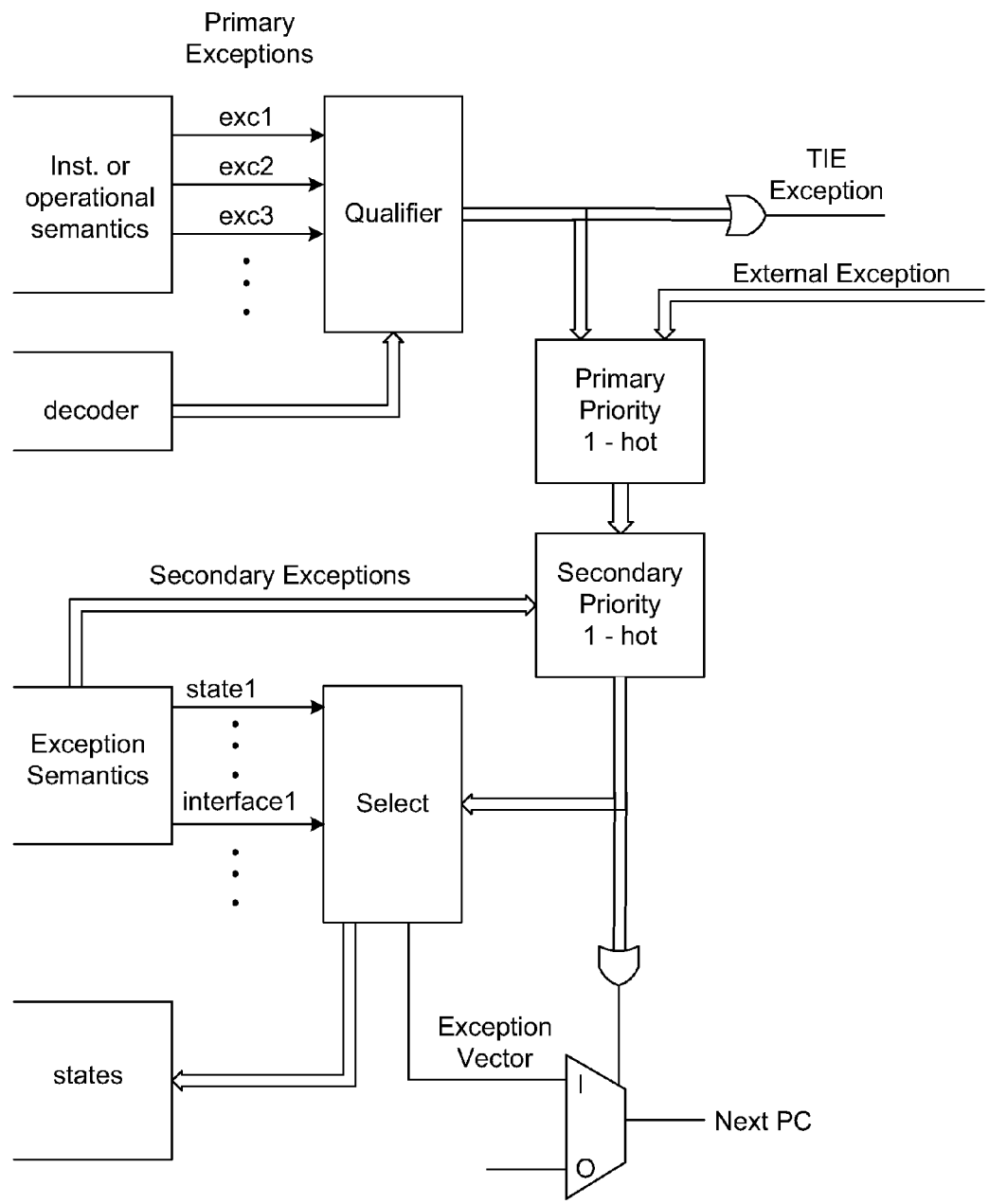
FIG. 35 is a block diagram for illustrating exception handling according to an aspect of the invention.

When multiple primary exceptions are raised, the one with the highest priority is selected. Then, the semantics of that exception is evaluated. If the semantics raises one or more secondary exceptions, the highest priority one among the secondary exceptions will be taken. When there are no secondary exceptions, the selected primary exception is taken. FIG. 35 shows one way of implementing the exception logic. The qualifier 1 block accepts exception signals from all the instruction semantic blocks and operand semantic blocks. Using decoding signals from the decoder, it selectively turns off the exception based on whether the exception is in the list of exceptions to be raised by the current instruction. After the qualification, the logic generates a TIE_Exception signal to the external logic. The external logic also sends a list of external exception signals to the exception generation logic. The combined exception signals are then fed into a priority logic block such that all but the highest priority signal are turned off. After the priority logic, there is no more than one exception active. Parallel to prioritizing the primary exception signals is the logic for generating the secondary exception signals in the exception semantic blocks. The set of secondary exception signals along with the prioritized primary exception signals are fed to the secondary priority logic block. In this block, any secondary exception signals not associated with the currently active primary signal are turned off. The remaining secondary signals are prioritized and all but the one with highest priority are turned off. Finally, the active primary signal is turned off if any of its secondary exceptions is active. After the secondary priority logic, the exception signals are used to select the states and interface signals generated by the exception semantics. Only the ones corresponding to the active exception are selected. One of the interface signals defined by the exception semantics is the exception vector. This exception is selected to be the next PC if an exception happens.

As mentioned above, another aspect of the invention is the addition of certain built-in modules. In this regard, it is noted that certain commonly used computations have no language-defined operators. However, using other language constructs is either very tedious to describe or very hard to implement efficiently. TIE provides a set of commonly used operators as built-in modules invoked in the similar way as function calls. The following are the rules common to all built-in modules: Each built-in module has its own definition of computed-width. The definition is not effected by the required-width of the context. The inputs to the built-in modules have no required-width. In the case where an input does not have enough bits as needed by the definition of the built-in module, it is 0-extended.

The following are descriptions of built-in modules according to a preferred implementation of the invention.

TIEadd:
Synopsis: sum=TIEadd(a, b, cin)
Definition: sum=a+b+cin
Description: Addition with carry-in. It is an error if the TIEadd does not have three arguments and the computed-width of the last argument is not 1. If the computed-width of a and b are different, the narrower input is evaluated in its computed-width and then 0-extended.

TIEaddn
Synopsis: sum=TIEaddn(A0, A1, . . . , An−1)
Definition: sum=A0+A1+ . . . +An−1
Description: N-number addition. There must be at least three arguments to the bult-in module. If the computed-width of the inputs are different, the narrower inputs are evaluated in their computed-width and then 0-extended. The advantage of using he TIEaddn built-in module is that the underlying RTL implementation will be much more timing and area efficient than simply using the + operator.

TIEcsa
Synopsis: {carry, sum}=TIEcsa(a, b, c)
Definition: carry=a&b|a&c|b&c
sum=a^b^c
Description: Carry-save adder. TIEcsa must have exactly three arguments. If the computed-width of the inputs are different, the narrower inputs are evaluated in their computed-width and then 0-extended. The computed-width of TIEcsa is twice of the input width. The lower half of the result represents the sum bits and the upper half the carry bits. In order to add the sum and carry, the carry must be shifted to the left by 1 bit. This module is provided to allow efficient implementation of adding or subtracting several numbers, accomplished by a serious of csa reduction followed by a single adder.

TIEcmp
Synopsis: {lt, le, eq, ge, gt}=TIEcmp(a, b, signed)
Definition: {lt, le, eq, ge, gt}={a<b, a<=b, a==b, a>=b, a>b}
Description: Signed and unsigned comparison. It is an error if the TIEcmp does not have three arguments and the computed-width of the last argument is not 1. If the computed-width of a and b are different, the narrower input is evaluated in its computed-width and then 0-extended. If the input signed is true, the comparison is for signed data. Otherwise, the comparison is for unsigned data.

TIEmac
Synopsis: o=TIEmac(a, b, c, signed, negate)
Definition: o=negate ?c−a*b:c+a*b
Description: Multiply-accumulate. The multiplication is signed if signed is true and unsigned otherwise. The multiplication result is subtracted from the accumulator c if negate is true and added to the accumulator c otherwise. If the computated-width of the multiplication is less than the width of the accumulator, the multiplication result is sign-extended if signed is true and 0-extended otherwise. The computed-width of signed and negate must be 1. In order to avoid slowing down the clock frequency of the Xtensa, any instruction that uses TIEmac should be allocated with at least two cycles. However, by carefully choosing the instruction schedule, it is possible to achieve the throughput of one TIEmac operation per cycle.

TIEmul
Synopsis: prod=TIEmul(a, b, signed)
Definition: prod=a*b
Description: Multiply. The multiplication is signed if signed is true and unsigned otherwise. The computed-width of signed must be 1. In order to avoid slowing down the clock frequency of the Xtensa, any instruction that uses TIEmul should be allocated with at least two cycles.

TIEmulpp
Synopsis: {p0, p1}=TIEmulpp(a, b, signed, negate)
Definition: p0+p1=negate ?−a*b:a*b
Description: Partial-product multiply. This modules returns two partial products of the multiplication. The multiplication is signed if signed is true and unsigned otherwise. The sum of the two partial products equals the product. If negate is true, the sum equals the negative of the product. The definition does not give specific meaning to the individual partial product. The computed-width of signed and negate must be 1. This module is provided to allow efficient implementation of certain algebraic expressions involving multiplications, additions, and subtractions.

TIEmux
Synopsis: o=TIEmux(s, D0, D1, . . . , Dn−1)
Definition: o=s==0 ? D0:s==1 ? D1: . . . :s==n−2 ? Dn−2:Dn−1
Description: n-way multiplexor. This module returns one of the n data depending on the value of the select signal. The number of data, n, must be power-of-2. The width of the select signal must be log 2(n).

TIEpsel
Synopsis: o=TIEpsel(S0, D0, S1, D1, . . . , Sn−1, Dn−1)
Definition: o=S0 ? D0:S1 ? D1: . . . :Sn−1 ? Dn−1:0
Description: n-way priority selector. This module selects one of n input data according the values and priorities of the select signals. The first select signal has the highest priority and the last the lowest. If none of the selection signal is active, the result is 0. The width of select signals must be 1.

TIEsel
Synopsis: o=TIEsel(S0, D0, S1, D1, . . . , Sn−1, Dn−1)
Definition: o=S0 ? D0:S1 ? D1: . . . :Sn−1 ? Dn−1:0

Description: n-way 1-hot selector. This module selects one of n input data according the values of the select signals. The select signals are expected to be 1-hot. If none of the selection signal is active, the result is 0. If more than 1 select signal is active, the result is undefined. The width of select must be 1.

Although the present invention has been particularly described with reference to the preferred embodiments thereof, it should be readily apparent to those of ordinary skill in the art that changes and modifications in the form and details thereof may be made without departing from the spirit and scope of the invention. For example, those skilled in the art will understand that variations can be made in the number and arrangement of components illustrated in the above block diagrams. It is intended that the appended claims include such changes and modifications.

What is claimed is:

1. A system for generating a processor, comprising:
hardware generation means for, based on a configuration specification including a predetermined portion and a user-defined portion, automatically generating a description of a hardware implementation of the processor;
wherein the hardware generation means includes fetch unit generation means for, based on the configuration specification, automatically including an instruction fetch unit in the description of the hardware implementation of the processor,
and wherein the fetch unit generation means is operable to configure the hardware description of the instruction fetch unit such that it is capable of recognizing instructions having a plurality of different instruction sizes that are specified by the user-defined portion of the configuration specification, wherein the different instruction sizes are 16 and 24 bits, and a third larger size.

2. A system according to claim 1, wherein at least one of the different instruction sizes is corresponds to a very long instruction word (VLIW) having a plurality of instruction slots, and at least one other of the different instruction sizes comprises only one instruction slot.

3. A system according to claim 1, wherein the instruction fetch unit recognizes the different instruction sizes by dynamically computing a starting byte of a next fetched instruction having a next instruction size from information contained in a first fetched instruction having a first instruction size different from the next instruction size, and wherein the information is contained in a field at a predetermined position within the first fetched instruction.

4. A system according to claim 3, wherein the next fetched instruction contains the field at the predetermined position within the next fetched instruction which provides information regarding the next instruction size.

5. A system according to claim 4, wherein the processor is adapted for use in a little-endian system and the predetermined position is a least significant portion of the instructions.

6. A system according to claim 4, wherein the processor is adapted for use in a big-endian system and the predetermined position is a most significant portion of the instructions.

7. A system according to claim 1, wherein the third larger size is 64 bits.

8. A system according to claim 1, wherein the fetch unit generation means is operable to include in the instruction fetch unit an aligner that identifies the starting byte with respect to a word boundary of an instruction memory.

9. A system according to claim 1, wherein the fetch unit generation means is operable to include in the instruction fetch unit a holding buffer that holds a portion of a next fetched instruction that was included in a word retrieved from an instruction memory together with a portion of a first fetched instruction.

10. A system according to claim 9, wherein the instruction fetch unit combines the portion of the next fetched instruction from the holding buffer with remaining portions from a subsequent word retrieved from the instruction memory to form the next fetched instruction.

11. A system according to claim 1, wherein the fetch unit generation means is operable to include in the instruction fetch unit a number of pipeline stages corresponding to a latency of an instruction memory.

12. A system according to claim 1, wherein the instruction fetch unit retrieves instructions from an instruction memory having a word boundary, and wherein the instruction fetch unit is operable to identify the starting byte at an offset from the word boundary.

13. A system according to claim 12, wherein the fetch unit generation means is operable to include in the instruction fetch unit a program counter that generates an index into the instruction memory for retrieving the instructions.

14. A system according to claim 1, further comprising:
software generation means for, based on the configuration specification, automatically generating a set of software tools supporting the plurality of different instruction sizes.

15. A method for generating a processor, comprising:
based on a configuration specification including a predetermined portion and a user-defined portion, automatically generating a description of a hardware implementation of the processor;
wherein the automatic hardware generation step includes, based on the configuration specification, automatically including an instruction fetch unit in the description of the hardware implementation of the processor,
and wherein the fetch unit generation step includes configuring the hardware description of the instruction fetch unit such that it is capable of recognizing instructions having a plurality of different instruction sizes that are specified by the user-defined portion of the configuration specification, wherein the different instruction sizes are 16 and 24 bits, and a third larger size.

16. A method according to claim 15, wherein at least one of the different instruction sizes corresponds to a very long instruction word (VLIW) having a plurality of instruction slots, and at least one other of the different instruction sizes comprises only one instruction slot.

17. A method according to claim 15, wherein the instruction fetch unit recognizes the different instruction sizes by dynamically computing a starting byte of a next fetched instruction having a next instruction size from information contained in a first fetched instruction having a first instruction size different from the next instruction size, and wherein the information is contained in a field at a predetermined position within the first fetched instruction.

18. A method according to claim 17, wherein the next fetched instruction contains the field at the predetermined position within the next fetched instruction which provides information regarding the next instruction size.

19. A method according to claim 18, wherein the processor is adapted for use in a little-endian system and the predetermined position is a least significant portion of the instructions.

20. A method according to claim 18, wherein the processor is adapted for use in a big-endian system and the predetermined position is a most significant portion of the instructions.

21. A method according to claim 15, wherein the third larger size is 64 bits.

22. A method according to claim 15, wherein the fetch unit generation step comprises including in the instruction fetch unit an aligner that identifies the starting byte with respect to a word boundary of an instruction memory.

23. A method according to claim 15, wherein the fetch unit generation step comprises including in the instruction fetch unit a holding buffer that holds a portion of a next fetched instruction that was included in a word retrieved from an instruction memory together with a portion of a first fetched instruction.

24. A method according to claim 23, wherein the instruction fetch unit combines the portion of the next fetched instruction from the holding buffer with remaining portions from a subsequent word retrieved from the instruction memory to form the next fetched instruction.

25. A method according to claim 15, wherein the fetch unit generation step comprises including in the instruction fetch unit a number of pipeline stages corresponding to a latency of an instruction memory.

26. A method according to claim 15, wherein the instruction fetch unit retrieves instructions from an instruction memory having a word boundary, and wherein the instruction fetch unit is operable to identify the starting byte at an offset from the word boundary.

27. A method according to claim 26, wherein the fetch unit generation step comprises including in the instruction fetch unit a program counter that generates an index into the instruction memory for retrieving the instructions.

28. A method according to claim 15, further comprising:
based on the configuration specification, automatically generating a set of software tools supporting the plurality of different instruction sizes.

* * * * *